United States Patent [19]

Okano

[11] Patent Number: 5,987,225
[45] Date of Patent: Nov. 16, 1999

[54] METHOD OF DYNAMICALLY MANAGING A PRINTER/COPIER NETWORK

[75] Inventor: Tokiyuki Okano, Yamatokoriyama, Japan

[73] Assignee: Sharp Kabushiki Kaisha, Osaka, Japan

[21] Appl. No.: 08/644,842

[22] Filed: May 9, 1996

[30] Foreign Application Priority Data

May 10, 1995 [JP] Japan .................................. 7-112127

[51] Int. Cl.⁶ .................................................. G03G 15/00
[52] U.S. Cl. ........................ 395/112; 395/113; 395/114; 395/200.3; 395/200.31; 358/296; 358/448; 358/468; 364/140.02; 399/8
[58] Field of Search ........................ 395/112–114, 200.3, 395/200.31; 358/296, 448, 468; 364/140.02; 399/8

[56] References Cited

U.S. PATENT DOCUMENTS

| | | | |
|---|---|---|---|
| 3,934,121 | 1/1976 | Kratt et al. ......................... | 235/61.6 R |
| 4,167,322 | 9/1979 | Yano et al. .............................. | 355/3 R |
| 5,287,194 | 2/1994 | Lobiondo ................................. | 358/296 |
| 5,377,016 | 12/1994 | Kashiwagi et al. ..................... | 358/403 |
| 5,511,150 | 4/1996 | Beaudet et al. .......................... | 395/113 |

*Primary Examiner*—Scott Rogers
*Assistant Examiner*—Lance W. Sealey
*Attorney, Agent, or Firm*—Dike, Bronstein, Roberts & Cushman, LLP; David G. Conlin; Richard E. Gamache

[57] ABSTRACT

In a network composed of a plurality of DPPCs and the NWPs, the NW controller respectively sums respective amounts of printing operations and copying operations executed in the network, for example, upon completing a job in execution or at a predetermined timing. Based on the result of summation, an appropriate ratio in number of printing devices to copying devices is computed. Further, an NW controller selects a DPPC to be switched from its current mode to another mode and switches the mode of the selected DPPC to satisfy a ratio obtained from computation. According to the described arrangement, since the mode of the DPPC can be switched according to the summation of the jobs executed, an effective use of the DPPCs can be achieved. Furthermore, when switching the mode, an operation by the network administrator is not required, thereby reducing a burden of the user.

33 Claims, 31 Drawing Sheets

FIG. 31

```
DEVICE No.                    STATE OF USE
   2                             OK
   1                          AVAILABLE AFTER 5 MIN.
   3    (OWN DEVICE)          AVAILABLE AFTER 7 MIN.
   5    (BEING RESERVED)      AVAILABLE AFTER 10 MIN.
   4                          AVAILABLE AFTER 20 MIN.

INPUT RESERVATION No.
```

FIG. 32

```
DEVICE No.                              STATE OF USE
   2     AVAILABLE                      2 MIN. TO COMPLETE
   1     BEING USED                     5 MIN. TO COMPLETE
   3     BEING USED (OWN DEVICE)        10 MIN. TO COMPLETE
   5     RESERVED                       15 MIN. TO COMPLETE
   4     BEING USED                     20 MIN. TO COMPLETE

INPUT RESERVATION No.
```

FIG. 33

```
ATTRIBUTE SELECTION SCREEN

A3    B4   | A4 |   B5      A5
SHEET SIZE
                      B6     POSTCARD    BUSINESS CARD

BOTH-SIDED COPY            | YES |         NO

FINISHING            | SORT |     GROUP         No

STAPLE    | YES |        NO

PHOTOCOPY                    YES         | NO |

IMAGE EDITING                YES         | NO |
```

METHOD OF DYNAMICALLY MANAGING A PRINTER/COPIER NETWORK

FIELD OF THE INVENTION

The present invention relates to a network including printing devices capable of processing both copying jobs and printing jobs, and also relates to a print output control device for performing various controls such as setting an operation mode of each printing device, assigning requested printing jobs to the printing devices, etc.

BACKGROUND OF THE INVENTION

Conventionally, a network which includes a data processing unit such as a host computer, etc., and a printing device such as a printer, etc., that are connected, wherein image data processed in the data processing unit is sent to the printing device to produce print output is known.

In the network including plural printing devices, various arrangements for appropriately assigning printing jobs requested from the data processing unit to respective printing devices have been proposed. Such arrangements are known, for example, through Japanese Laid-Open Patent Application No. 274098/1993 (Tokukaihei 5-274098) wherein an appropriate printer for a requested printing job is selected among plural printers connected to the network, according a precision of print data, a paper size., etc.

Another arrangement is disclosed in Japanese Laid-Open Patent Application No. 122715/1991 (Tokukaihei 3-122715) wherein each printer is assigned a priority beforehand, and requested printing jobs are assigned according to the priority.

A still another arrangement is disclosed in Japanese Laid-Open Patent Application No. 303475/1993 (Tokukaihei 5-303475) wherein printers connected to the network are divided into groups, and requested printing jobs are assigned in such a manner that a printer in a group processes printing jobs of the paper of the same size as much as possible to reduce the frequency of exchanging sheets.

Recently, a so-called composite digital copying machine which serves both as a copying machine (copy function) for outputting a copied image that is read from a document such as a scanner, etc., and as a printer (print function) for outputting a print of image data sent from an external data processing unit, etc., has been used in practical applications. Furthermore, such attempt that the described composite digital copying machines are connected to a network, and are used both in processing copying jobs and printing jobs has been made.

However, in the conventional arrangement where the composite digital copying machines are connected to the network, the technique of using the composite digital copying machines both as printers and copying machines on a full-scale has not yet been established. Namely, in the conventional arrangement, the composite digital copying machines whose modes are set to either the printing mode or the copying mode beforehand are connected to the network. In such arrangement, when the user desires to alter the ratio in number of the printing devices dedicated to printers to the number of printing devices dedicated to copying machines in the network, a network administrator is required to switch the operation mode.

Therefore, in the case of the network of a large scale, the network administrator must perform troublesome tasks such as monitoring a usage of an entire network, switching an operation mode, etc., thereby presenting the problem of increasing a burden of a network administrator. In addition, for example, in response to an urgent request for a copying job, in the case where an operation mode of the composite digital copying machine set near the user is selected to be the printing device dedicated to printer, the user of the network must look for a printing device that can process a copying job. As described, in the described conventional network, the composite digital copying machines cannot be used on a full-scale.

SUMMARY OF THE INVENTION

An object of the present invention is to enable composite digital copying machines that are capable of processing both printing jobs and copying jobs to be effectively used to offer improved expediency for the user.

To fulfill at least the above-mentioned object, an example print output control device in accordance with the best presently contemplated embodiment of the present invention, provided in a network including a plurality of printing devices including a composite copying device that can be switched between a printing mode for printing image data received from an external device and a copying mode for copying image data read from a document is characterized by including:

arithmetic means which sums respective amounts of printing operations and copying operations executed in each printing device and computes a ratio in number of printing devices for use in processing a printing job to a number of printing devices for use in processing a copying job based on results of summation of respective amounts of printing operations and the copying operations executed in each printing device, the summation being carried out at a predetermined timing; and switch means which selects a composite printing device whose mode is to be switched and switches a selected composite printing device so as to satisfy the ratio of the number of the printing devices for use in processing the printing job to the number of the printing devices for use in processing the copying job computed by the arithmetic means.

According to the described arrangement, for example, the arithmetic means carries out a summation of respective amounts of printing operations and copying operations executed in each printing device on the network at a predetermined timing, for example, when completing each printing job or copying job or at a predetermined time interval. Based on the results of summation, an appropriate ratio in number of printing devices for use in processing printing jobs to the number of printing devices for use in processing copying jobs is computed. Then, the switch means selects a composite printing device whose mode is to be switched and switches the mode of the selected composite printing device to satisfy the ratio obtained by the arithmetic means.

As a result, an appropriate assignment in the number of the printing devices for use in processing printing jobs to the number of printing devices for use in processing copying jobs can be made based on the results of summation of respective amounts of the printing operations and the copying operations processed in the network. As the operation mode of each printing device is switched by the switching means, the necessity of manually switching the operation mode while observing the state of use by a network administrator can be eliminated, thereby reducing the burden of the network administrator. Furthermore, as the mode of each composite printing device can be set in consideration of the state of use, each composite printing device can be used more effectively. Additionally, for example, by setting an appropriate timing of carrying out the summation beforehand, delicate control according to the state of use of the network can be performed.

To fulfill the above-mentioned object, a composite printing device that is switchable between a printing mode for printing image data received from an external device and a copying mode for copying image data read from a document, is characterized by including:

arithmetic means which sums respective amounts of printing operations and copying operations executed in each printing device and computes an appropriate ratio in number of printing devices for use in processing a printing job to a number of printing devices for use in processing a copying job based on results of summation of respective amounts of the printing operations and the copying operations executed in each printing device, the summation being carried out at a predetermined timing; and switch means which selects a composite printing device whose mode is to be switched and switches a selected composite printing device so as to satisfy the ratio in number of the printing devices for use in processing the printing job to the number of the printing devices for use in processing the copying job computed by the arithmetic means.

According to the described arrangement, the mode of each composite printing device in the network can be switched appropriately based on the results of summation of respective amounts of the printing operations and the copying operations executed in the network, thereby permitting each composite printing device to be more effectively used.

A method in accordance with the present invention of controlling a plurality of printing devices including a composite printing devices connected to a network, the composite printing device being switchable between a printing mode for printing image data received from an external device and a copying mode for copying image data read from a document is characterized by including the steps of:

(a) summing respective amounts of printing operations and copying operations executed in each printing device;

(b) computing a ratio in number of printing devices for use in processing printing jobs to a number of printing devices for use in processing copying jobs based on results of summation obtained in the step (a);

(c) selecting a composite printing device whose mode is to be switched to satisfy a condition that respective numbers of the printing devices for use in processing the printing jobs and the printing devices for use in processing the copying job are not less than a predetermined lower limit number determined at least for one of these two types of the printing devices and that a ratio in number of the printing devices for use in processing the printing jobs to the number of the printing devices for use in processing the copying job can be approximated to the ratio obtained in the step (b); and (d) switching a mode of a composite printing device selected in the step (c).

According to the described method, for example, even in the case where a frequency of processing one of the printing job and copying job is significantly higher than the other, a minimum number of printing devices for use in processing the job which is requested less frequently can be ensured.

A method in accordance with the present invention of controlling print outputs in a composite printing device connected to a network including a data processing unit, the composite printing device being switchable between a printing mode for printing image data received from the data processing unit and a copying mode for copying image data read from a document, is characterized by including the steps of:

(a) adding a printing job requested from the data processing unit on a wait line;

(b) determining whether or not an interruption by a copying job is enabled when a request for the copying job is given by a user; and (c) when the interruption by the copying job is enabled, determining a position of interrupting the copying job on the wait line based on results of respective comparisons between a priority assigned to the requested copying job and those assigned to jobs on the wait line.

As described, when a request for processing a copying job is made, the print output control device interrupts the requested copying job on the wait line of the composite printing device, which usually serves as a printer, while as a copying machine when necessary. As a result, such composite printing device can be more effectively used. Moreover, as the priority of the copying job and the priority of the printing job can be set as desired in consideration of the state of use of the network, etc. For example, the priority may be set such that the copying job is processed prior to any printing job on the wait line, or a different priority can be assigned to each job by the user. As described, by setting the priority according to the state of use of the network, a still improved operability of the network can be achieved.

For a fuller understanding of the nature and advantages of the invention, reference should be made to the ensuing detailed description taken in conjunction with the accompanying drawings.

BRIEF DESCRIPTION OF THE DRAWINGS

FIG. 31 is an explanatory view showing one display example of a display screen formed on the operation panel of the DPPC provided in the network.

FIG. 32 is an explanatory view showing another display example of the display screen.

FIG. 33 is an explanatory view showing a still another example of the display screen.

DESCRIPTION OF THE EMBODIMENTS

[First Embodiment]

The following descriptions will discuss one embodiment of the present invention in reference to FIG. 1 through FIG. 10.

The structure of a composite digital plain paper copying machines (DPPC) as a composite printing device in accordance with the present embodiment will be explained in reference to FIG. 3 and FIG. 4.

Figure 3:
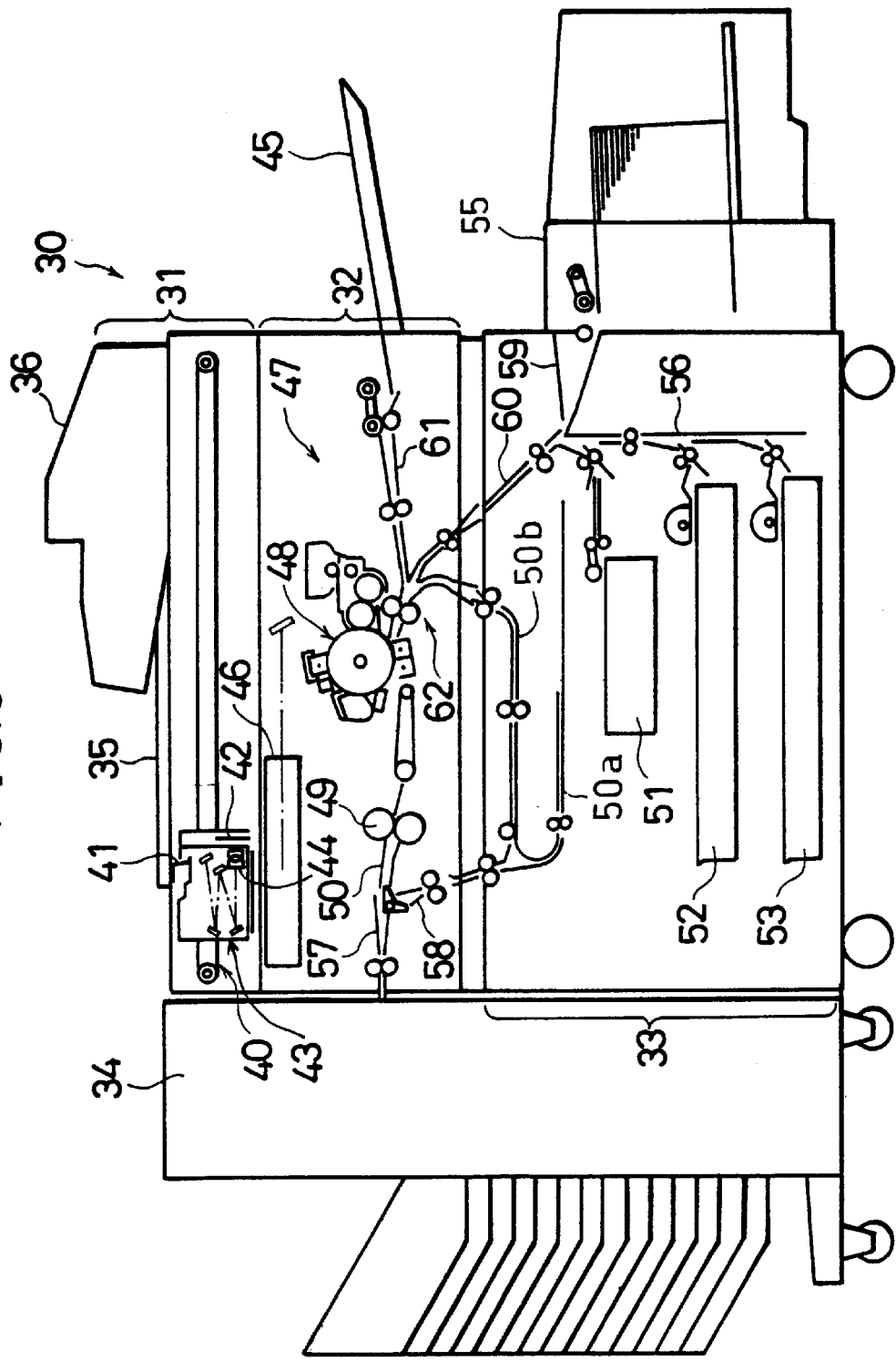
FIG. 3 is a cross-sectional view showing a schematic configuration of the DPPC.

FIG. 3 is a cross-sectional view schematically showing a structure of the DPPC. As shown in FIG. 3, the DPPC includes a scanner section 31, a laser printer section 32, and a multi-level feeding unit 33 and a sorter 34. The scanner section 31 is composed of a document platen 35 made of a transparent glass, a recirculating document feeder 36 (RDF) which permits a both-sided copy function and a scanner unit 40.

The RDF 36 automatically feeds plural documents which are set at one time one by one to the scanner unit 40, where the image on one side or both sides of the document is read according to the selection made by the operation. The scanner unit 40 includes a lamp reflector assembly 41 for directing light onto the document, a CCD (charge coupled device) 42 as a photoelectric conversion element, plural reflective mirrors 43 for directing light reflected from the document to the CCD 42 and a lens 44 for forming a reflected optical image from the document onto the CCD 42.

When scanning the document placed on the document platen 35, the scanner section 31 reads the document image while moving the scanner unit 40 along the lower surface of the document platen 35. On the other hand, when reading the document image using the RDF 36, in the state where the scanner unit 40 is fixed in a predetermined position under the RDF 36, the RDF 36 transports the document, and the image formed thereon is read by the scanner unit 40.

The image data obtained by the scanner unit 40 is sent to an image processing section (not shown) provided in the DPPC to have various treatments applied thereto and thereafter it is temporarily stored in an internal memory of the image processing section. The image processing section will be described later. Thereafter, the image data in the memory is sent to the laser printer section 32 according to an instruction for outputting, and is outputted on the sheet as a copied image. In the memory, the image data outputted from an external devices such as a word processor, a microcomputer, or information equipments such as a host computer, etc., are stored. In this case, the image data of the information apparatus is outputted on the sheet.

The laser printer 32 includes a manual feed tray 45, a laser writing unit 46 and an electrophotographic processing section 47 for forming an image.

The laser writing unit 46 includes a semiconductive laser (not shown) for outputting a laser beam in accordance with the image data obtained from the memory of the image processing section, a polygon mirror (not shown) for deflecting a laser beam at a constant angular velocity, a f-θ lens (not shown) for adjusting a laser beam so that a deflected laser beam is deflected on a photoreceptor drum 48 of the electrophotographic processing section 47 at a constant velocity.

The electrophotographic processing section 47 has a known structure, i.e., including a charger unit, a developer unit, a transfer unit, a separation unit, a cleaning unit and a removing unit which are aligned along the circumference of the photoreceptor drum 48 and also including a fixing unit 49. On the downstream side of the fixing unit 49 in the sheet transport direction, provided is a transport path 50. The transport path 50 is branched into a transport path 57 that reaches the sorter 34 and a transport path 58 that reaches the multi-level feeding unit 33.

The transport path 58 is branched at the multi-level feeding unit 33 into a reverse transport path 50*a* and a both-sided/composite transport path 50*b* as transport paths after the branch point. The reverse transport path 50*a* serves as a transport path for reversing a sheet in a both-sided copy mode in which a copy is made on both surfaces of the sheet. The both-sided/composite transport path 50*b* is provided for transporting a sheet from the reverse transport path 50*a* to an image forming position of the photoreceptor drum 48 in both-sided copy mode. The both-sided/composite transport path 50*b* also serves as a transport path for transporting a sheet to an image forming position of the photoreceptor drum 48 without reversing the sheet in the single-sided composite copy mode in which images from different documents or in different toner colors are formed on one side of the sheet.

The multi-level feeding unit 33 includes a first cassette 51, a second cassette 52, a third cassette 53, and an optional fourth cassette 55. The multi-level feeding unit 33 also includes a common transport path 56 for transporting from the respective first through third cassettes 51, 52 and 53 to the electrophotographic processing section 47. The common transport path 56 joins a transport path 59 from the second cassette 55 on a way to the electrophotographic processing unit 47 and reaches the transport path 60.

The transport path 60 joins the transport path 61 from the both-sided/composite transport path 50*b* and the transport path 61 from the manual document tray 45 at a confluence 62, and reaches the image forming position between the photoreceptor drum 48 and the transfer unit. The confluence 62 of the described three paths is formed near the image forming position.

In the laser printer 32, the image data read from the memory of the image processing unit is outputted as a laser beam from the laser writing unit 46, and the photoreceptor drum 48 charged to a predetermined potential by the charger is scanned by directing thereon a laser beam, thereby forming an electrostatic latent image on the surface thereof. The resulting electrostatic latent image is visualized using toner supplied from the developer unit and is transferred on to the sheet supplied from the multi-level feeding unit 33 by the transfer unit. Further, the sheet is separated from the surface of the photoreceptor drum 48, and the residual toner remaining on the surface of the photoreceptor drum 48 is collected in a cleaning unit, and the residual potential remaining on the photoreceptor drum 48 is removed by the removing unit. The toner image transferred onto the sheet is affixed on a sheet by a fixing unit 49, and the sheet is either transported to the sorter 34 through the transport paths 50 and 57 or transported to the reverse transport path 50*a* through the transport paths 50 and 58.

Next, the structure and operation of the image processing section provided in the DPPC will be explained in reference to FIG. 4. FIG. 4 is a block diagram showing a schematic configuration of the image processing section.

Figure 4:
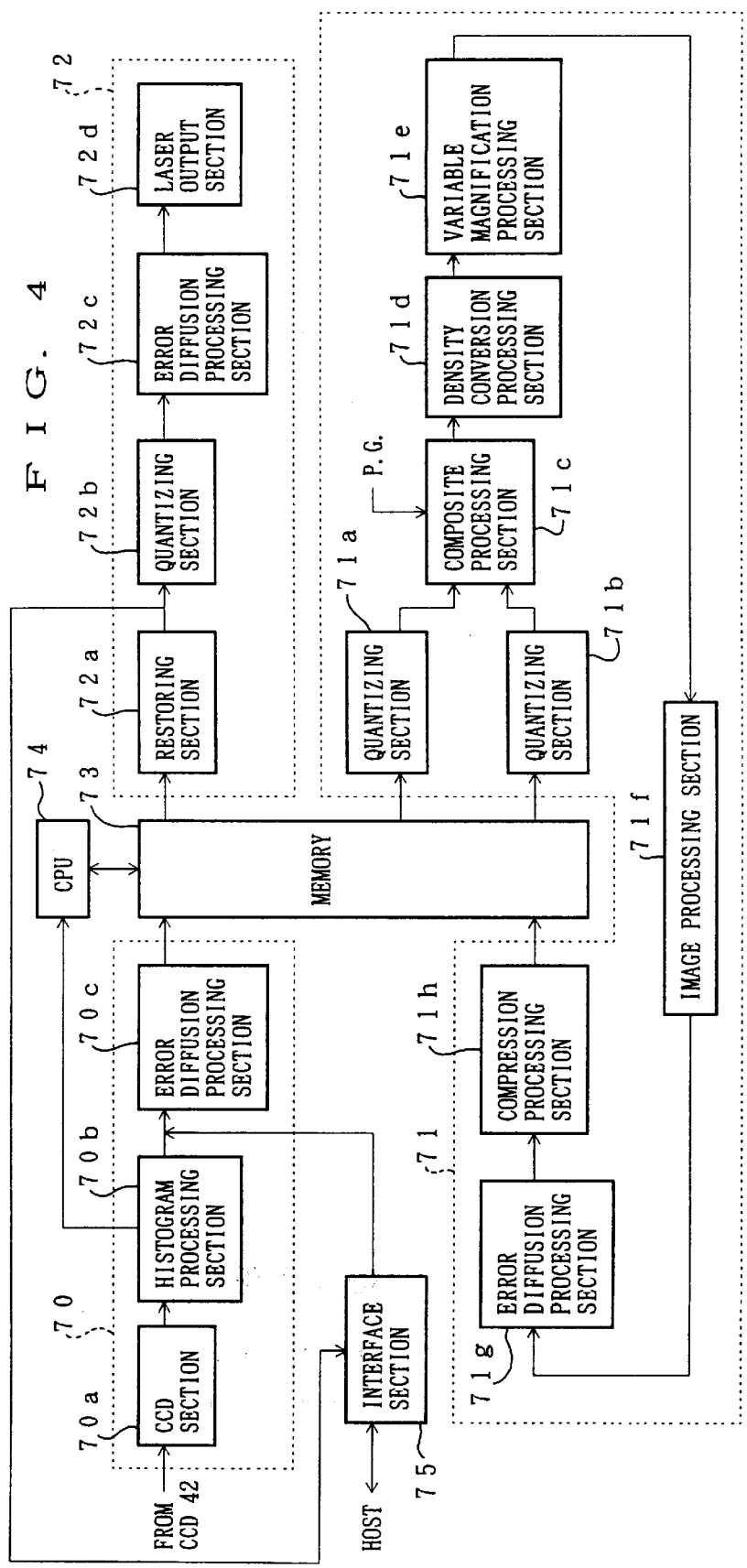
FIG. 4 is a block diagram showing a structure of an image processing section provided in the DPPC.
Figure 5:
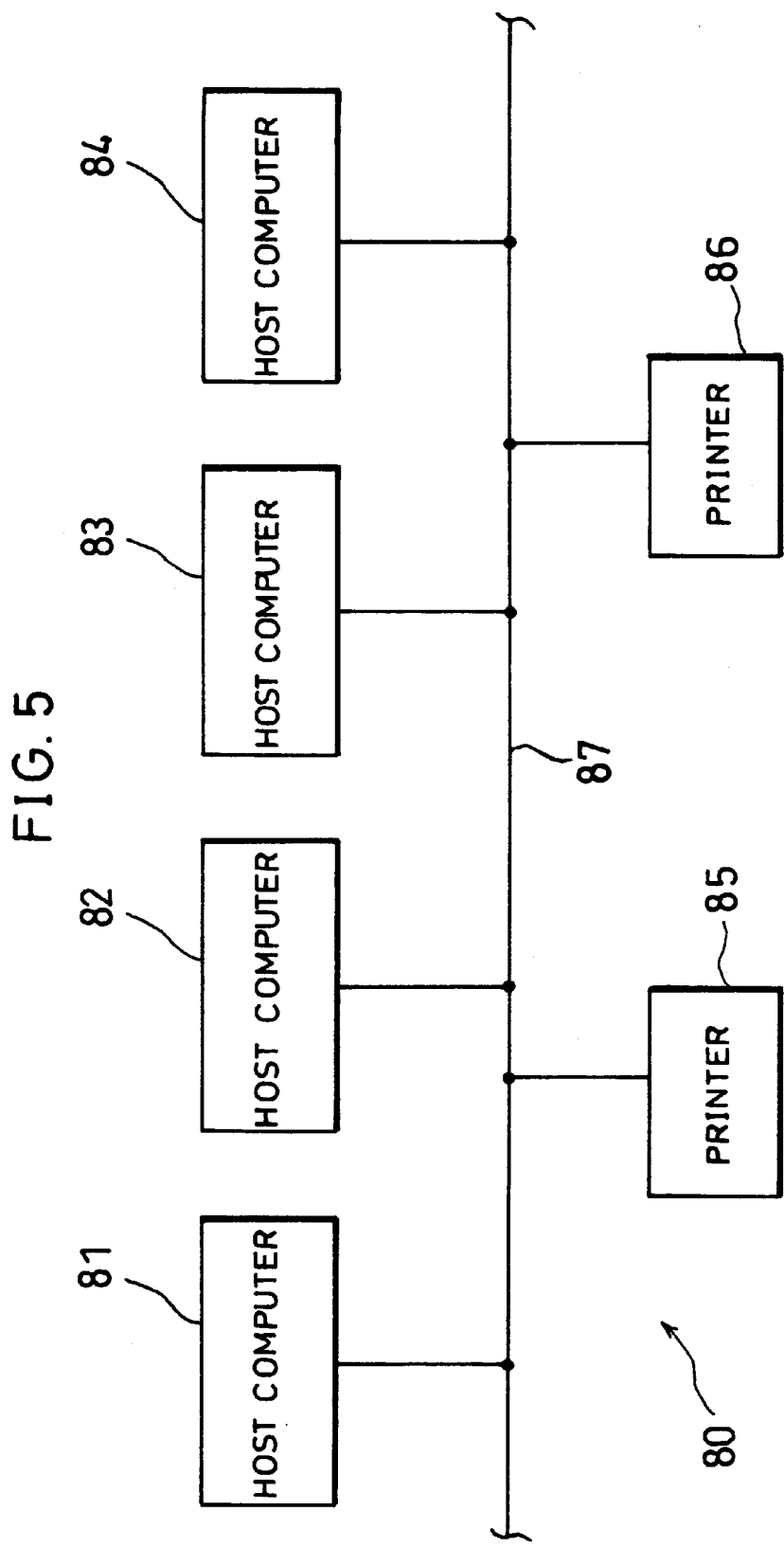
FIG. 5 is a block diagram showing one example of a basic structure of the network in accordance with one embodiment of the present invention.

As shown in FIG. 4, the image processing section provided in the DPPC in accordance with the present embodiment includes an image data input section 70, an image processing unit 71, an image data output section 72, a memory 73 composed of a random access memory (RAM), etc., a central processing unit (CPU) 74, and an interface section 75.

The image processing section can process both image data read from the document by the scanner unit 40 of the scanner section 31 and image data sent from an external equipment such as a host computer, etc., to produce a print output.

The image data input section 70 includes a CCD section 70*a*, a histogram processing section 70*b*, and an error diffusion processing section 70*c*. The image data of the document that is read by the CCD 42 of the scanner unit 40 is converted into a binary form, and the image data is processed by the error diffusion method while taking the histogram in a binary system, thereby temporarily storing the processed image in the memory 73.

Specifically, in the CCD section 70*a*, a density of each pixel of the image data (analog electric signal) is A/D converted, and further an MTF adjustment, a black-and-white adjustment or a gamma adjustment is performed, thereby outputting the image data in a form of a digital signal of 256 tones (8 bits) to the histogram processing section 70*b*.

In the histogram processing section 70*b*, the digital signal outputted from the CCD section 70*a* is added for each density of 256 tones, thereby obtaining density information (histogram data). The histogram data is either sent to the CPU 74 or to the error diffusion processing unit 70*c* as the image data according to the necessity.

In the error diffusing section 70*c*, an error diffusing processing which is a type of pseudo-half-tone processing is performed as a method of reflecting the binary error generated by converting into binary system of adjoining pixels, a digital signal of 8 bits/pixel outputted from the CCD section 70*a* is converted into one bit (binary value), and a reassigning process for surely reproducing the density of a local area on the document is carried out.

The image processing unit 71 includes quantizing sections 71*a* and 71*b*, a composite processing section 71*c*, a density conversion processing section 71*d*, a variable magnification processing section 71*e* and an image processing section 71*f*, an error diffusion processing section 71*g* and a compression processing section 71*h*.

The image processing unit 71 repeats applying the conversion process with respect to the inputted image data until the image data the operator desired is obtained. The final image data resulting from the described process is stored in the memory 73. Here, each of the described processing sections included in the image processing unit 71 function according to the necessity, and thus may not be functioned depending on, for example, the content of the conversion process. An operation of each processing section will be explained below.

The quantizing sections 71*a* and 71*b* convert the binary data again to the 256 tones. The composite processing section 71*c* selectively performs a logical operation of each pixel, i.e., a logical sum or logical product, or an exclusive logical sum. Here, the data to be processed in the logical operation is the image data stored in the memory 73 and bit data from a pattern generator (PG).

The density conversion processing section 71*d* inputs a digital signal of 256 tones, and sets an output density determined based on a predetermined tone conversion table in accordance with the density of the digital signal. Regrading the tone conversion table, a correlation between the output density to the input density can be set as desired.

The variable magnification processing section 71*e* calculates the density value of the pixel data with respect to the objective pixel after being magnified by applying an interpolation according to a selected magnification based on the known data to be inputted. Here, the valuable magnification process in the sub-scanning direction is performed, and thereafter, the variable magnification process in the main scanning direction is performed.

The image processing section 71f performs various processes with respect to the inputted pixel data, and performs a collection of information such as feature extraction, etc., from the pixel data string. The error diffusion processing section 71g performs the same operation as the error diffusion processing section 70c of the image data input section 70.

The compression processing section 71h compresses the image data of binary data by encoding the run-length. The described compression of the image data is performed when the final output image data is obtained, i.e., in the final processing loop.

The image data output section 72 includes a restoring section 72a, a quantizing section 72b, an error diffusion processing section 72c and a laser output section 72d. The image data output section 72 converts and restores the image data stored in the memory 73 in the compressed state in 256 tones, and an error diffusion of four valued data that is a half tone expression smoother than the binary data is performed, and sends the data to the laser output section 72d.

More specifically, the restoring section 72a restores image data compressed by the compression processing section 71h. The quantizing section 72b performs the same operations as the quantizing sections 71a and 71b of the image processing unit 71. The error diffusion processing section 72c performs the same operation as the error diffusion processing section 70c of the image data input section 70.

The laser output section 72d converts the digital pixel data into an ON/OFF signal of the laser based on the control signal from a sequence controller (not shown). The ON/OFF of the laser is controlled by this signal.

The data used in the image data input section 70 and the image data processing section 72 is stored in the memory 73 basically in a binary data to reduce the capacity of the memory 73. However, it may be processed in a form a four valued data in consideration of the deterioration of the image data.

The interface section 75 receives image data sent from an external equipment such as a host computer, etc., and outputs it to an error diffusion processing section 70c of the image data input section 70. The image data received from the external equipment taken in the error diffusion processing section 70c is also temporality stored in the memory 73 as in the case of the image data read from the document. After being processed in the image processing unit 71, it is printed in the image data output section 72.

Further, after the image data stored in the memory 73 is restored in the restoring section 72a of the image data output section 72, by sending the image data from the image data input section 70 to the host computer through the interface section 75, the image data from the image data input section 70 can be taken in the host computer.

Next, the network in which the described DPPCs are integrated will be explained. First, a general structure of the network will be explained in reference to FIG. 5. The network shown in the figure has plural host computers including host computers 81 through 84, and plural printers including printers 85 and 86. The plural host computers and the plural printers are mutually connected by a communication line 87. In the network, communication of the data is mutually performed among host computers through the communication line 87, or each printer performs a printing operation based on an instruction from the host computer.

For the printer 85 and the printer 86, those having a function of simply printing the image data sent from the host computer can be used together with a DPPC, etc., which permits the image data sent from the host computer to be temporarily stored and processed according to the use of the user.

As a network controller for controlling the network 80 as a whole, at least one of the plural host computers on the network 80 may be selected, or at least one computers and printers on the network 80 which stores the network controller may be selected. In the present embodiment, explanations will be given through the former case, and the explanations of the latter case will be given through another embodiment to be described later.

On the network 80, the host computers 81 or 84 may be replaced with the personal computer or the work station, etc.

An arrangement of a still another example of the network in which the DPPCs are integrated and a control of this network will be explained in reference to FIG. 1 and FIG. 2, and Tables 1 through 5.

Figure 1:
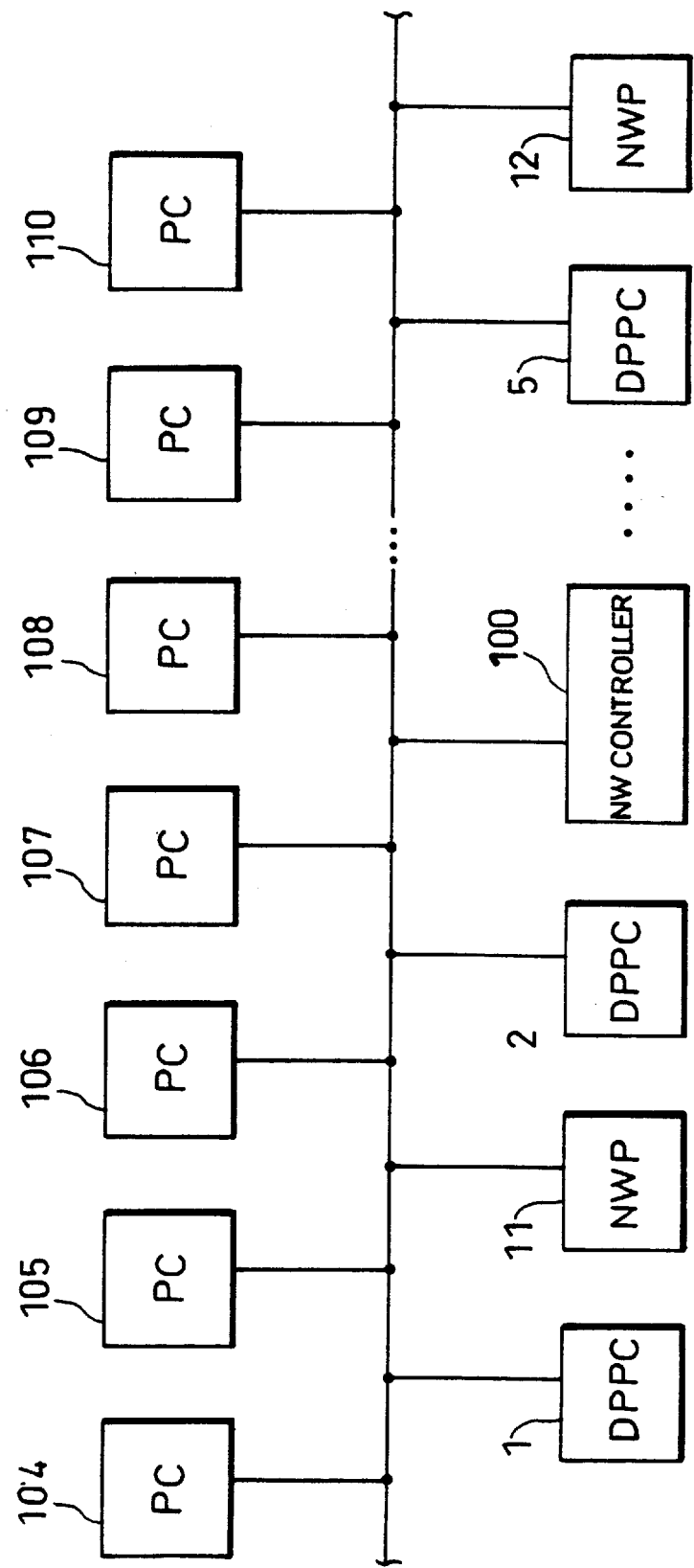
FIG. 1 is a block diagram illustrating a structure of the network in accordance with one embodiment of the present invention.

As shown in FIG. 1, the network in accordance with the present embodiment includes plural personal computers (hereinafter referred to as PC) 104 through 110 as data processing units, five DPPCs 1 through 5 as composite printing devices as one type of the printing device, two network printing devices (hereinafter referred to as NWP) 11 and 12 as another type of the printing device and a network controller 100 (hereinafter referred to as a NW controller) as a printer control unit. In the figure, the DPPCs 3 and 4 are omitted.

The NWPs 11 and 12 serve only as printers for outputting a print image data sent from the PCs 104 through 110, while the DPPC 1 through 5 serves both as a printer for outputting a print image data sent from PCs 104 through 110 and as a copying machine for outputting a copy of the image data read from a document by a self-contained scanner. The DPPC 1 through DPPC 5 whose operation modes are switchable under the control by the NW controller 100 (to be described later) so that each operates as either a printer or a copying machine.

Figure 2:
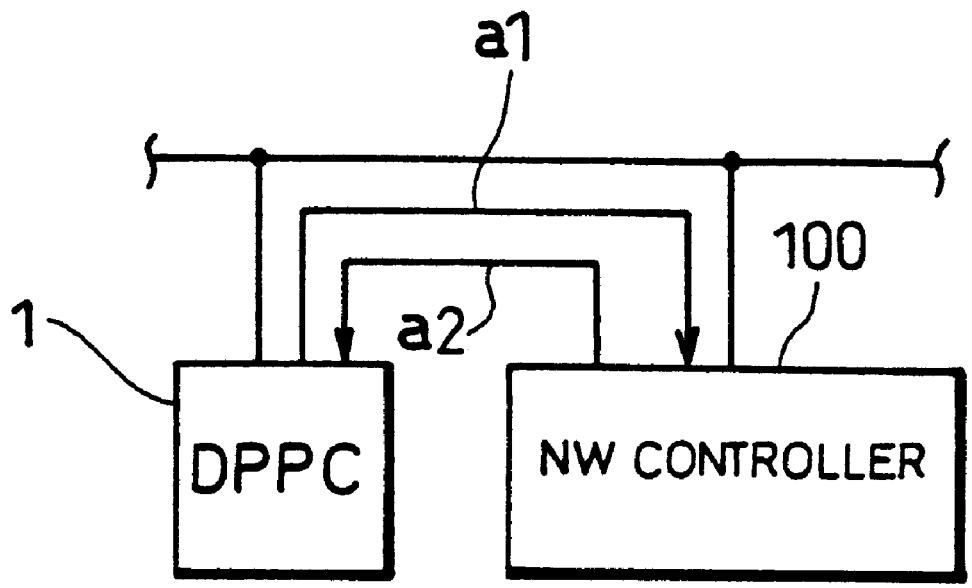
FIG. 2 is a typical depiction showing a path for transferring control information between DPPC (composite printing device) and an NW controller (print output control device) in the network.

FIG. 2 shows a flow of data between the DPPC 1 through DPPC 5 and the NW controller 100 on the network. As shown by an arrow a1 in FIG. 2, the NW controller 100 receives status information, to be described later, from each of the DPPC 1 through DPPC 5. Between the NW controller 100 and each PC, a communication of a printing request, and a print status information (not shown) is performed.

The NW controller 100 recognizes the entire operation state of the network from the described status information and controls the network as a whole by sending a control signal to each DPPC as shown by an arrow a2. The DPPC 1 through DPPC 5 respectively switch their modes between a copying mode and a printing mode under the control of the NW controller 100. The communication of the status information and the control signal is performed between the NW controller 100 and the NWP 11 or 12.

The status information is continuously transferred to the NW controller 100 respectively from the DPPCs 1 through 5 and the NWPs 11 and 12 while the network is activated. The status information contains information such as a completion of a copying process and a printing process, etc., or information indicating an occurrence of trouble, etc. The NW controller 100 stores the history of the status information transferred from all the DPPCs and NWPs in the internal memory (not shown).

The NW controller 100 serves as arithmetic means, and collects the information regarding the respective states of use of the DPPCs and the NWPs (seven units in total) at a predetermined timing, and computes a ratio in number of the copying machines to the number of the printers on the network based on the collected states of use. The NW controller 100 also serves as switch means for determining whether each of the DPPC 1 through DPPC 5 either is to be assigned as a copying machine or a printer.

The process of assigning each DPPC by the NW controller 100 will be explained below in reference to Table 1 through Table 5. In the assignment process, typical examples of factors determining the ratio in number of the copying machines to the printing devices include:

(a) respective numbers of printing jobs and copying jobs to be carried out in the entire network, and (b) respective total time the printing device and the copying machines connected to the network have been used.

The typical timing of collecting the described information regarding the respective states of use may be:

(a) upon a completion of a copying operation or a printing job, or (b) at a predetermined time interval.

The following shows typical combinations of these factors for determining the assignment and the timing of collecting the information:

(1) an assigning process by summing respective number of times the printing job and the copying job performed upon completing the copying job or printing job;

(2) an assigning process by summing respective number of times the printing job and the copying job performed at a predetermined interval;

(3) an assigning process by summing respective total time the printer and the copying machine used upon completing the copying job or printing job; and (4) an assigning process by summing total time the printer and copying machines used at a predetermined interval.

The assigning process (1) will be explained first mainly through the controlling operation by the NW controller 110 in reference to Table 1.

job performed to the number of times the printing job performed in the network as a whole be 57:43.

The ratio is converted into an internal ratio of 7 that is a total number of devices (DPPCs and NWPs), and is round off, and an approximated integral ratio of 4:3 is obtained. Namely, an optimal ratio in number of copying machines to number of printers based on the result of summation for the previous assignment is as follows:

copying machines:printers=four:three.

Based on the obtained result, the NW controller 100 assigns the DPPCs 1, 2, 3 and 5 as the copying machines (designated by PPC in the Table), and assigns the DPPC 4 as a printer (designated by NWP in the Table). Here, the NWPs 11 and 12 have only the printing function and always serve as printers.

As described, after the previous assignment has been carried out, the copying operation in the DPPC 1 is completed, and the status information indicating the job completion is set to the NW controller 100 from the DPPC 1, and the NW controller 100 performs the assignment of the DPPC according to the result of summation.

For example, as shown in the Table, assumed here that the ratio in number of times the copying operation and the printing operation to be 73 to 27 according to the summation of the current state of use. Then, the ratio is converted into the internal ratio of the number of DPPCs and NWPs, i.e., 7, and is approximated to the integral ratio by round off. As a result, the ratio in number of copying machines and printing devices of 5 to 2 is obtained.

Based on the result, the NW controller 100 assigns such that other than the NWPs 11 and 12 that always function as the printing device to operate as the copying machine. However, in this stage, as the DPPC 4 which should be switched to the copying machine is still being operated as the printing device, it is impossible to switch the mode of the DPPC 4. Therefore, the DPPC 4 is kept operating as the printing device. Namely, the assignment at this stage is as follows: DPPCs 1, 2, 3 and 5 are used as copying machines, and the DPPC 4 is used as a printer.

Furthermore, when the printing operation of the DPPC 4 has been completed, the summation of the state of use is

TABLE 1

|  | DPPC 1 | DPPC 2 | DPPC 3 | DPPC 4 | DPPC 5 | NWP 11 | NWP 12 | NO. OF TIMES PPC USED | NO. OF TIMES NWP USED | RATIO |
|---|---|---|---|---|---|---|---|---|---|---|
| PREVIOUS ASSIGNMENT | PPC | PPC | PPC | NWP | PPC | NWP | NWP | 57 | 43 | 4:3 |
| STATE AT A TIME OF SUMMATION | WAIT STATE | PPC BUSY STATE | PPC BUSY STATE | NWP BUSY STATE | PPC BUSY STATE | BUSY STATE | WAIT STATE | — | — |  |
| CURRENT ASSIGNMENT | PPC | PPC | PPC | NWP | PPC | NWP | NWP | 73 | 27 | 5:2 |
| . | . | . | . | . | . | . | . | . | . | . |
| . | . | . | . | . | . | . | . | . | . | . |
| . | . | . | . | . | . | . | . | . | . | . |
| Nth ASSIGNMENT | PPC | PPC | PPC | PPC | PPC | NWP | NWP | 72 | 28 | 5:2 |

From a certain point of time, the counting of the respective number of times the copying job or the printing job performed in the respective DPPCs and NWPs starts. Thereafter, as shown under the column "previous assignment" in Table 1, the respective numbers of times the copying machine and the printing device used in the network are summed, and it is assumed here that when an assignment is to be made, the ratio of the number of times the copying carried out again, if the ratio in number of the copying machines and the printing devices is 5:2 as shown in the last line in the Table, the DPPC 4 becomes switchable between the copying machine and the printing device. Accordingly, the NW controller 100 switches the operation mode of the DPPC 4 to the copying machine. As a result, the respective operation modes of the DPPC 1 through DPPC 5 are selected so as to function as the copying machines, and the NWPs 11 and 12 function as the printing device, thereby enabling an appropriate ratio in number of the copying machines to the printers.

Next, the assigning process (2) will be explained in reference to Table 2.

In this case, the NW controller 100 has a self-contained timer (not shown) and activates the program of summing the frequency of use in one hour to determine the assignment of the DPPC. The NW controller 100 stores status information sent from each DPPC and each NWP in a memory (not shown), and stores respective accumulated numbers of times the copying job and the printing job performed in the network per hour.

ratio of the total number of devices (the DPPCs and the NWPS) in the network, i.e., 7, and is round off to an approximate integral ratio of 5:2.

Furthermore, the NW controller 100 performs the summation of the respective number of times the copying job and the printing job performed again at eleven o'clock. As a result, the respective number of times the copying job and the printing job performed in the network in one hour from 10 o'clock to 11 o'clock are respectively 60 times and 40 times. In this case, an approximate internal ratio of 4:3 is given, and thus it is required to switch an operation mode of either one of the DPPC 1 to the DPPC 5 to the printing mode. Here, the DPPC to be switched is selected in order

TABLE 2

| TIME  | DPPC 1 | DPPC 2 | DPPC 3 | DPPC 4 | DPPC 5 | NWP 11 | NWP 12 | NO. OF TIMES PPC USED | NO. OF TIMES NWP USED | RATIO |
|-------|--------|--------|--------|--------|--------|--------|--------|------|------|-----|
| 9:00  | PPC WAIT STATE | PPC BUSY STATE | PPC BUSY STATE | NWP BUSY STATE | PPC BUSY STATE | NWP BUSY STATE | NWP WAIT STATE | 70 | 30 | 5:2 |
| 9:05  | PPC | PPC | PPC | PPC | PPC | NWP | NWP | — | — | — |
| 10:00 | PPC | PPC | PPC | PPC | PPC | NWP | NWP | 72 | 28 | 5:2 |
| 11:00 | PPC | PPC | PPC | NWP | PPC | NWP | NWP | 60 | 40 | 4:3 |

As shown in Table 2, assumed here that it is determined that DPPC 1, 2, 3 and 5 have been used as the copying machine, and the DPPC 4 has been used as the printing device in one hour from 8 o'clock till 9 o'clock as a result of summation of the frequency of use performed at nine o'clock. As described, it is assumed here that the NWPs 11 and 12 function only as the printing device, and NWPs 11 and 12 always function as the printing device.

As shown in Table 2, it is assumed here that the number of times the copying job performed in the network in one hour until 9 o'clock, i.e., the number of times the DPPCs 1, 2, 3 and 5 processed the copying job is 70 times, and the number of times the DPPC 4, the NWPs 11 and 12 processed the printing job is 30 times. Here, the ratio in number of the copying job processed to the number of times the printing job processed is converted into the internal ratio of the sum of the number of the DPPCs to the number of the NWPs in the network, and is round off to an approximate integral ratio of 5:2.

In this situation, the NW controller 100 controls such that all of the DPPC 1 through DPPC 5 are assigned to be copying machines after nine o'clock. Namely, according to the described ratio, the DPPC 1 through DPPC 5 are all assigned to be the copying machines, and the NWPs 11 and 12 are assigned to be the printing devices. However, as shown in Table 2, the DPPC 4 is still in execution of the printing operation as the NWP, the operation mode of the DPPC 4 is not switched until the copying operation is completed. Here, it is assumed that the status information indicating that the printing operation of the DPPC 4 to be completed at 5 passed nine, and the NW controller 100 controls the DPPC 4 to be switched to the copying machine. This means that at five passed nine, there exists five copying machines and two printers.

Next, it is assumed here that the number of times the copying operations performed to the number of times the printing operations performed in the network within one hour from 9 o'clock to 10 o'clock be respectively 72 times and 28 times. Then, the ratio is converted into an internal from the DPPC which processed the copying job least number of times within this one hour.

Here, if there exist plural DPPCs that processed the copying jobs least number of times, the respective numbers of times the copying job processed in previous one hour are compared. Then, the DPPC which processed the copying job least number of times in the period of second last one hour is selected. For example, when the priority order is set to be the DPPCs 1, 2, 3, 4 and 5 in this order, if respective number of times the DPPCs 4 and 5 executed the copying jobs are the same, and are smaller than those of other DPPCs, the operation mode of the DPPC 4 would be switched to the printer. Therefore, at eleven o'clock, four copying machines of DPPCs 1, 2, 3 and 5 and three printers of DPPC 4 and NWPs 11 and 12 exist in the network.

The above explanations have been given through the case where the summation and assignment are performed at every hour. However, the time interval of performing the summation and assignment are not limited to one hour, and it may be altered to 30 minutes, a half day, one day, a week, a month or a year as desired.

Similarly, the method of counting respective number of times of copying job and printing job executed is not necessarily based on the unit of the job, and a method of counting the pages of copied or printed sheet or wherein, for example, an accumulated number is counted as 10 when a copying or a printing job of 10 pages is performed may be adopted.

Next, the above-mentioned assigning process (3) will be described in reference to Table 3.

In this assigning process, the NW controller 100 stores the status information sent from each DPPC and each NWP in the internal memory. The NW controller 100 computes respective total time each DPPC has operated as a copying machine or a printer, and total time each NWP has operated based on the status information. Here, the sum of the total time respective DPPCs operated as copying machines is determined as the sum of the operation time of the copying machines in the network as a whole, and the sum of the total time respective DPPCs operated as printers and the total time respective NWPs operated as printers is determined as the sum of the operation time of the printers in the network as a whole.

The NW controller 100 performs a summation each time the status information indicating one copying job or printing job is completed, and performs an assignment to the DPPCs based on the ratio of the total operation time of the copying machines to the total operation time of the printers as a whole.

The process will be described in more details in reference to Table 3.

with a printing job, and the operation mode of the DPPC 4 cannot be switched. Therefore, in this state, only the DPPCs 1, 2, 3 and 5 are assigned to be copying machines, and the assignment of the DPPC 4 as a printer is maintained.

It is assumed here that a summation is performed again and an nth assignment is made upon completing the printing job of the DPPC 4 after a certain additional time has passed. As a result of summation, if an appropriate ratio in number of the copying machines to the printers is 5 to 2, as the operation mode of the DPPC 4 is switchable to the copying mode, the NW controller 100 assigns all of the DPPC 1 through DPPC 5 as copying machines.

TABLE 3

|  | DPPC 1 | DPPC 2 | DPPC 3 | DPPC 4 | DPPC 5 | NWP 11 | NWP 12 | TOTAL TIME PPC OPERATED (min.) | TOTAL TIME NWP OPERATED (min.) | RATIO |
|---|---|---|---|---|---|---|---|---|---|---|
| PREVIOUS ASSIGNMENT | PPC | PPC | PPC | NWP | PPC | NWP | NWP | 35 | 20 | 4:3 |
| STATE AT A TIME OF SUMMATION | WAIT STATE | BUSY STATE | BUSY STATE | BUSY STATE | BUSY STATE | BUSY STATE | WAIT STATE | — | — | — |
| CURRENT ASSIGNMENT | PPC | PPC | PPC | NWP | PPC | NWP | NWP | 40 | 20 | 5:2 |
| . | . | . | . | . | . | . | . | . | . | . |
| . | . | . | . | . | . | . | . | . | . | . |
| . | . | . | . | . | . | . | . | . | . | . |
| Nth ASSIGNMENT | PPC | PPC | PPC | PPC | PPC | NWP | NWP | 60 | 25 | 5:2 |

In Table 3, the state of assignment of each DPPC, etc., upon completing a previous one job of a copying job or a printing job is shown under "previous assignment". As shown under "previous assignment", it is assumed here that the total time the copying job processed (shown under the item "operation time of PPC") to be 35 minutes, and the total time the printing job processed (shown under the item "operation time of NWP") to be 20 minutes in the network as a whole.

Then, the NW controller 100 converts the resulting time ratio into the internal ratio in the internal ratio of the total number of DPPCs and NWPs, i.e., 7, and is round off. As a result, an appropriate integral ratio of 4:3 is obtained.

Based on the result, the NW controller 100 assigns DPPCs 1, 2, 3 and 5 to be copying machines (shown as PPC in the table), and assigns the DPPC 4 as a printer (designated as NWP in the table). Here, the NWPs 11 and 12 are always used as printers.

It is assumed here that the DPPC 1 completes the assigned copying operation after a certain time elapsed from the previous assignment. Then, the NW controller 100 performs the summing operation again upon detecting that the copying job is completed based on the status information from the DPPC 1. As shown under the item "current assignment" in Table 3, total time the copying job processed (shown under the column of "operation time of PPC") be 40 minutes, and the total time the printing job processed (shown under the column of "operation time of NWP") be 20 minutes in the network as a whole.

As a result, an appropriate ratio in number of the copying machines to the number of printers is 5 to 2. Therefore, it is desirable to assign all of the five DPPC 1 through DPPC 5 to the copying machines. However, the DPPC 4 that should be switched to the copying machine in this state is still busy Here, a timing of performing a summation of total time respective jobs processed in the copying machines and the printers may be set as desired in consideration of state of use of the network, etc. For example, the summation may be performed by counting the operation time from since the network is driven, or at every Monday, or beginning of a month, or first business day of a year, etc.

Next, the above-mentioned assigning process (4) will be described in reference to Table 4.

In this process, the NW controller 100 stores total time each DPPC operated as a copying machine and a printer and total time each NWP operated in its internal memory. Based on an internal timer in the NW controller 100, the program of summing the total time is executed every one hour, and assignment is made to each DPPC based on the result of summation.

The described program is for computing the sum of the operation time of each DPPC as a copying machine. The resulting time is determined as a total operation time of the copying machines in the network as a whole. Similarly, the sum of the total time of respective DPPCs operated as printers and a total time the respective NWPs operated are determined to be a total operation time of printers in the network as a whole.

TABLE 4

| TIME | DPPC 1 | DPPC 2 | DPPC 3 | DPPC 4 | DPPC 5 | NWP 11 | NWP 12 | USED TIME OF PPC | USED TIME OF NWP | RATIO |
|---|---|---|---|---|---|---|---|---|---|---|
| 9:00 | PPC WAIT STATE | PPC BUSY STATE | PPC BUSY STATE | NWP BUSY STATE | PPC BUSY STATE | NWP BUSY STATE | NWP WAIT STATE | 210 — | 90 — | 5:2 — |
| 9:05 | PPC | PPC | PPC | PPC | PPC | NWP | NWP | — | — | — |
| 10:00 | PPC | PPC | PPC | PPC | PPC | NWP | NWP | 230 | 120 | 5:2 |
| 11:00 | PPC | PPC | PPC | NWP | PPC | NWP | NWP | 200 | 140 | 4:3 |

As shown in Table 4, as a result of combining the sum into total by the program at 9 o'clock, it is assumed here that the respective total operation time of the copying machine and the printer in one hour from 8 o'clock to 9 o'clock to be 210 minutes and 90 minuets. Then, the time ratio of these total operation time is converted into the internal ratio in total number of DPPCs and NWPs in the network as in the described manner. As a result, an approximate integral ratio of 5 to 2 is obtained. Namely, it is preferable to assign all the DPPCs 1 through 5 to copying machines on the network.

However, at this stage, the DPPC 4 to be switched to be assigned to the copying machine is being operated as a printer. Thus, an operation mode of the DPPC 4 cannot be switched, and the DPPC 4 will be switched later at a time of completing the printing job in execution. Namely, at five passed nine upon completing a printing job, the DPPC 4 is switched to the copying machine.

At 10 o'clock, the program is executed again, and the summation is performed again. As a result of executing the program, it is assumed that the respective total operation times as the copying machine and the printer of 230 minutes and 120 minutes are given. Then, the ratio of these operation time is converted into an internal ratio in total numbers of the DPPCs and NWPs in the network. As a result, an approximate integral ratio of 5 to 2 is given. Thus, the state where all of the DPPC 1 through the DPPC 5 are assigned as the copying machines is maintained.

Furthermore, as a result of summation executed at 11 o'clock, as shown in Table 4, the total operation time of the copying machine and the total operation time of the printer are respectively 200 minutes and 140 minutes. The resulting time ratio is converted into the internal ratio of 7. As a result, an approximate integral ratio of 4 to 3 is obtained. Therefore, it is required to switch any one of the DPPC 1 through the DPPC 5 to be assigned as the printer.

In this state, for the DPPC to be switched to be assigned to the printer, the DPPC which performed copying job least amount of time within the last one hour is selected. If a plurality of such DPPCs exist, the respective total operation time as the copying machine within the second last one hour are compared, and the one which performed the least amount of time as the copying machine would be selected. In case, there still exist a plurality of such DPPCs, the DPPC to be switched to be assigned to the printer would be selected according to the prescribed priority order.

The above explanations have been given through the case where summation of the total operation time and the assignment of DPPCs are performed at every one hour. However, such time interval is not limited to one hour, for example, may be performed at an interval of 30 minutes, a half a day, one day, one week, one month, a year, etc., as desired in consideration of a scale of the network, various conditions in state of use, etc.

The described assigning process of the DPPCs wherein total time of use is accumulated at a predetermined time interval may be arranged so that the lower limit in number of the respective DPPCs to be assigned as the copying machine and the printer is set so that the assignment is made so that the respective numbers of devices to be assigned as the copying machines and the printers are equal to or greater than the prescribed lower limits.

For example, it is assumed here that as a result of accumulation of total time executed at 9 o'clock, the respective total time of use of the copying machine and the total time of use of the printer are 5 minutes and 90 minutes as shown in Table 5. Here, the ratio of these total time of use is converted into the internal ratio of 7, i.e., the total number of the DPPCs and NWPs. As a result, an approximate integral ratio of 0 to 7 is obtained. The result indicates that it is desirable to assign all of the DPPCs as the printers.

TABLE 5

| TIME | DPPC 1 | DPPC 2 | DPPC 3 | DPPC 4 | DPPC 5 | NWP 11 | NWP 12 | USED TIMES PPC USED | USED TIMES NWP USED | RATIO |
|---|---|---|---|---|---|---|---|---|---|---|
| 9:00 | PPC BUSY STATE | NWP BUSY STATE | NWP BUSY STATE | NWP BUSY STATE | PPC BUSY STATE | NWP BUSY STATE | NWP WAIT STATE | 5 — | 90 — | 0:7 — |
| 9:05 | PPC | NWP | NWP | NWP | NWP | NWP | NWP | — | — | — |
| 10:00 | PPC | NWP | NWP | NWP | PPC | NWP | NWP | 40 | 120 | 2:5 |

However, if all the DPPCs are assigned for the printer, since there exist no DPPC available as the copying machine, the user who desires to perform a copying job would suffer inconveniences. To eliminate such inconvenience, the lower limit in number of the DPPC to be assigned for the printer is set to 1 beforehand.

According to the described arrangement, even if the ratio in assigned number of the copying machine and the printer were 0 to 7, the NW controller 100 would reserve one of the DPPCs 1 through 5 for the copying machine, and assigns the rest of the DPPC 1 through DPPC 5 as printers. Namely, as shown in Table 5, in the case where at 9 o'clock, the DPPC 1 and the DPPC 5 are assigned for the copying machines, and the DPPC 2 through the DPPC 4 are assigned to the printer, when the DPPC 5 completes the copying operation at five passed nine, the NW controller 100 switches the DPPC 5 to be assigned to the printer. As a result, there exist one copying machine and six printers in the network.

The assigning process in consideration of the prescribed lower limits will be explained in detail in reference to the flowchart of FIG. 7 through FIG. 10.

First, based on the flowchart of FIG. 7, the summation and assignment by the NW controller 100 will be explained. Here, the summation and the assignment is to be carried out discontinuously when necessary during the continuous operation by the NW controller 100 started since when the operation of the network is started. Therefore, in each flowchart, the summing process and the assigning process are described in sub-routine. In each flowchart, after the "return" indicating the completion of these precesses, a sequence goes back to the process executed continuously by the NW controller 100 (hereinafter referred to as a main routine. This is effective also in the below-mentioned embodiments.

The NW controller 100 determines whether or not it is the time for summing the total time the copying machine and the printing device operated based on the self-contained timer (step 1 hereinafter referred to as S1). If so, the summation of the respective total operation time is performed (S2). Based on the resulting total time, the respective number of printers and the copying machines are determined (S3). Furthermore, it is ensured that the number of printers (NWP) determined in S3 is equal to or greater than the prescribed lower limit in the number of printers (S4). If the number is smaller than the prescribed lower limit, the number of printers is adjusted to be equal to or greater than the lower limit (S5). On the other hand, if the number of the printers determined in S3 is equal to or greater than the prescribed lower limit, the sequence goes to the next step.

Thereafter, it is checked to make sure that the number of the copying machines (PPC) determined in S3 is equal to or greater than the prescribed lower limit in number of the copying machines (S6). If the number of the copying machines (PPC) is smaller than the prescribed lower limit, the number of the copying machines is adjusted so as not to be smaller than the lower limit (S7). Otherwise, the sequence goes onto the next step of S8.

Figure 9:
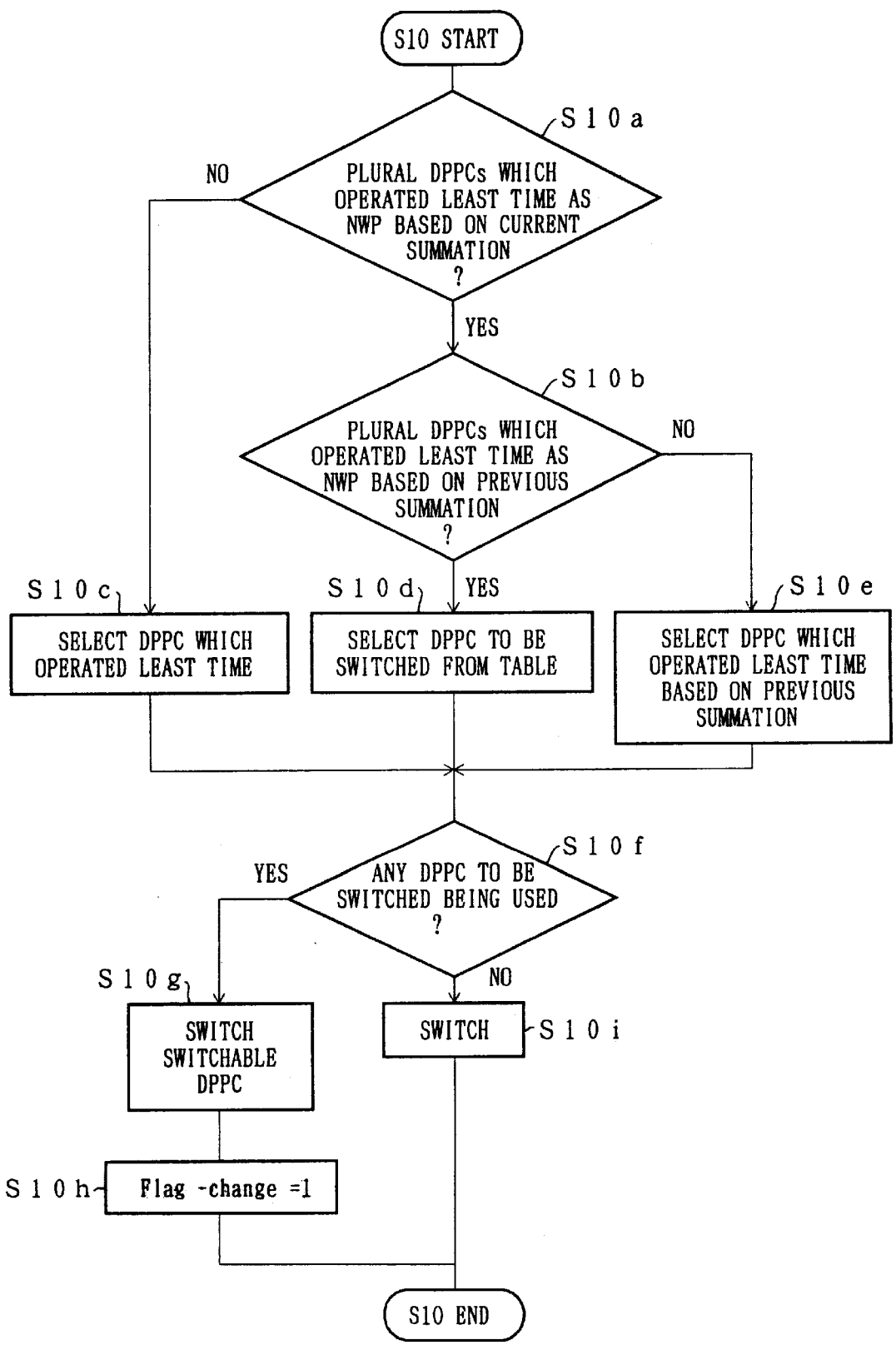
FIG. 9 is a flowchart explaining a process in step 10 of the flowchart of FIG. 7 in more detail.

In S8, it is determined whether or not the DPPC is switched to be assigned from the printer to the copying machine (S8). When carrying out such switching operation, the NW controller 100 selects the DPPC to be switched to be assigned as the copying machine and switches the selected DPPC (S10). As shown in FIG. 9, the described step 10 is further divided into plural steps as will be described later.

On the other hand, when such switching is not carried out, it is determined whether or not any DPPC is switched to be assigned from the copying machine to the printer (S9). When carrying out such switching, the NW controller 100 selects the DPPC to be switched to be assigned as the printer (S11). As will be described later, the described S11 is also divided into plural steps like the aforementioned step 10. When completing the process in S10 and S11, the assigning process is completed, and the control of the NW controller goes back to the main routine.

The process in S10 will be described in detail in reference to the flowchart of FIG. 9.

Based on the result of last summation of the total operation time of the job, it is determined whether or not there exist a plurality of DPPCs which have processed the printing job for the least amount time (S10a). If NO, i.e., if there exits only one DPPC, the DPPC which have processed the printing job for the least amount of time is determined as the DPPC to be switched to be assigned as the copying machine (S10c).

On the other hand, if there exist a plurality of DPPCs, it is determined whether or not there still exist a plurality of DPPCs which operated as printers least amount of time based on the summation with respect to the second last one hour (S10b). If NO in S10b, the DPPC which processed the printing job for the least amount of time is selected to be the DPPC to be switched to be assigned to the copying machine (S10e). On the other hand, if there still exists a plurality of such DPPCs as a result of comparison based on the second last summation, the DPPC to be switched is determined based on the Table (S10d). In this table, the priority order of the DPPCs in determining the DPPCs to be switched is stored beforehand.

Next, it is determined whether or not there exits any DPPC to be switched which is being used (S10f). If there exists any DPPC which is being executed, only the DPPCs which are not in the busy state are to be switched (S10g), and the flag-change indicating that the switching is not completed is set to 1 (S10h). Then, the sequence returns to the main routine. On the other hand, when it is determined that any of the DPPCs to be switched are not in the busy state, all of the DPPCs are switched (S10i).

Figure 10:
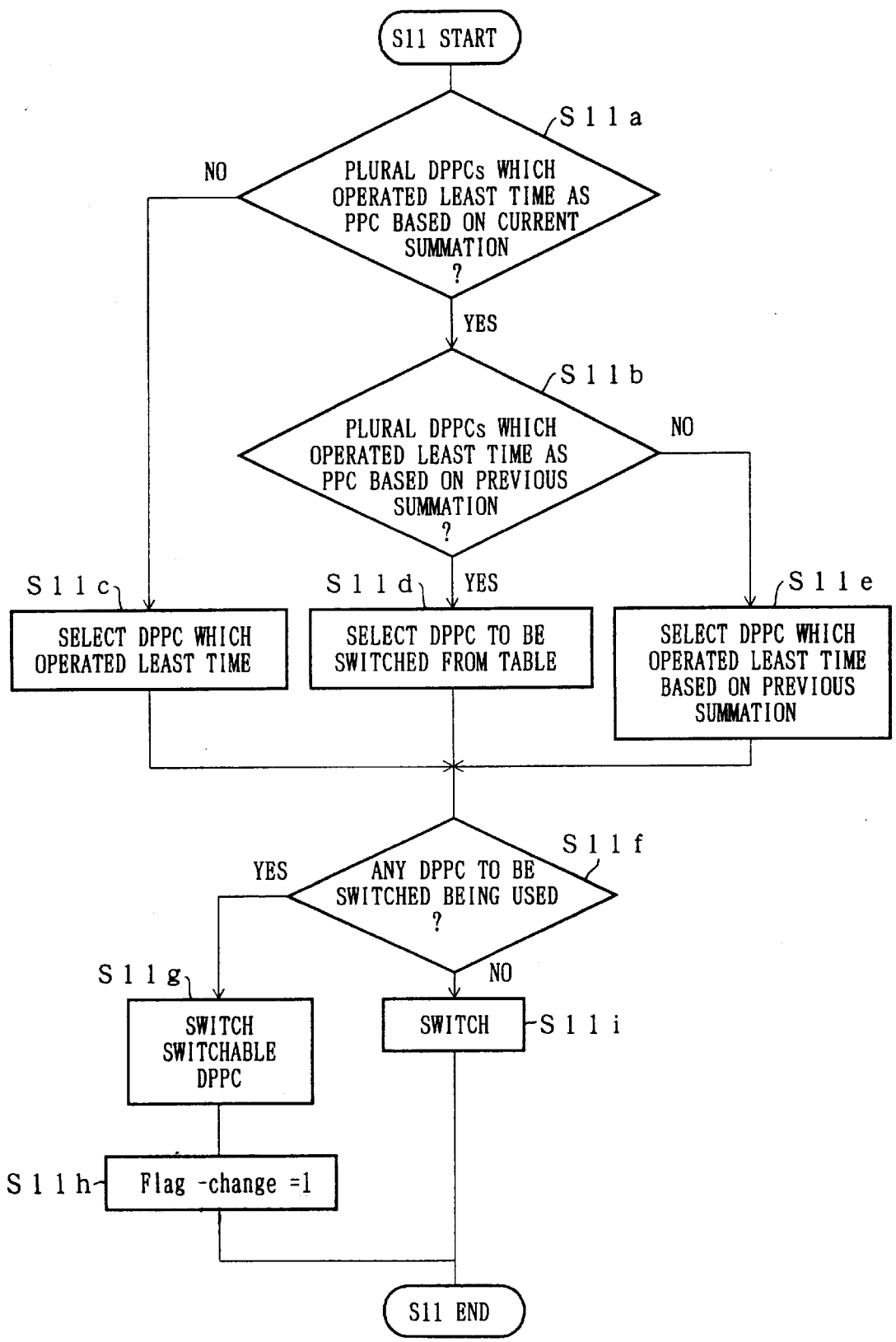
FIG. 10 is a flowchart explaining a process in step 11 of the flowchart of FIG. 7 in more detail.

Additionally, the process of determining the DPPCs to be switched to be assigned as the printer in S11 is shown in the flowchart of FIG. 10. The respective processes in S11a through S11i in the flowchart are the same of the process in S10a through S10i, and thus the descriptions thereof shall be omitted here.

Separately from the assigning process in S1 through S11, the process of executing the NW controller 100 as subroutine in the main routine will be explained in reference to the flowchart of FIG. 8.

First, it is determined whether or not the flag-change is set (S 12). If so, it is determined whether or not the DPPC completed an assigned copying or printing job and is set in the wait state (S13). Here, if so, the switching of the DPPC is executed (S14). Additionally, if the flag is not set in S12, the sequence returns to the main routine.

Figure 7:
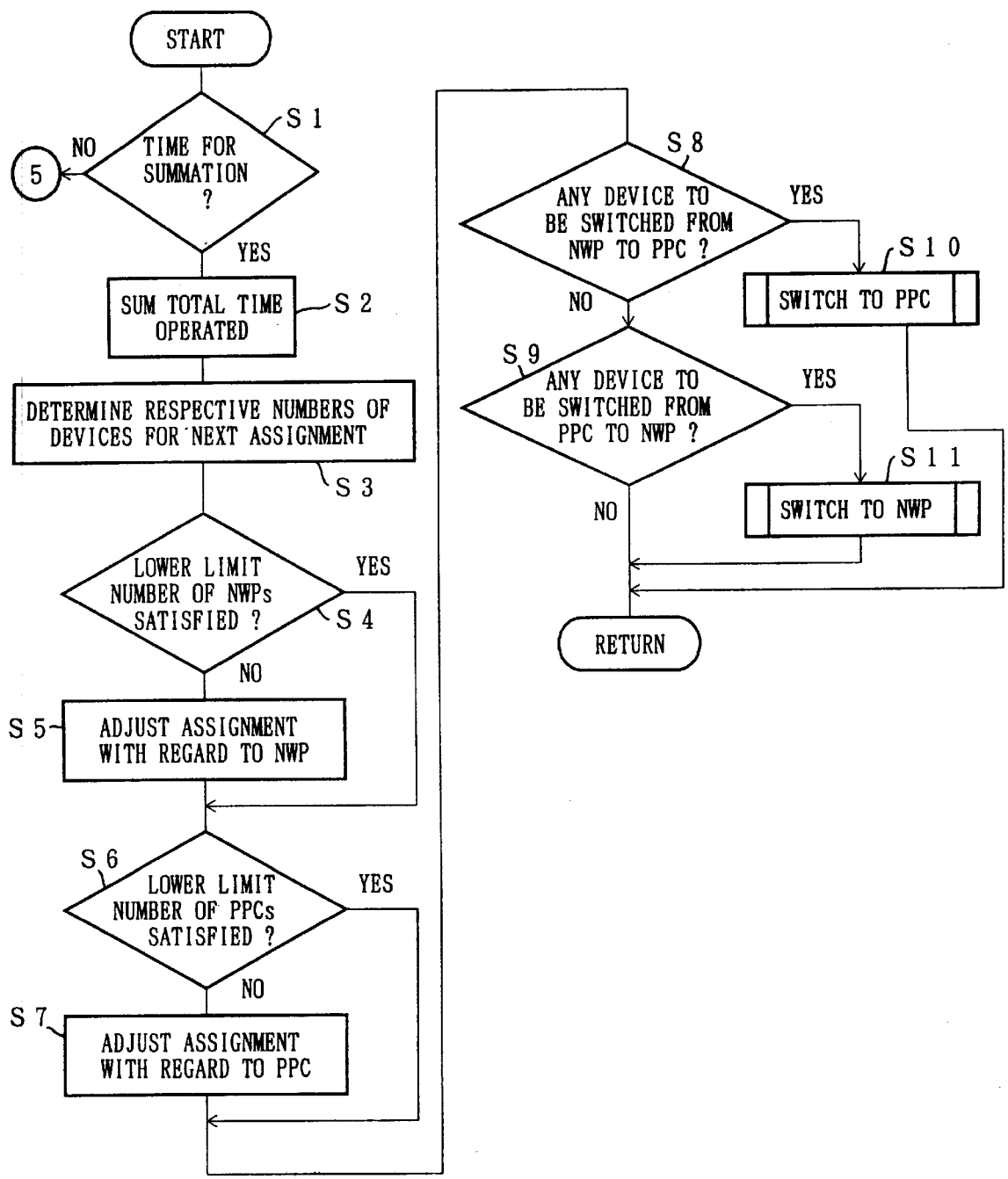
FIG. 7 is a flowchart showing a part of an assigning process to be executed by the NW controller.
Figure 8:
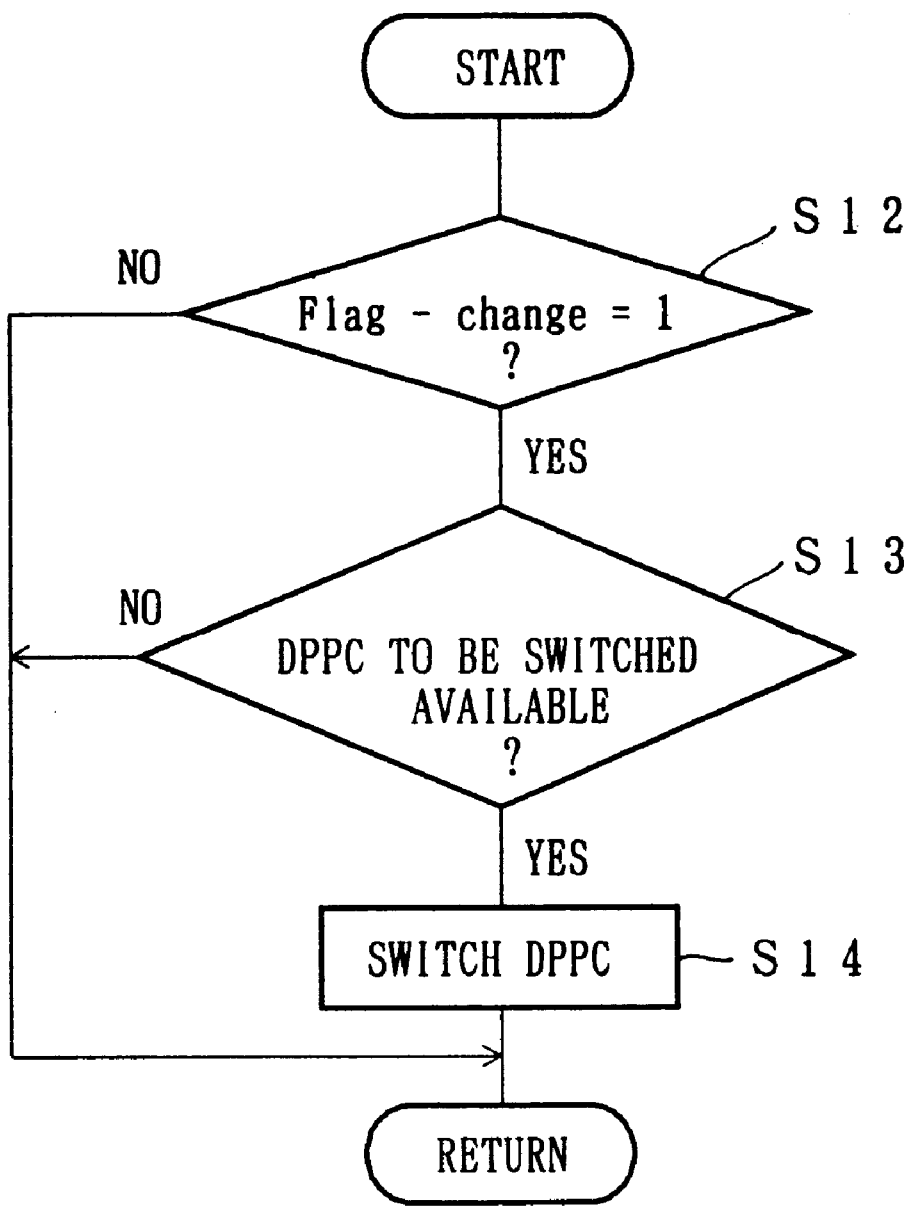
FIG. 8 is a flowchart showing another part of the assigning process.

The NW controller 100 executes two processes shown in FIG. 7 and FIG. 8 regularly in the main routine.

As described, by setting the respective lower limits in the number of devices to be assigned as the copying machines and the printers beforehand, and assigning so as not to be less than the lower limits, an appropriate assignment according to the state of use can be performed while ensuring the respective minimum available number of the copying machines and the printers. Additionally, the described lower limits are not limited to one, and can be altered to be appropriate numbers as desired by the network administrator for controlling the network in consideration of the size of the network and the state of use, etc.

In the described network for executing the assignment, it may be arranged so as to include a display device for displaying the respective states of use of the DPPC 1 through DPPC 5 to inform the user. The screen of the display device may be composed of, for example, a liquid crystal panel.

Figure 6:
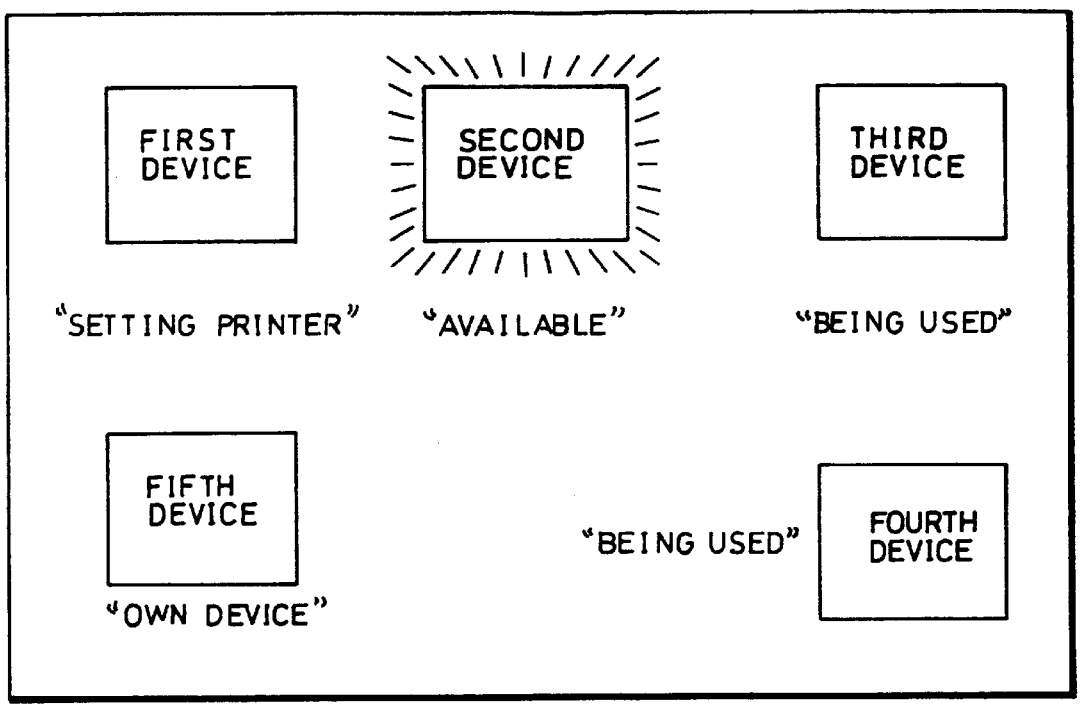
FIG. 6 is an explanatory view showing one display example of a display screen formed on an operation panel provided in the DPPC.

For example, it is assumed here that the DPPCs 1, 2, 3, 4 and 5 are respectively designated by "first device", "second device", "third device", "fourth device" and "fifth device", and the DPPC 1 is assigned as a printer under the control of the NW controller 100. FIG. 6 shows an example of the displayed screen equipped with the display device of the DPPC 5. In the screen, rectangular symbols including the name of each DPPC are arranged roughly according to the relative position among the DPPC 1 through DPPC 5.

The symbol of the fifth device (own device) corresponding to the DPPC 5 is displayed in such a manner that the user can distinguish it from those of other devices with ease and recognizes the fifth device is the currently observing device at a glance by circling them with thick line or by displaying them in a special color. Under the symbol of the DPPC 1, a message indicating that the DPPC 1 is assigned as be a printer is displayed, for example, as "printing".

If, for example, the DPPC 3 and the DPPC 4 are being used as copying machines by another user, as shown in the figure, the message "being used" is shown under the symbol. Here, the DPPC 2 is assigned as the copying machine, and if the DPPC 2 is not being used and in a wait state, the symbol of the DPPC 2 flashes to inform the user that the DPPC 2 is available to be assigned as the copying machine.

As described, by providing display devices indicating the respective states of use of other DPPCs, the user can recognize the available DPPCs. Based on this displayed information, the assignment of each DPPC can be automatically made by the NW controller 100, and for example, when the user arrives at the installation place of the DPPC to perform a copying operation, even if the DPPC is assigned as the printer, and the copying operation cannot be performed in the DPPC, the user can find other DPPCs which are available as copying machine. As a result, the burden of the user such as wasting time in looking for any available DPPC can be reduced.

In the present embodiment, the control of the assignment of the DPPCs have been explained through an example of the network wherein five DPPCs which are switchable between the copying mode and the printing mode and two NWPs that are dedicated to printer (seven devices in total) are connected. However, the arrangement of the network of the present invention is not limited to the described arrangement. For example, the same control can be performed even in the network wherein a greater number of DPPCs and NWPs are connected. Furthermore, it is not necessarily that all the DPPCs in the network are switchable, and for example, it may be arranged such that some DPPCs may be used only as copying machines or printers, and the rest of the DPPCs are switchable.

[Second Embodiment]

Figure 11:
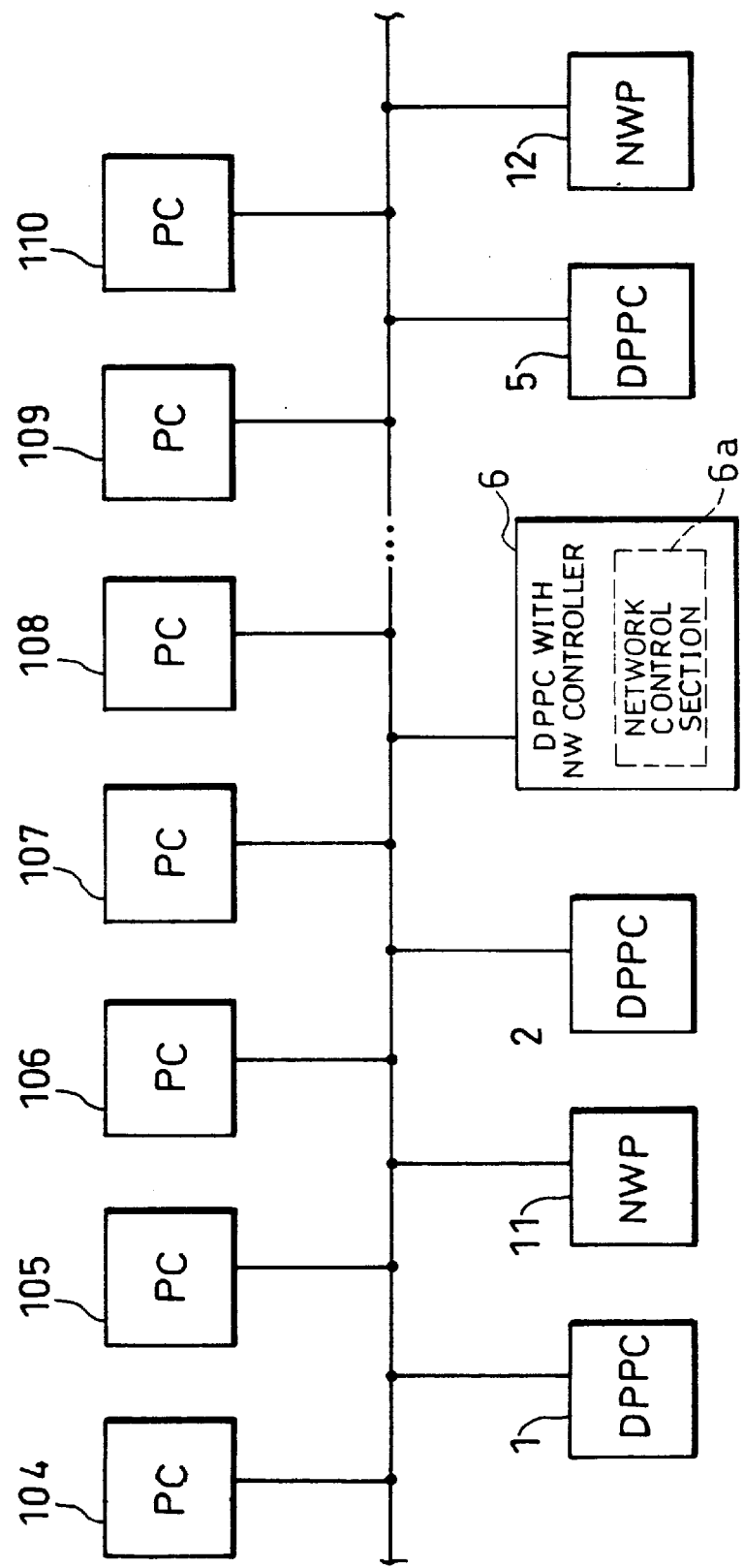
FIG. 11 is a block diagram showing a structure of a network in accordance with another embodiment of the present invention.
Figure 12:
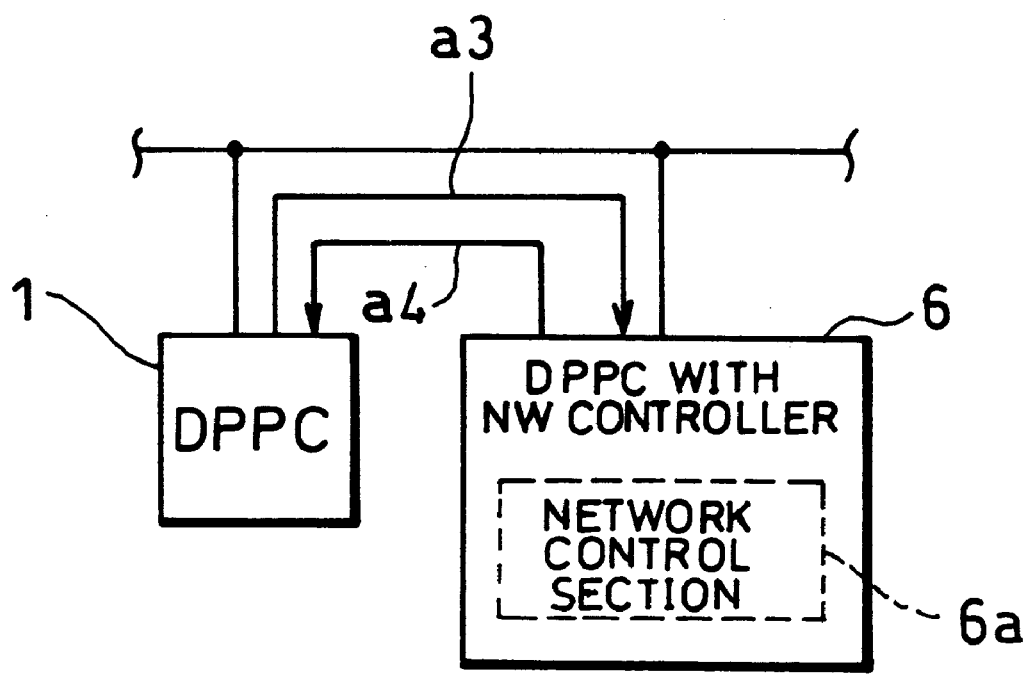
FIG. 12 is a typical depiction showing a path of transferring control information among DPPCs in the network.

The following descriptions will discuss another embodiment of the present invention in reference to FIG. 11 and FIG. 12. For convenience in explanations, members having the same function as the first embodiment will be designated by the same reference numerals, and thus the descriptions thereof shall be omitted here.

As shown in FIG. 11, a network in accordance with the present embodiment includes a DPPC 6 with NW controller which stores therein a network control section 6a (print output control device) having the same function as the NW controller 100 is adopted in replace of the NW controller 100 provided in the network shown in FIG. 1 of the previous embodiment.

Namely, as shown in FIG. 11, the network in accordance with the present embodiment includes PC 104 through PC 110, and DPPC 1 through DPPC 3, the DPPCs 5 and 6 with NW controller, and NWPs 11 and 12.

In the described network, status information are sent to the DPPC 6 with NW controller respectively from the DPPCs 1, 2, 3 and 5 and the NWPs 11 and 12. The DPPC 6 with NW controller has an internal memory for storing the status information.

FIG. 12 shows the flow of data between the DPPCs 1, 2, 3 and 5 and the NWPs 11 and 12, and the DPPC 6 with NW controller using the DPPC 1 as an example. As indicated by an arrow a3 in the figure, the DPPC 6 with NW controller receives status information from respective DPPCs and NWPs. The status information is sent to the network control section 6a. The network control section 6a recognizes the operation state of the entire network based on the status information, and controls the entire network by sending a control signal to each of the DPPCs and NWPs as indicated by an arrow a4 in the figure.

The control operation by the network control section 6a is the same as the control operation by the NW controller 100 explained in the first embodiment. Thus, the descriptions thereof shall be omitted here.

As described, since the network in accordance with present embodiment is arranged such that the network control section 6a for controlling the entire network is provided in only one of the DPPCs, a space for installing the cabinet of the NW controller that is required in the arrangement of the first embodiment can be emitted, thereby permitting a space required for the network to be reduced.

[Third Embodiment]

Figure 13:
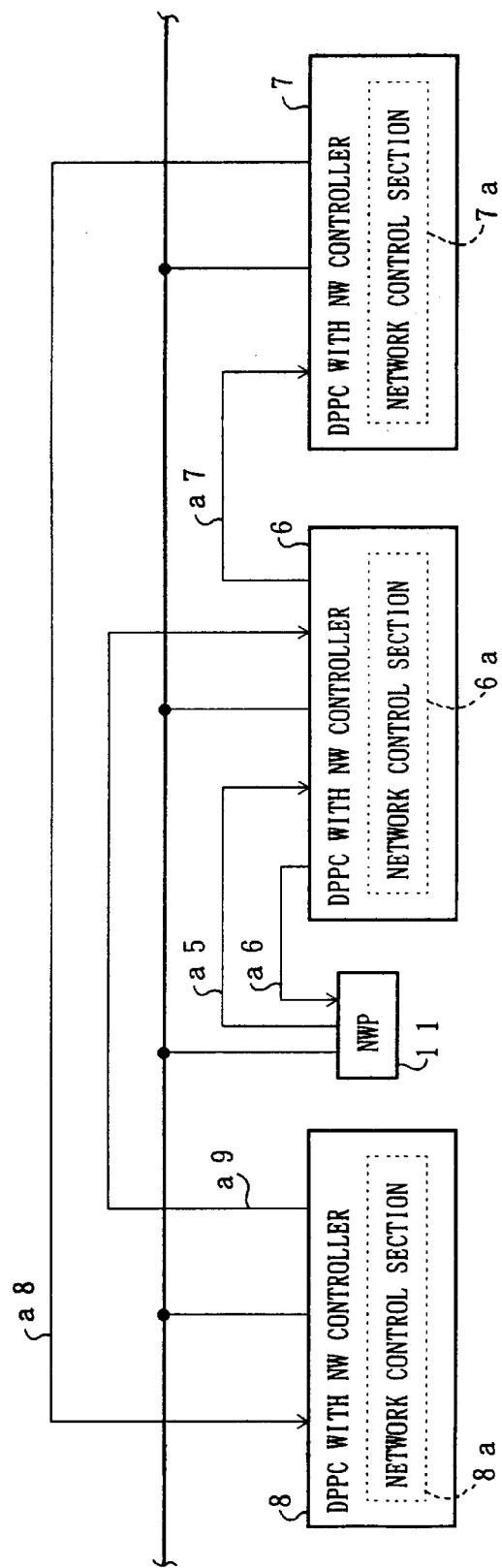
FIG. 13 is a block diagram illustrating a structure of the network and a path of transferring control information in the network in accordance with a still another embodiment of the present invention.
Figure 14:
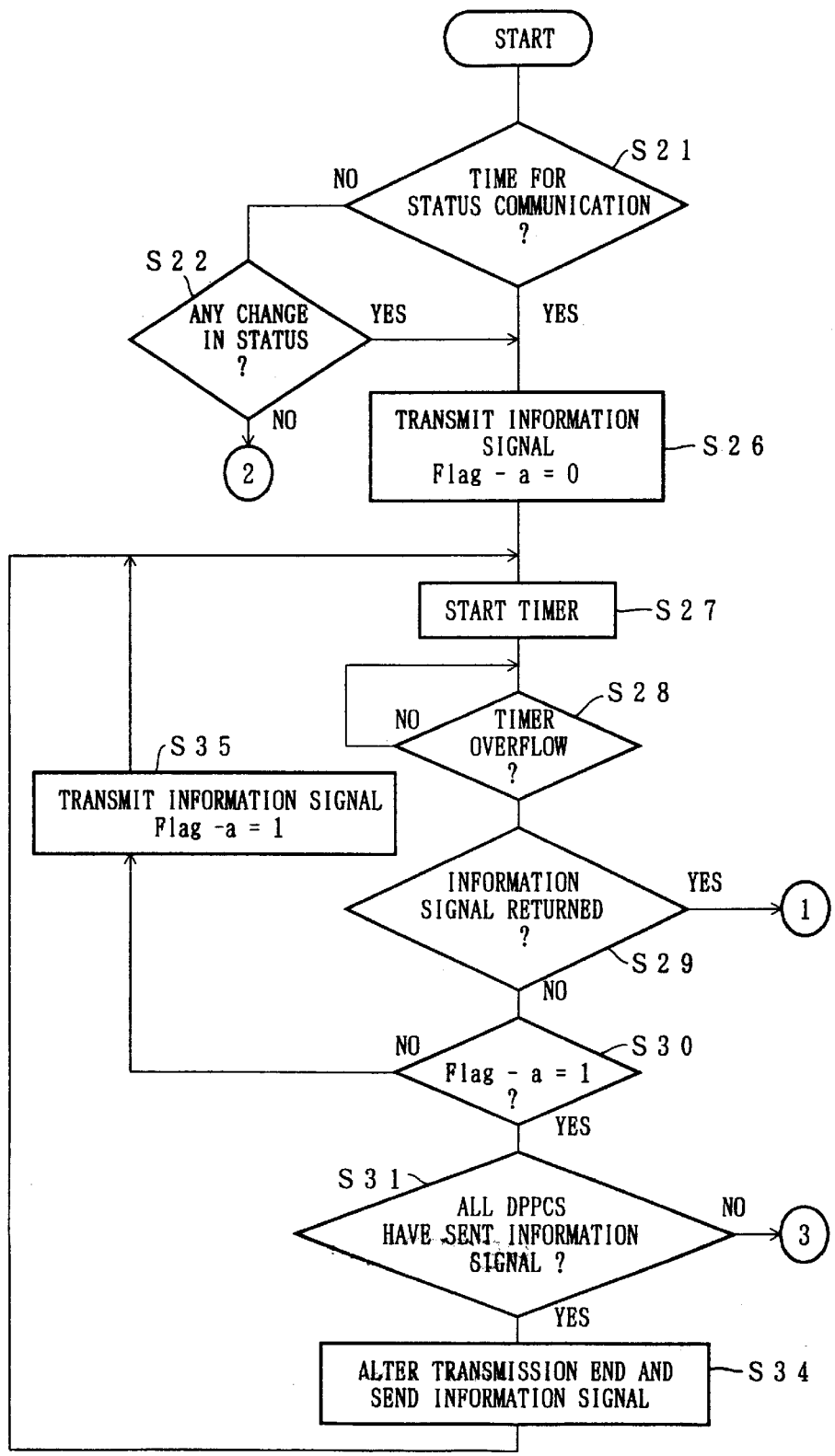
FIG. 14 is a flowchart showing a process of supervising control to be executed by the NW control section provided in the network.
Figure 15:
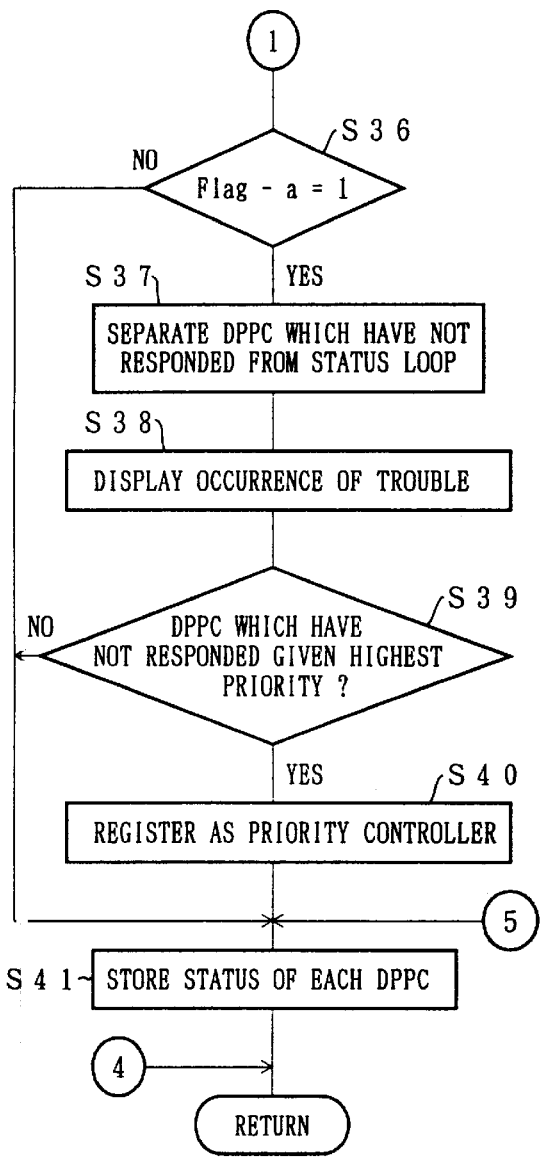
FIG. 15(a) through FIG. 15(c) are flowcharts respectively showing parts of the supervising control process.
Figure 15:
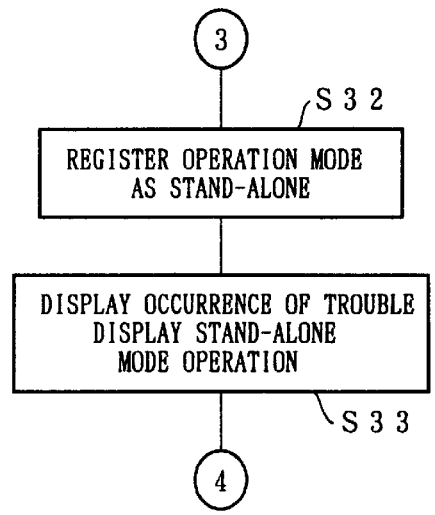
Figure 15:
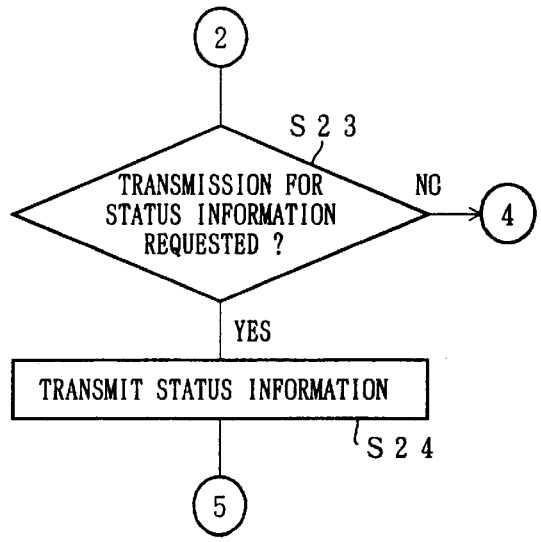

The following descriptions will discuss still another embodiment of the present invention in reference to FIG. 13 through FIG. 15. For convenience in explanations, members having the same function as the aforementioned embodiments will be designated by the same reference numerals, and thus the descriptions thereof shall be omitted here.

As shown in FIG. 13, the network in accordance with the present embodiment includes three DPPC 6 through DPPC 8 with NW controller, plural PCs (not shown) and an NWP 11 which are mutually connected. Further, the DPPC 6 through DPPC 8 with NW controller respectively include network control sections 6a through 8a (print output control device) having the same function as the NW controller 100 adopted in the first embodiment.

For explanations, it is assumed here that at present, the network control section 6a provided in the DPPC 6 with NW controller is given a priority to control the entire network over other network control sections. Namely, communication of a control signal among the PCs, the DPPCs and the NWP is controlled by the DPPC 6 with NW controller. Here, a priority order of the DPPC 6 through DPPC 8 with NW controller as the NW controller is determined beforehand in this order. However, it is permitted to change the priority order by the network administrator when necessary.

The respective transport paths for a control signal, etc., among the DPPCs are indicated by arrows a5 through a9 in FIG. 13. Specifically, the arrow a5 indicates a transfer path for the status information from the NWP 11 to the DPPC 6 with NW controller, and the arrow a6 indicates a transfer path for a print signal from the DPPC 6 with NW controller to the NWP 11. A communication of a print request signal and a print request status signal is carried out between the DPPC 6 with NW controller and the PC (not shown).

Additionally, among the DPPC 6 through the DPPC 8 with NW controller, a control signal is transferred in a loop, specifically, from the DPPC 6 with NW controller to the DPPC 7 with NW controller as indicated by arrow a7, from the DPPC 7 with NW controller to the DPPC 8 with NW controller as indicated by the arrow a8 and from the DPPC 8 with NW controller to the DPPC 6 with NW controller as indicated by the arrow a9.

As described, among the DPPC 6 through the DPPC 8 with NW controller, the control signal is transferred in the loop, and all the status information of the printing devices in the network and the information regarding the PC which outputs a print request are used in common within the loop, and the print signal with respect to the DPPC is also transferred in the loop. The described transfer of the signals in the loop is carried out when a print request is given, or the status of any of the printing devices in the network has changed, or may be performed at a prescribed internal, for example, at every 3 minutes.

Next, an operation of each device in the network to be executed when the communication error due to a trouble occurred in the DPPC 6 with NW controller will be explained. For explanations, it is assumed here that the DPPC 7 with NW controller did not received the control signal that should have been transferred from the DPPC 6 with NW controller within the prescribed time interval, and the DPPC 7 sends a signal indicative of this abnormality condition to the DPPC 8 with NW controller as shown by arrow a8. As the described transfer of the control signal is carried out in a very short period of time under normal conditions, the control signal which made one cycle of the loop should have been returned to the DPPC 7 with NW controller immediately. However, in the described situation, as the transmission from the DPPC 6 with NW controller is not permitted, the DPPC 7 with NW controller determines that a trouble has occurred in the DPPC 6 with NW controller, and adds this information to the control signal to be sent to the DPPC 8 with NW controller.

Upon receiving information from the DPPC 7 with NW controller, the DPPC 8 with NW controller recognizes the occurrence of trouble in the DPPC 6 with NW controller, and sends back the control signal to the DPPC 7 with NW controller through a path (not shown). As a result, the DPPC 7 with NW controller recognizes that the DPPC 8 with NW control operates properly, and the trouble has occurred in the DPPC 6 with NW controller.

Here, if the DPPC 7 with NW controller is given a priority as the NW controller over the DPPC 8 with NW controller, the DPPC 7 with NW controller communicates with the NWP 11 and the PC instead of the DPPC 6 with NW controller after the occurrence of trouble in the DPPC 6 is recognized. On the contrary, if the DPPC 8 with NW controller is given a priority as the NW controller over the DPPC 7 with NW controller, information indicative of the occurrence of trouble in the DPPC 6 with NW controller is transferred from the DPPC 7 with NW controller to the DPPC 8 with NW controller through a path shown by arrow a8. Thereafter, the DPPC 8 with NW controller communicates with the NWP 11 and the PC instead of the DPPC 6 with NW controller.

The flow of the process of confirming the respective statuses of the DPPCs with NW controller among them and the observation control process for switching the main NW controller when recognizing an occurrence of trouble in any of the DPPCs with NW controller will be explained in reference to FIG. 14, and FIG. 15(*a*) through FIG. 15(*c*).

First, it is determined whether or not it is a time for communicating the status information (S21). If not, it is determined whether or not any change in status has occurred (S22). If not in S22, the sequence goes on to S23 in the flowchart shown in FIG. 15(*c*), and it is determined whether or not a transmission request for the status information is given (S23). If so, the status information is sent to the DPPC of the transmission end of the loop as a control signal (S24), and the status information is stored in the internal memory (S41). Thereafter, the sequence goes back to the main routine.

On the other hand, if it is determined in S22 that any change in status has occurred, the status information is sent as a control signal, and a Flag-a is cleared (S26). Next, a time required for one cycle of the loop of the DPPCs in the network is set in the timer (S27). The time to be set in the timer may be altered to be an appropriate time as desired in consideration of the number of DPPCs connected to the network, how crowded is the communication line which form the loop of the DPPCs, etc. Then, it is waited for the time-out period set in the timer to end (S28), and thereafter, it is checked whether or not the status information has transferred in one cycle of the loop of the DPPCs (S29).

If it is determined that the status information has returned as the control signal in S29, the sequence moves to S36 of the flowchart shown in FIG. 15(*a*). On the other hand, if it is determined that the status information has not returned, the flag is checked (S30). If it is determined that the flag is not set, the status information is sent again, and the flag is set (S35). Thereafter, the sequence goes back to S27. On the other hand, if the flag is already set, it is checked whether or not all of the DPPCs have sent the control signal (S31). If not in S31, the sequence goes to S32 of the flowchart of FIG. 15(*b*), and the operation mode of the device is set to the stand-alone mode (S32) and informs the user by means of display means (not shown) that a trouble has occurred in other DPPC or the connection of the network (S33).

On the other hand, if it is determined in S31 that all of the DPPCs have sent the control signal, the transmission end is altered, and the information signal is sent to the newly designated transmission end (S34). Thereafter, the sequence goes back to S27.

Here, the process in S36 through S41 in the flowchart of FIG. 15(*a*) will be explained. As described, the process is executed when it is determined that the status information has returned in S29.

First, the flag is checked. If the flag is not set, the sequence goes to S41 to store the status of each DPPC. Thereafter, the sequence goes back to the main routine. On the other hand, if the flag is already set, the DPPC of the response failure is separated from the loop (S37). Then, the user is informed that the DPPC of response failure is in trouble by means of the display means (not shown) (S38). Furthermore, the priority of the own device among the DPPCs which have responded to the transmitted control signal is checked (S39). If the DPPC is not given the highest priority, the sequence moves to S41. On the other hand, if the DPPC is given the highest priority, the own DPPC is registered as the NW controller of the highest priority and operates thereafter as the NW controller (S40). Then, the DPPC stores the status information in the memory in S41.

As described in the arrangement where communication of signal is performed among NW controllers respectively provided in the DPPCS, when the NW controller being used becomes in trouble, the operation of this NW controller is stopped, and another NW controller operates instead. In this way, an unable communication time caused by the trouble of the NW controller can be reduced to the minimum, and a prompt recovery from the system down of the network is permitted.

In the above preferred embodiment, explanations have been given through the case where the NW controller is stored in each DPPC. However, the arrangement where plural NW controllers provided separately from the DPPCs are connected to the network may be equally adopted.

[FOURTH EMBODIMENT]

Figure 16:
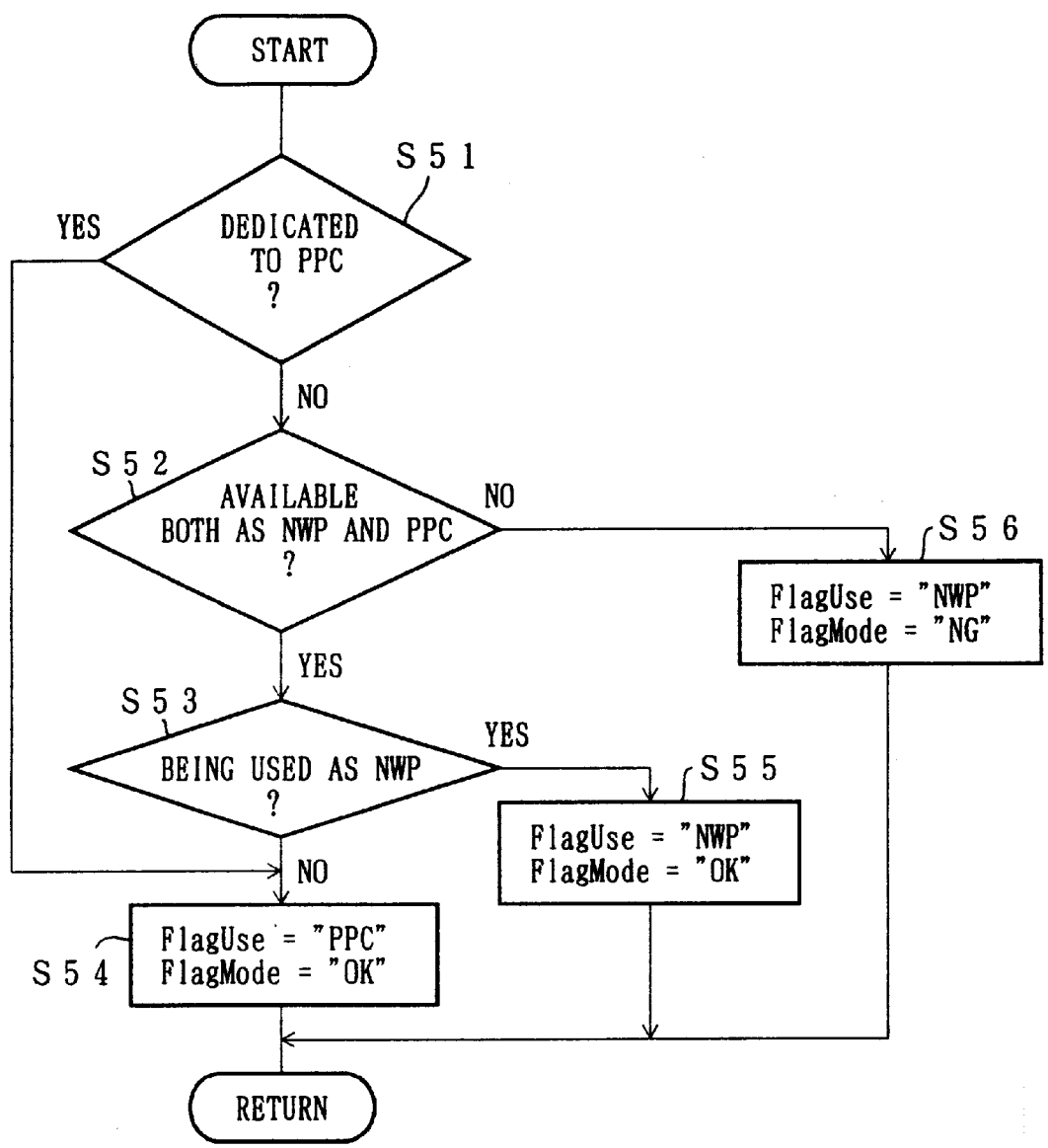
FIG. 16 is a flowchart showing a process of determining whether or not interruption of a copying job is allowed in a printing device in accordance with a still another embodiment of the present invention.

The following descriptions will discuss still another embodiment of the present invention in reference to FIG. 1 and FIG. 16. For convenience in explanations, members having the same function as the aforementioned embodiments will be designated by the same reference numerals, and thus the descriptions thereof shall be omitted here.

The structure of the network in accordance with the present embodiment is the same as the network of the first embodiment explained in reference to FIG. 1 except the following. In the present embodiment, DPPC 1 through DPPC 5 are divided into three groups: NWPs dedicated to printers, PPCs dedicated to copying machines, and common devices which are switchable between a printing mode and a copying mode.

To which group, each DPPC belongs is determined beforehand as setup information and is stored in an internal memory of the NW controller 100. When driving the network, the setup information is read from the memory and is transferred to each DPPC as instruction information. Then, each DPPC stores the setup information in its internal memory (not shown). The setup information stored in the internal memory of each DPPC is kept until the setup information is altered by the instruction information from the NW controller 100.

When assigning printing jobs to the NWPs and the common devices, the NW controller 100 may treat the NWPs and common devices to be of the same priority. Or it may be arranged such that the assignment can be altered as desired by a network administrator in consideration of the state of use of the network, etc., such that the DPPCs assigned to NWPs are given priority over the DPPCs assigned to common devices in processing the printing job, so that the printing job is not assigned to the common devices if possible to avoid.

The user can use both the PPCs and the common devices as a copying machine. In the case where the user selects the DPPC assigned as the common device to process the copying job, by pressing an interruption button on the operation panel (not shown), an interruption of the copying job is permitted at a partitioned part of the printing job.

The process of determining the interruption process to be executed by each DPPC will be explained in reference to the flowchart of FIG. 16.

When the user presses the interruption button of the DPPC connected to the network, first, it is determined whether or not the DPPC is assigned as the PPC (S51). If so, the sequence moves to S54. Then, the "PPC" indicating the DPPC is assigned as the PPC is set in the FlagUse, and "OK" indicating that interruption is permitted is set in the FlagMode. Then, the sequence goes back to the main routine.

On the other hand, if it is determined in S51 that the DPPC is not assigned as the PPC, it is determined whether or not the DPPC is assigned as the common device (S52). If not in S52, i.e., if the DPPC is determined to be the NWP, "NWP" indicating that the DPPC is assigned as the NWP is set in the FlagUse, and "NG" indicating interruption is not permitted is set in the FlagMode (S56). Then, the sequence goes back to the main routine.

If it is determined in S52 that the DPPC is the common device, it is determined whether or not the DPPC is being used as a printer (S53). If so, "NWP" is set in the FlagUse, and "OK" indicating that interruption is permitted is set in the FlagMode (S55). Thereafter, the sequence goes back to the main routine. On the other hand, if it is determined in S53 that the DPPC is not being used as a printer, the sequence moves to S54.

After setting the Flags in the described manner, while observing the set FlagMode, each DPPC displays a message indicating interruption is permitted by means of the display means when "OK" is set in the FlagMode, and allows the printing job to be interrupted in a partitioned part of the current printing job. The partitioned part of the current printing job indicates, for example, when one printing job is completed in the case of processing plural printing jobs.

As described, the DPPC in accordance with the present embodiment is arranged so as to determine whether or not the interruption of the copying job is permitted based on the current status of the DPPC, and accepts the printing job to be interrupted if it is in the enabled state for interruption. Namely, by arranging such that the DPPC is normally operated as the NWP, and when the interruption for the PPC is desired by the user, the DPPC operates as the PPC, each DPPC can be effectively used, thereby improving the operability of the process in the entire network.

[FIFTH EMBODIMENT]

The following descriptions will discuss still another embodiment of the present invention in reference to FIG. 1, FIG. 17 through FIG. 19. For convenience in explanations, members having the same function as the aforementioned embodiments will be designated by the same reference numerals, and thus the descriptions thereof shall be omitted here.

The structure of the network in accordance with the present embodiment is the same as the network of the first embodiment explained in reference to FIG. 1 except the following.

In the present embodiment, DPPC 1 through DPPC 5 are divided into three groups: dedicated NWPs for use as printers only, dedicated PPCs for use as copying machines only, and common devices which are switchable between a printing mode and a copying mode.

To which group each DPPC belongs is determined beforehand as setup information which is stored in an internal memory of the NW controller 100. When driving the network, the setup information is read from the memory and is transferred to each DPPC as instruction information. Each memory stores the setup information in its internal memory (not shown). The setup information stored in the internal memory of each DPPC is kept until the setup information is altered by the instruction information from the NW controller 100.

When assigning printing jobs to the dedicated NWPs and the common devices, the NW controller 100 may treat the dedicated NWPs and common devices are assigned the same priority. Or it may be arranged such that the assignment can be altered as desired by a network administrator in consideration of the state of use of the network, etc., such that DPPCs assigned to dedicated NWPs are given priority over the DPPCs assigned as common devices in processing the printing job, so that the printing job is not assigned to the common devices if possible to avoid.

The NW controller 100 stores in its internal memory the respective total time the dedicated PPCs, the dedicated NWPs and the common devices operated and also stores the lower limit number of DPPCs assigned as the dedicated PPCs and the lower limit number of the DPPCs assigned as the dedicated NWPs and the lower limit number of the DPPCs assigned as the common devices.

The NW controller 100 has a self-contained timer (not shown), and is arranged such that the program for summing the number of times each device is used is executed every hour using a timer and that a reassignment of the DPPCs is performed based on the results of summation.

Here, in reference to Table 6, the summation and assignment of the DPPCs performed by the NW controller 100 will be explained. Here, the summation of the total operation time and the ratio of assigned number of the DPPCs are calculated in the same manner as those shown in aforementioned embodiments, and thus the descriptions thereof shall be omitted here.

total time used of the dedicated PPCs, the dedicated NWPs and the common devices are 40 minutes, 120 minutes and 50 minutes. Here, the obtained ratio of the respective total time used is converted into the internal ratio of seven, and is approximated to the integral ratio. As a result, the ratio of 1:4:2 is given. In this case, the assignment of the DPPCs is made as follows: one dedicated PPC, four dedicated NWPs and two common devices.

Here, one of the five DPPCs assigned to the dedicated NWPs is switched to the common device. For the DPPC to be switched to the common device, the DPPC that has operated for the least time as the printer in the last one hour is selected. If a plurality of such DPPCs exist, the respective total operation time as the copying machine within the second last one hour are compared, and the one which had operated for the least time as the copying machine would be

TABLE 6

| TIME | DPPC 1 | DPPC 2 | DPPC 3 | DPPC 4 | DPPC 5 | NWP 11 | NWP 12 | USED TIME OF DEDICATED PPC (min.) | USED TIME OF DEDICATED NWP (min.) | USED TIME OF COMMON (min.) | RATIO |
|---|---|---|---|---|---|---|---|---|---|---|---|
| 9:00 | DEDICATED PPC | COMMON | DEDICATED NWP | DEDICATED NWP | COMMON | NWP | NWP | 5 | 90 | 10 | 0:6:1 |
|  | BUSY STATE | BUSY STATE | BUSY STATE | BUSY STATE | BUSY STATE | BUSY STATE | WAIT STATE | — | — | — | — |
| 9:05 | DEDICATED PPC | COMMON | DEDICATED NWP | DEDICATED NWP | DEDICATED NWP | NWP | NWP | — | — | — | — |
| 10:00 | DEDICATED PPC | COMMON | DEDICATED NWP | DEDICATED NWP | COMMON | NWP | NWP | 40 | 120 | 50 | 1:4:2 |

As shown in Table 6, assumed here that the summation of the total time used is performed at 9 o'clock, and the respective total time used of the dedicated PPCs, the dedicated NWPs and the common devices are 5 minutes, 90 minutes and 10 minutes respectively.

Here, the obtained ratio of the respective total time used is converted into the internal ratio of the number of printing devices (five DPPCs+two NWPs=seven), and is approximated to the integral ratio. As a result, the ratio of 0:6:1 is obtained. If the assignment is made according to the ratio thus obtained, no DPPC is assigned as the dedicated PPC, six DPPCs are assigned as the dedicated NWPs and one DPPC is assigned as the common device, thereby presenting the problem that the user who desires to perform a copying operation suffers inconveniences that there may be no available copying machine.

In this example, the lower limit number of the DPPCs dedicated to the dedicated PPC is set to one so that even in the case where the total time used for the copying machine is very short, at least one DPPC is ensured for the copying machine for the next assignment. In this example, as two common devices are kept being used as the copying machines, the assignment is made as follows: one dedicated PPC, four dedicated NWPs and two common devices. Thereafter, when the DPPC 5 that has been used as the copying machine finishes the copying job at five passed nine, the DPPC 5 is switched to operate as the NWP. As a result, the assignment of the DPPCs has changed to: one PPC, five NWPs and one common device.

Next, assumed here that the summation of the total time used is performed again at 10 o'clock, and the respective selected. In case, there still exist a plurality of such DPPCs again, the DPPC to be switched to be assigned as the printer would be selected according to the prescribed priority order.

The described explanations have been given through the case where an assignment for the DPPC is given at every one hour. However, such time interval may be altered to be, for example, every 30 minutes, half day, one day, one week, one month, one year, etc. Similarly, the explanations have been given through the case of setting the lower limit number of the dedicated PPCs. However, the lower limit number of the dedicated NWPs may be altered according to the frequency of executing the printing job, etc. In this way, the dedicated NWP which can process the printing job can be ensured, thereby improving the efficiency of the printing job.

Figure 17:
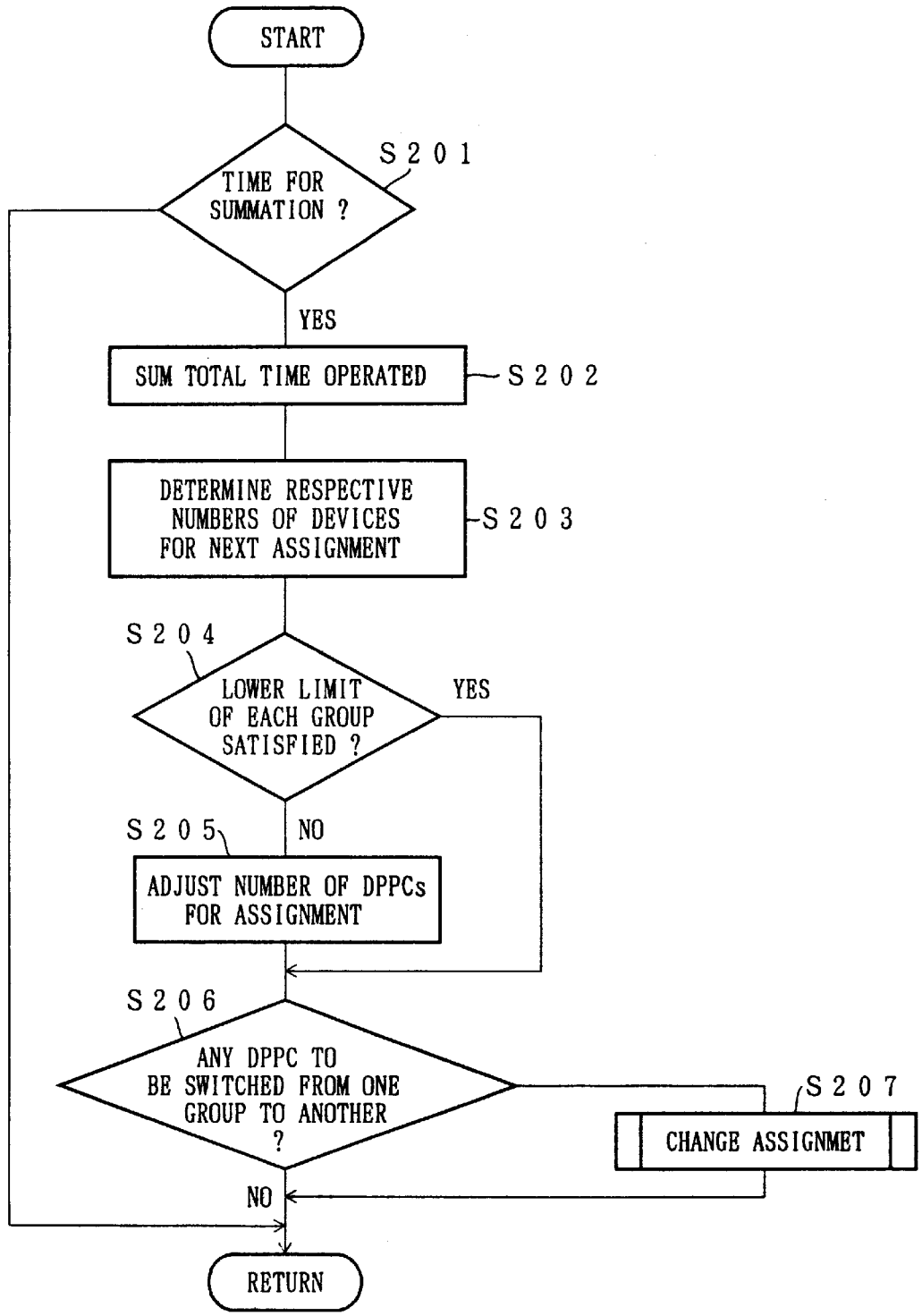
FIG. 17 is a flowchart showing a part of the assigning process to be executed in a network in accordance with a still another embodiment of the present invention.
Figure 18:
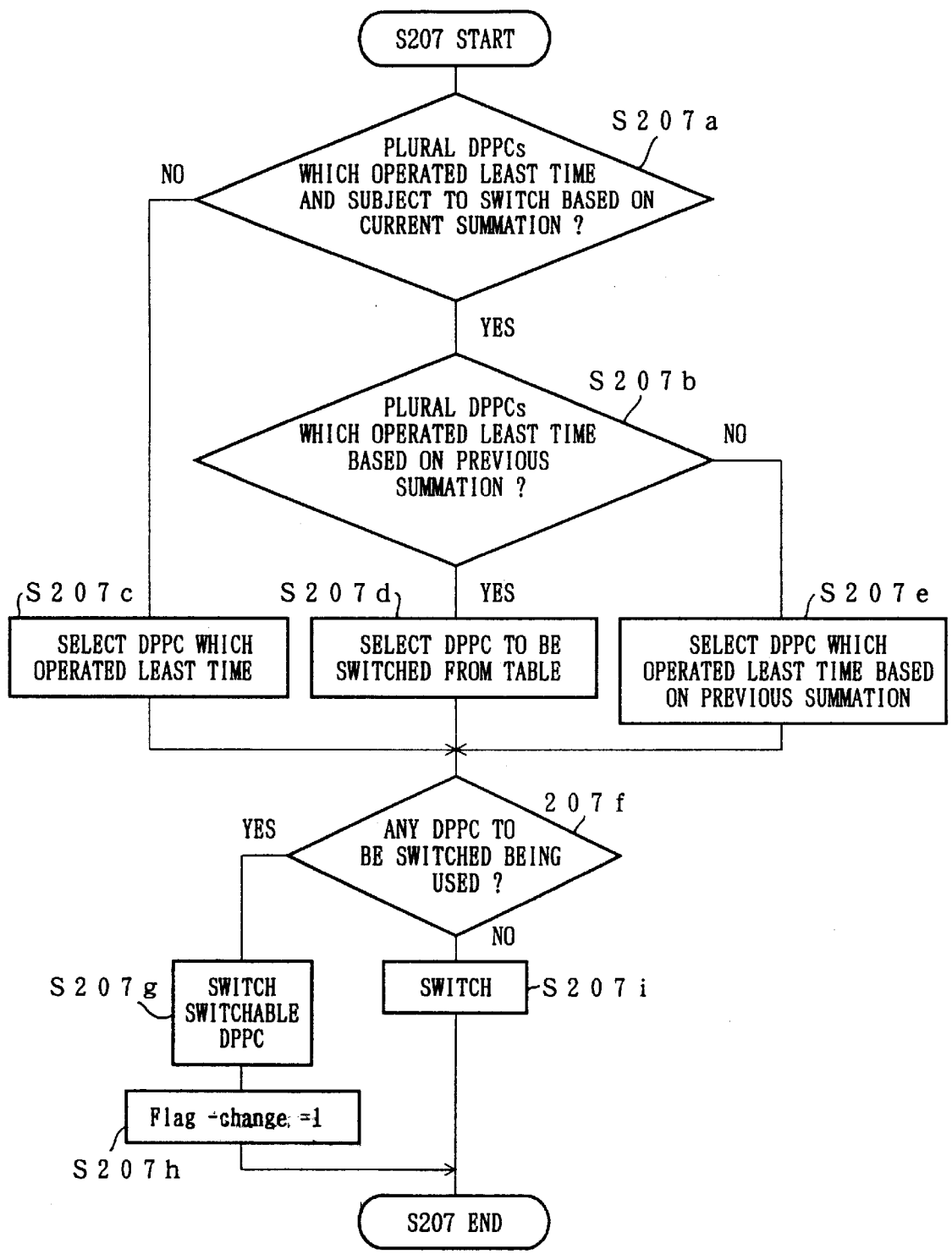
FIG. 18 is a flowchart showing the process in step 207 of the flowchart of FIG. 17 in more detail.
Figure 19:
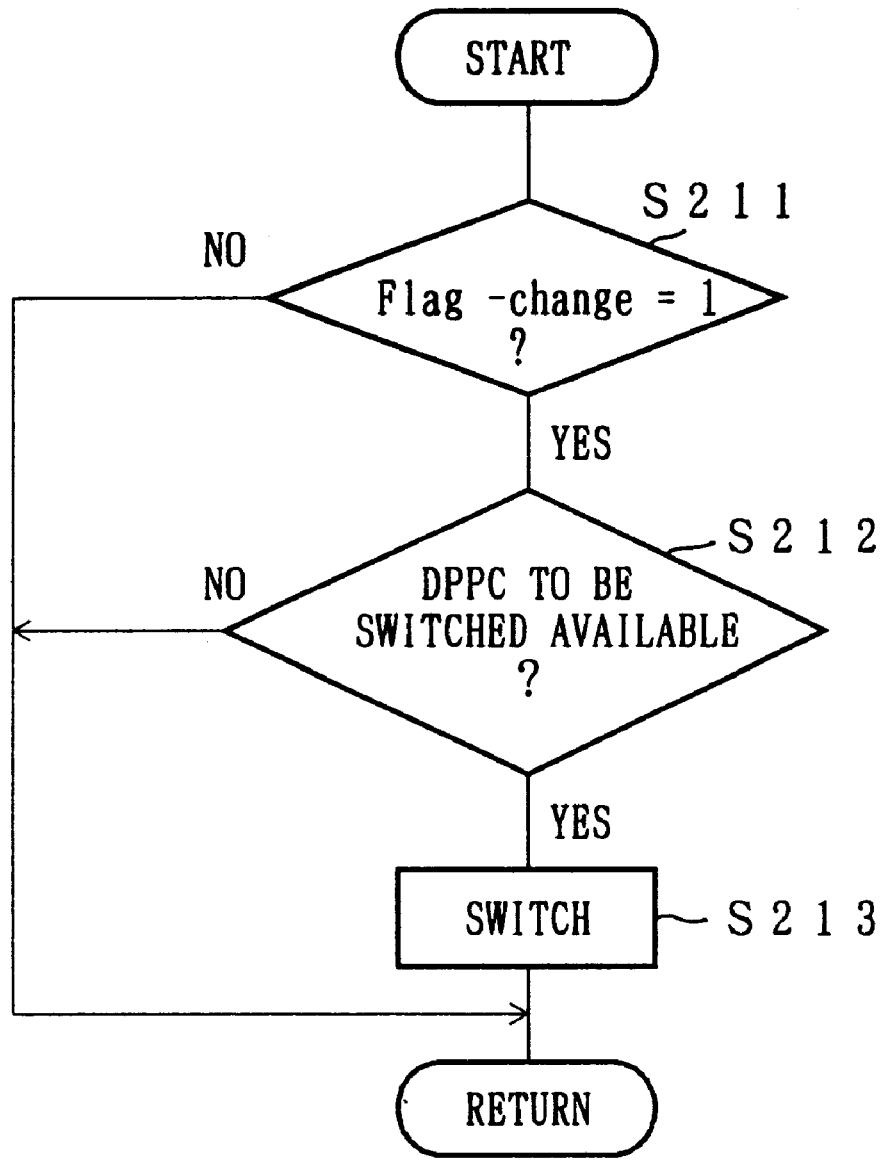
FIG. 19 is a flowchart showing another part of the assigning process.

FIG. 17 through FIG. 19 are the flowcharts respectively showing the process to be performed by the NW controller 100. The processes in S201 through S203 in the flowchart of FIG. 17 are the same as the process in S1 through S3 in the flowchart of FIG. 7 explained in the first embodiment.

In S204, it is determined whether or not the respective assigned numbers are less than the lower limit numbers of respective groups for the dedicated PPCs, dedicated NWPs and the common devices. If so, the assigned numbers for the respective groups are adjusted in S205 so that all of the assigned numbers are not less than the lower limit numbers. Next, in S206, it is determined whether or not there exists any DPPC to be switched to one group to another. If so, the assignment is altered by the process of S207, specifically, the processes from S207a to S207i in the flowchart of FIG. 18. Here, the processes in S207a through S207i in the flowchart of FIG. 18 are substantially the same as the processes in S10a through S10i in the flowchart of FIG. 9 explained in the first embodiment, and thus detailed descriptions thereof shall be omitted here. The processes in S211 through S214 in the flowchart of FIG. 19 are also the same as the process in S12 through S14 in the flowchart of FIG. 8, and thus the explanations thereof shall be omitted here.

The present embodiment may be arranged such that display device for displaying the status of all the DPPCs in the network on a display screen to inform the user is provided in each DPPC as in the case of the first embodiment. In this case, for the DPPCs assigned as the common devices, as the interruption of a copying operation is permitted while a printing job is being executed, in the symbol of the DPPC displayed on the screen of the display device, not only a message such as "being used" or "available" but also a message "being used, enabled for interruption" so that the user can see that an interruption of a copying operation is permitted. As a result, the burden of the user such as wasting time in looking for any available DPPC can be reduced.

As described, according to the network of the present embodiment, the respective lower limit numbers of the DPPCs to be assigned to the groups of the dedicated PPCs, dedicated NWPs and the common devices are determined beforehand, and the NW controller 100 performs an assignment of the DPPCs so that the respective number of DPPCs in the groups are not less than the respective lower limit numbers. Therefore, by setting the respective lower limit numbers to appropriate numbers according to the state of use of the network, the minimum number of DPPCs required for each group can be ensured. In this way, for example, a request for an urgent job can be managed without problem. Similarly, for example, when a copying process is to be performed by a user, such condition that there is no available copying machine can be avoided.

[SIXTH EMBODIMENT]

Figure 20:
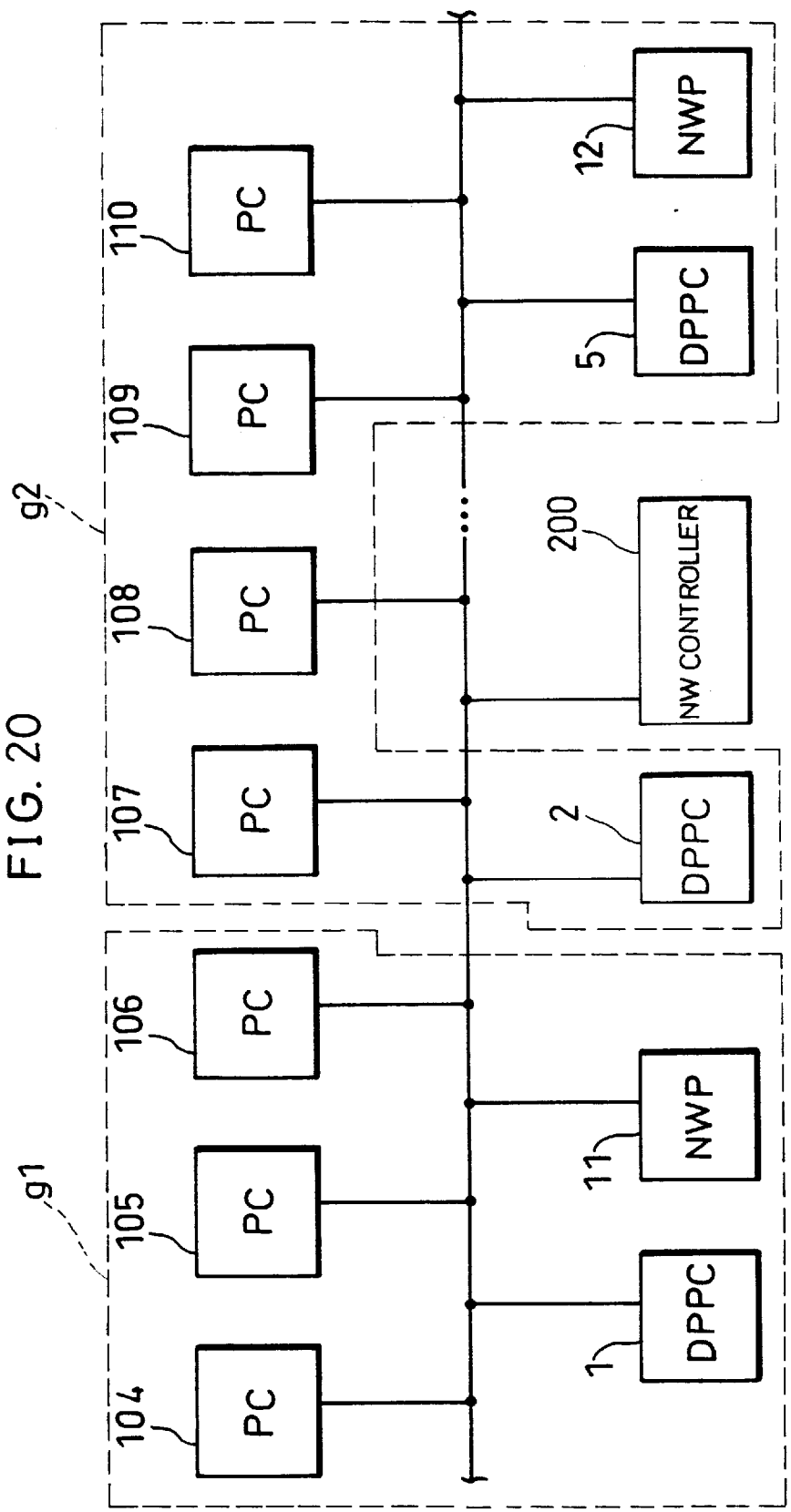
FIG. 20 is a block diagram showing a structure of the network in accordance with still another embodiment of the present invention.

The following descriptions will discuss still another embodiment of the present invention in reference to FIG. 20. For convenience in explanations, members having the same function as the aforementioned embodiment will be designated by the same reference numerals, and thus the descriptions thereof shall be omitted here.

As shown in FIG. 20, the network in accordance with the present embodiment includes plural PCs 104 through 110, five DPPC 1 through DPPC 5, two NWPs 11 and 12 and an NW controller 200 for controlling the entire network which are mutually connected.

As surrounded by the dotted line, the PCs 104 through 106 belong to the group g1, and the PCs 107 through 110 belong to the group g2. To which group, each DPPC and each NWP belongs is determined by the NW controller 200 in the following manner.

To the NW controller 200, as in the case of the NW controller 100 adopted in the first embodiment, status information are transferred respectively from all the DPPCs and NWPs in the network when driving the network, or completing one copying or printing job or at an occurrence of trouble, etc. The NW controller 200 stores the status information in an internal memory (not shown). The status information is stored in series in the memory since the operation of the network is started, thereby storing the history of the altered status of all the printing devices in the network.

The status information includes respective total time each DPPC or the NWP operated. Additionally, the NW controller 200 stores therein a timer (not shown), and a program for summing the total time the devices in each group operated is executed at every hour using the timer. Furthermore, the NW controller 200 determines to which group each DPPC belongs based on the result of summation.

The process of the described assignment performed by the NW controller 200 will be explained in reference to Table 7.

TABLE 7

| TIME | DPPC 1 | DPPC 2 | DBPC 3 | DPPC 4 | DPPC 5 | NWP 11 | NWP 12 | USED TIME OF g1 (min.) | USED TIME OF g2 (min.) | RATIO |
|---|---|---|---|---|---|---|---|---|---|---|
| 9:00 | g1 WAIT STATE | g1 BUSY STATE | g2 BUSY STATE | g2 WAIT STATE | g2 BUSY STATE | g1 BUSY STATE | g2 BUSY STATE | 210 — | 90 — | 5:2 — |
| 9:05 | g1 | g1 | g2 | g1 | g1 | g1 | g2 | — | — | — |
| 10:00 | g1 | g1 | g2 | g1 | g1 | g1 | g2 | 200 | 140 | 4:3 |

As shown in Table 7, it is assumed here that as a result of summation performed by the NW controller 200 at 9 o'clock, the respective total time the printing devices in the group g1 and the printing devices in the group g2 operated be 210 minutes and 90 minutes. The current assignment is assumed to be as follows: DPPC 1 and DPPC 2 and the NWP 11 (three printing devices in total) belong to the group g1, and the DPPC 3 through the DPPC 5 and the NWP 12 (four printing devices in total) belong to the group g2.

As described in the first embodiment, the ratio in total time the devices in each group operated is converted into an internal ratio in the total number of printing devices in the network, i.e., the number of the DPPCs+the number of the NWPs=seven, and an approximate integral ratio of 5:2 is obtained. The ratio indicates that two printing devices which belong to the group g2 are to be switched to the group g1. At this stage, only the DPPC 4 belonging to group g2 which is in a wait state is switched to the group g1.

Thereafter, it is assumed that the printing job assigned to the DPPC 5 is completed at five passed nine. Then, the DPPC 5 is also switched to the group g1. Furthermore, the total time the printing devices operated is summed for each group again by the NW controller 200 at 10 o'clock. It is assumed here that as a result of summation, the respective time the printing devices in the group g1 and the printing devices in the group g2 operated are respectively 200 minutes and 140 minutes, and the ratio in number of printing devices in each group obtained based on the ratio in total time the devices in each group operated is approximately 4:3.

In this case, one of the printing devices which belong to the group 1 is switched to the group g2. Here, as the printing device to be switched, one of the plural printing devices belonging to the group g1 is selected, for example, by comparing the total time the printing devices in each group have operated, or from the table set beforehand according to the necessity in the manner described in the first embodiment. Thus, the detailed descriptions thereof shall be omitted here.

It may be also arranged such that the lower limit number of the printing devices which belong to each group are set beforehand, and the assignment is performed by the NW controller 200 so that the number of DPPCs belonging to each group is not less than the lower limit number. The described method of assigning the number of the printing devices is the same as the first embodiment, and thus the descriptions thereof shall be omitted here.

According to the described arrangement, the total operation time is summed for each group, and the number of the printing devices in each group is altered based on the result of summation. Thus, the suitable assignment can be made according to the state of use in the network as a whole. Moreover, as such assignment can be performed automatically without the operation by the network administrator, an improved operability of the entire network can be achieved, and the burden of the network administrator can be reduced.

[SEVENTH EMBODIMENT]

The following descriptions will discuss still another embodiment of the present invention in reference to FIG. 21 through FIG. 33. For convenience in explanations, members having the same function as the aforementioned embodiments will be designated by the same reference numerals, and thus the descriptions thereof shall be omitted here.

Figure 21:
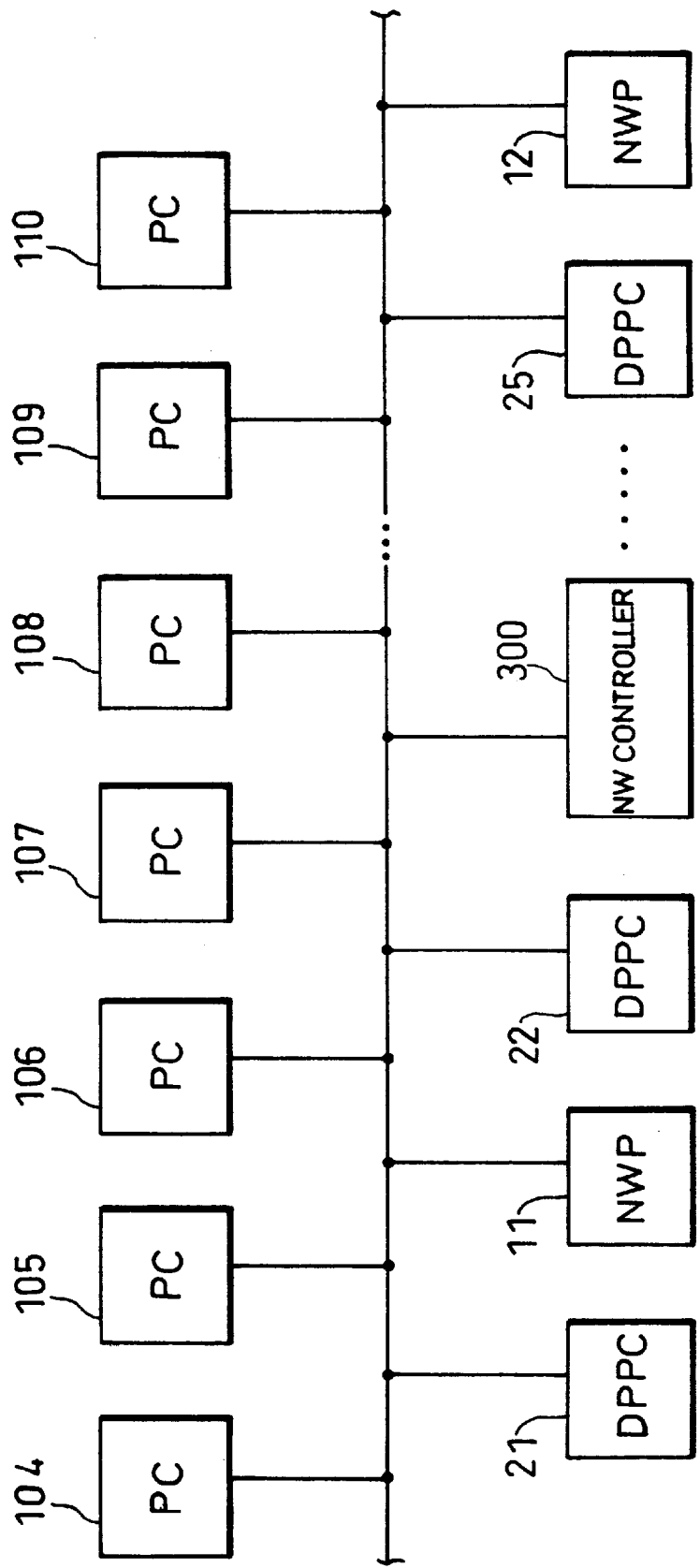
FIG. 21 is a block diagram showing a structure of the network in accordance with still another embodiment of the present invention.

As shown in FIG. 21, the network in accordance with the present embodiment includes plural PCs 104 through 110, five DPPC 21 through DPPC 25, two NWPs 11 and 12 and an NW controller 300 for controlling the entire network which are mutually connected.

To the NW controller 300, status information is transferred respectively from all the DPPCs and NWPs in the network when driving the network, completing a copying or printing job or at an occurrence of trouble, etc. The NW controller 300 stores the received status information in an internal memory (not shown). The status information is continuously taken in the memory since the operation of the network started, thereby storing the history of the changes in the status of all the printing devices in the network. Additionally, a communication of a print request and print status information is also performed between the NW controller 300 and each PC.

Each DPPC includes an operation panel (to be described later), and by pressing an interruption reservation key placed on the operation panel, a reservation for a copying operation can be made to a randomly selected DPPC in the network. Here, in reference to Table 8 and FIG. 22, the process of making a reservation for available printing device by the NW controller 300 will be explained in detail.

TABLE 8

| STEP | DPPC 1 | DPPC 2 | DPPC 3 | DPPC 4 | DPPC 5 | NWP 11 | NWP 12 |
|---|---|---|---|---|---|---|---|
| 1 | PRINTING JOB #1 | PRINTING JOB #2 | PRINTING JOB #3 | PRINTING JOB #4 | PRINTING JOB #5 | PRINTING JOB #6 | PRINTING JOB #7 |
| 2 | PRINTING JOB #8 | COPYING JOB #1 | PRINTING JOB #9 | PRINTING JOB #10 | PRINTING JOB #11 | PRINTING JOB #12 | PRINTING JOB #13 |
| 3 | PRINTING JOB #14 | PRINTING JOB #15 | COPYING JOB #2 | | | | |

Upon receiving a request for printing jobs from respective PCs, the printing jobs are equally assigned to respective DPPCs and NWPs. Here, the priority order in assigning printing jobs is set as follows: DPPC1, DPPC2, . . . DPPC 5, NWP 11, NWP 12. After the printing job is assigned to all the DPPCs and the NWPs, the DPPC and the NWP which have completed the printing job are given priority for the next printing job. On the other hand, upon receiving the next printing job, if none of the DPPCs and NWPs have completed the currently assigned printing job, the next printing job is assigned in the described order of the DPPCs or the NWPs. Similarly, when a reservation for an available DPPC is made using an interruption reservation key on the operation panel, a copying job is added to a wait line for the job on the DPPC.

In Table 8, the job in execution is shown under the STEP 1, and the job on the wait line is shown under the steps 2 and 3. The priority in assigning jobs on the wait line is given to a job of the smaller number, and upon completing the job in STEP 1, the job in STEP 2 is processed. Additionally, in the case of receiving many print requests from the PCs or many reservations are made to the available printing devices by the user, the jobs in and after STEP 4 are added to the wait line in order.

In Table 8, first, printing jobs #1 and #2 are respectively assigned to the DPPC 1 and the DPPC 2. It is assumed that after the printing job assigned to each DPPC is started, the user made a reservation for the DPPC 2. Since this reservation was made before a printing job #15, the reservation is set on the wait line as a copying job #1 which is given a priority over the printing job #15.

Further, after the printing job #9 is added on the wait line of the DPPC 3, another reservation is made by the user for the DPPC 3. This reservation is added on the wait line as a copying job #2 to be executed next to the printing job #9.

In reference to the flowchart of FIG. 22, the process of assigning a job by the NW controller 300 will be explained.

First, upon receiving a print request from the PC, or a reservation made by a user (S81), in the case of receiving a reservation for a copying job, a sequence moves to S82, and it is determined whether or not the DPPC to be reserved is available (S82). If so, the copying job is assigned to the DPPC (S83). On the other hand, if the DPPC to be reserved is being used, the copying job is added on the wait line of the DPPC (S84).

In S81, in the case of receiving a print request, it is determined whether or not there is any available printing device, i.e., DPPC or NWP (S85). If so, the printing job is assigned to the printing device, and the assigned printing job is executed therein (S89). On the other hand, if there is no available printing device, it is determined whether or not there exists any printing device which has less jobs on its wait line than other printing devices according to the priority order in assigning jobs (S86). If so, the printing job is added to the end of the wait line of this printing device (S87). On the other hand, if the jobs are equally assigned to the respective wait lines of all the printing devices, the printing job is added on the wait line of the printing device selected according to the priority order in assigning requested jobs (S88).

By performing the described assignment control by the NW controller 300, reservation for a copying job can be made by a user. As a result, the DPPC can be used both as the printer and the copying machine.

In the present embodiment, the following arrangement may be permitted: an operation panel (not shown) of each DPPC includes a display screen such as a liquid crystal panel, and an input device which permits an input of numbers, alphabets, etc., other than an interruption reservation key. The operation panel is arranged such that by pressing the interruption reservation key to make a reservation, for example, a message for urging the user an ID input on the display screen is outputted. Then, based on the result of comparison between the inputted ID and the ID on the printing job being printed, it is determined whether the interruption is readily accepted, or to be set on the wait line.

Figure 23:
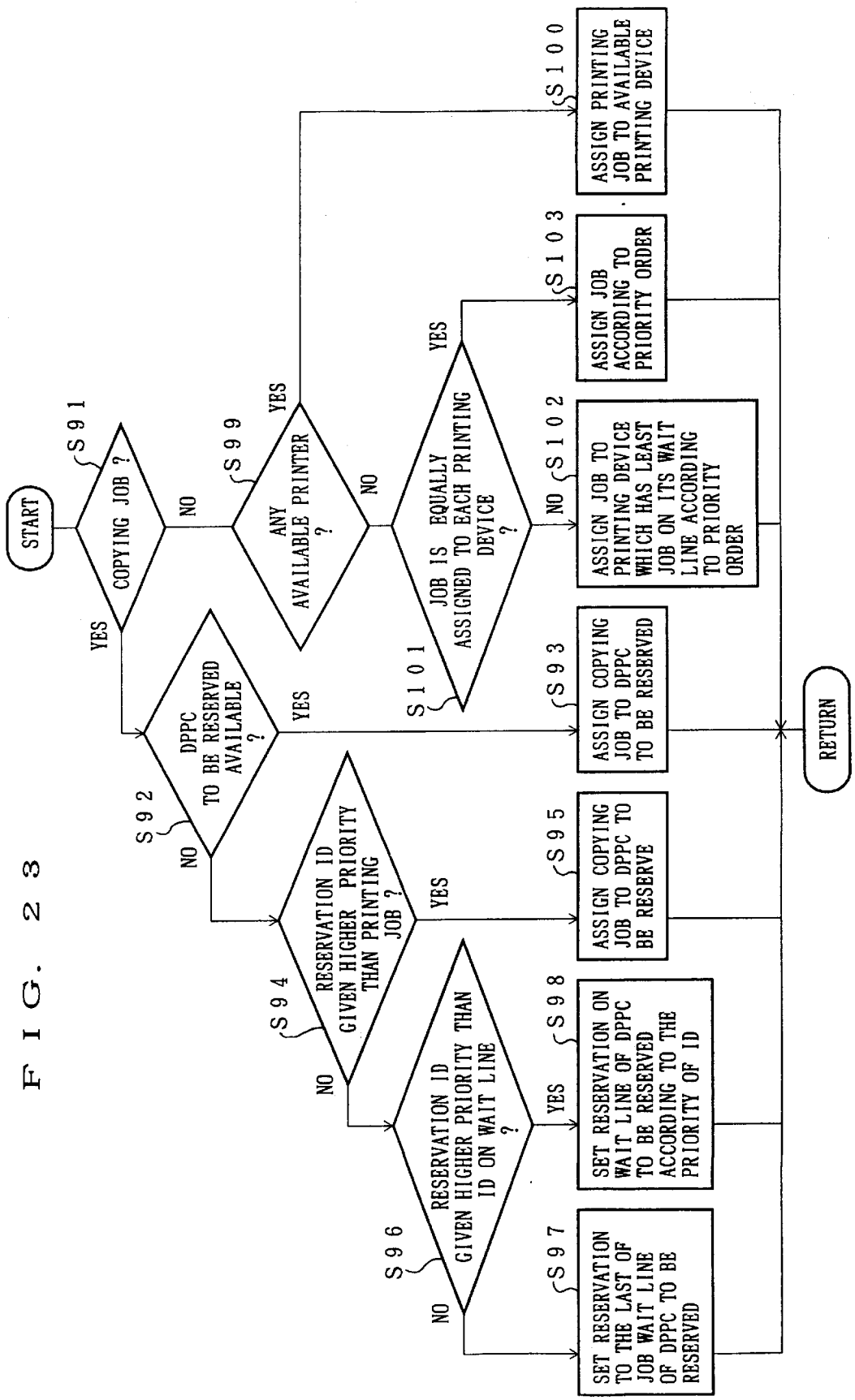
FIG. 23 is a flowchart showing another example of a control process by the NW controller to be executed when a user made a reservation in the network.

The described control process will be explained in reference to the flowchart of FIG. 23.

First, the NW controller 300 determines whether the requested job is a printing job or a copying job (S91). If the requested job is the copying job given through reservation made by the user, it is determined whether or not the DPPC to be reserved is available (S92). If so, the copying job is assigned to the DPPC (S93).

In the case where the DPPC to be reserved is not available, i.e., when the printing job is being executed, the ID of the printing job in execution is compared with the ID of the user who made a reservation (S94). As a result of a comparison, if the user who made the reservation is given a higher priority, an interruption of a printing job in execution is performed in a partitioned part of the printing job to allow the requested copying operation to be executed (S95). The partitioned part of the printing job may be, for example, when completing one printing job in the case of performing plural printing jobs, etc.

On the other hand, as a result of comparison in S94, if the ID of the user who made a reservation is given a lower priority, the ID of the job on the wait line of the DPPC to be reserved is compared with the ID of the user (S96). More specifically, first, the ID of the job to be processed next to the printing job in execution is compared with the ID of the user. If the latter is given a higher priority, an interruption of the requested copying job is permitted to be set next to the printing job in execution (S98). On the other hand, when the former is given a higher priority, the ID of the second job on the wait line is compared with the ID of the user. Then, the aforementioned process is repeated.

As described, as a result of comparison between the ID inputted to the user who made a reservation and the ID on the wait line, if all the IDs of the jobs on the wait line are given higher priority over the ID of the user, the copying job is added at the end of the wait line of the device to be reserved (S97).

On the other hand, if it is determined in S91 that the currently requested job is a printing job, the NW controller 300 determines whether or not there exist any available printing devices, i.e., DPPC or NWP (S99). If so, the printing job is assigned to the available printing device and is executed (S100).

Figure 22:
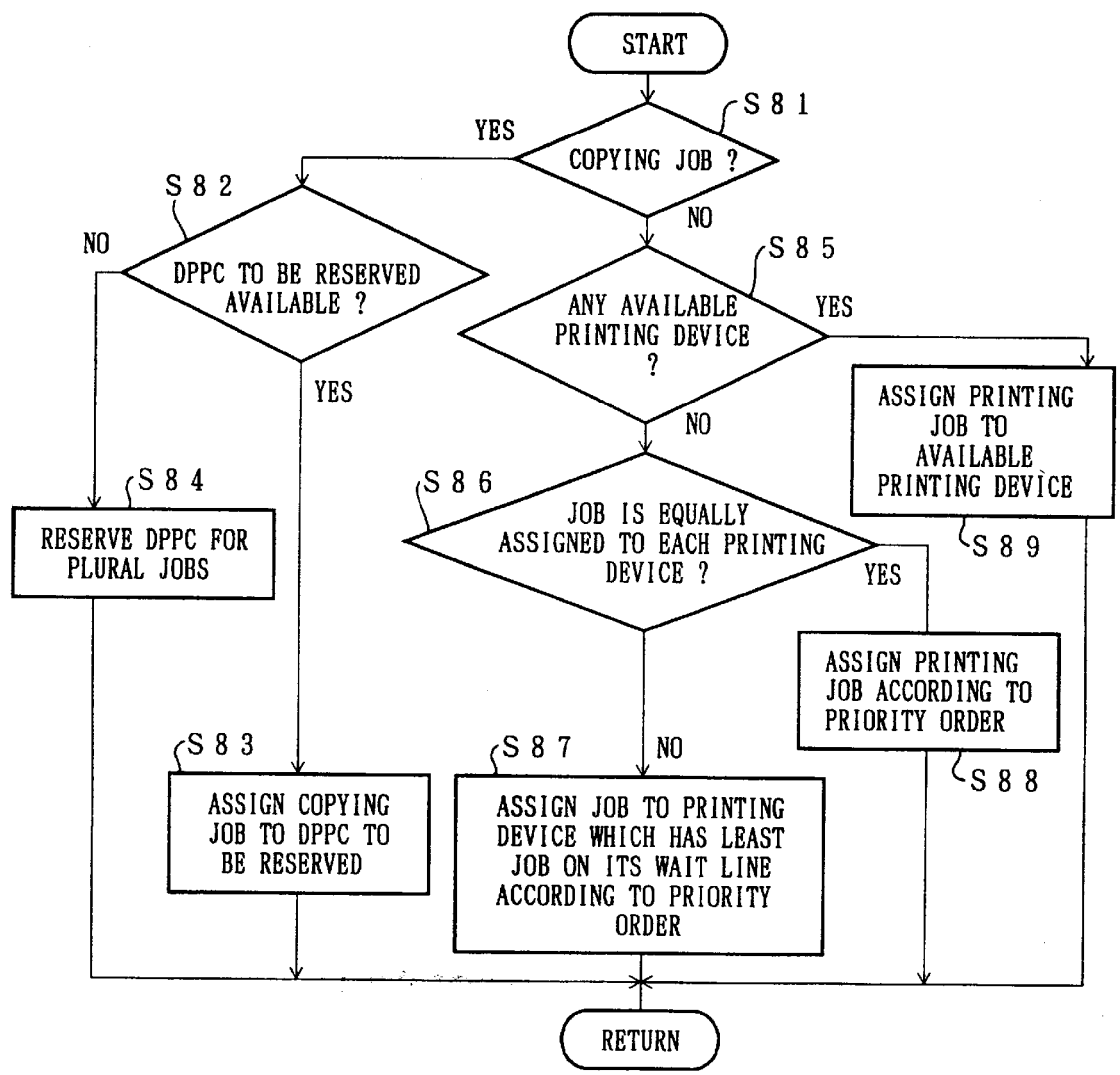
FIG. 22 is a flowchart showing one example of a control process by the NW controller to be executed when user made a reservation of a copying job in the network.

As to the processes in S101 through S103 to be executed when it is determined that there is no available printing device in S99 are the same as the previously described processes in S86 through S88 in the flowchart of FIG. 22, and thus the descriptions thereof shall be omitted here.

As described, when a reservation for the copying process is made by the user, the NW controller 300 compares the ID of the job on the wait line with the ID of the user who made the reservation to determine where the interruption is permitted. In this way, a copying job can be processed in the DPPC which normally performs a printing job, thereby achieving a more effective use of the DPPCs.

By altering the priority of the ID of each user according to the department to which the user belongs, or altering the priority between a copying job and a printing job even with the same ID or altering the priority according to the state of use of the network, a priority can be given to an urgent copying job or printing job, thereby achieving an improved operability of the network as a whole.

An example of the described operation panel provided in each. DPPC for allowing the user to make a reservation in the network of the present embodiment will be explained in reference to FIG. 24.

The operation panel includes the interruption reservation key, a display screen such as a liquid crystal panel, and an input device for inputting numbers, alphabets, etc. Similarly, a touch panel as an input device is laminated on the liquid crystal panel as the display screen, or it may be arranged such that an input is made by touching a symbol, an icon, etc., displayed on the liquid crystal panel. Or numeral keys and character keys may be provided separately from the display screen.

Figure 24:
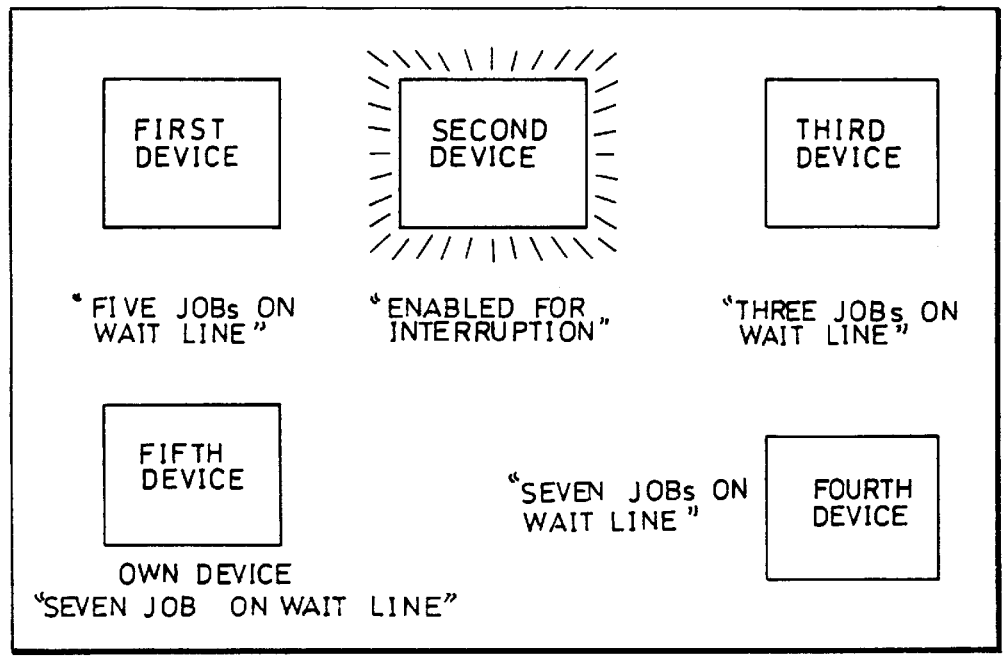
FIG. 24 is an explanatory view showing one example of the display screen provided in an operation panel of the DPPC provided in the network.

It is assumed here that the DPPC 1 through the DPPC 5 are respectively designated as "first device", "second device" through "fifth device". Here, FIG. 24 shows one example of the display screen of the operation panel of the DPPC 5 (fifth device). As shown in the figure, the symbols including the names of the DPPCs are shown in a rectangular form at position corresponding to the actual placement position of the DPPC 1 through the DPPC 5.

The symbols of the fifth device (device 5) corresponding to the DPPC 5 are displayed in such a manner that the user can distinguish them from those of other devices with ease and can recognize that the fifth device is the currently observing device at a glance by circling them with thick line or by displaying them in different color.

When the user presses the interruption reservation key in the operation panel of the fifth device, a message (not shown) for urging the user to input the ID is displayed on the display screen.

When the user inputs ID using keys, etc., according to the displayed message, the priority of the inputted ID of the user is compared with the priority of the ID of the job on the wait line, and the number of the jobs on the wait line which are given higher priority than the ID of the user is displayed under the symbol of each DPPC. Here, as to the DPPC which does not have any jobs on the wait line, which is given a priority over the ID of the user, a message "enabled for interruption" is displayed under the symbol of the DPPC.

In this example, the first device through the fifth device have jobs on the wait line which are given higher priority than the ID of the user, and a job given a priority over the ID of the user has not been assigned to the second device, a message indicating that "the second device is enabled for interruption" is displayed on the display screen. When flashing the symbol of the second device, a message "enabled for interruption" is displayed under the symbol, and the user can find an available DPPC with ease.

When a reservation is to be made by the user, an available DPPC is found, and thereafter, an assigned device number of this DPPC is inputted using keys on the operation panel, or by touching symbols or icons on the operation panel of the DPPC.

As described, in the arrangement where an operation panel equipped with the display screen and the input device in each DPPC, status of the jobs on the wait line of all the DPPCs are displayed on the display screen, and a reservation can be made for a randomly selected DPPC on the network using the input device, thereby reducing the burden of the user such as wasting time in looking for any available DPPC, etc. Additionally, as the number of the jobs on the wait line, which is given a priority over the ID of the user is shown for each DPPC, the user can see for which DPPC a reservation should be made to complete a copying operation as much as possible.

Furthermore, as a reservation can be made with respect to other DPPCs, for example, by making the reservation using the nearest DPPC for the user, and then physically moving to the placement position of the DPPC, a wait time for the user can be significantly reduced, thereby improving an operability.

Additionally, it may be arranged such that each DPPC includes informing means for catching an attention of the user by generating an alarm sound, for example, by means of a speaker, etc., to inform the user that the copying job is ready to be processed when the DPPC to be reserved is permitted for the copying operation. Furthermore, by flashing the symbol of the DPPC to be reserved on the display screen of the operation panel of the DPPC through which the user made a reservation, the user can confirm which DPPC is to be used. Similarly, the symbol on the display screen of the operation panel of the DPPC to be reserved flashes, and an alarm sound can be generated from the speaker provided in the DPPC.

As described, by providing the means for informing the user from the DPPC from which a reservation is made that a currently requested copying job is ready to be processed, the user can perform other work until the requested copying job is ready to be processed, and especially when the DPPC for which a reservation is made is located far from the user, a wait time of the user can be effectively reduced.

However, with regard to a reservation made for one of the DPPCS, if the user is busy with other job and cannot come to initiate the copying job immediately despite that the reservation is accepted, the DPPC would be kept in the wait state, and the subsequent printing jobs would be kept on the wait line for a long time.

The occurrence of the described problem can be eliminated, for example, by arranging such that a reservation effective time is set beforehand, and based on a self-contained timer (time measuring means) of the NW controller 300, whether or not the copying job is executed within the reservation effective time is observed.

Specifically, it may be arranged such that the reservation effective time is set to, for example, five minutes, and a five-minute timer is stored in the NW controller 300, which is started upon receiving a reservation made by the user. Similarly, upon stating the copying job in the DPPC for which a reservation is made, utilization event information is transmitted to the NW controller 300 from the DPPC and is stored in the internal memory of the NW controller 300.

When the five-minute timer is time up, the NW controller 300 drives the interruption routine. The interruption routine determines whether or not the user who made the reservation actually uses the DPPC reserved. The determination is made based on the utilization event information stored in the memory, and if the memory stores the utilization event information indicating that the copying job having the ID of the user is started in a time period since the timer started until the timer is time up, it is determined that the requested copying job is in execution, or is completed, and the control of the NW controller 300 goes back to the main routine.

On the other hand, if the utilization event information is not stored in the memory, it is considered that reservation effective time is over, and the reservation is cancelled, and the next job on the wait line of the DPPC reserved is started.

As described, it is observed whether or not a reserved copying process is executed within a predetermined time, and if not, the reservation is cancelled to allow the next job to be executed, thereby improving an operability by reducing an unnecessary stoppage time of the DPPC.

In the described preferred embodiment, a reservation effective time is set to five minutes. However, the reservation effective time may be set shorter or longer as desired. Additionally, the reservation effective time may be set according to the distance to the placement position of the reserved DPPC from the placement position of the DPPC through which a reservation is made by the user, i.e., the DPPC through which an interruption reservation key is operated, and the interruption routine is activated after a prescribed time set in the self-contained timer of the NW controller 300 has passed.

An example of the described effective time is shown in Table 9 through an example where each DPPC is placed in a relative position displayed on the operation panel shown in FIG. 24.

TABLE 9

|  |  | DPPC TO BE RESERVED | | | | |
| --- | --- | --- | --- | --- | --- | --- |
|  |  | FIRST DEVICE | SECOND DEVICE | THIRD DEVICE | FOURTH DEVICE | FIFTH DEVICE |
| DPPC THROUGH WHICH RESERVATION IS MADE | FIRST DEVICE |  | 3 min. | 5 min. | 10 min. | 3 min. |
|  | SECOND DEVICE | 3 min. |  | 3 min. | 7 min. | 3 min. |
|  | THIRD DEVICE | 5 min. | 3 min. |  | 3 min. | 5 min. |
|  | FOURTH DEVICE | 10 min. | 7 min. | 3 min. |  | 10 min. |
|  | FIFTH DEVICE | 3 min. | 3 min. | 5 min. | 10 min. |  |

As shown in Table 9, for example, when a reservation is made from the fifth device to the first device, the reservation effective time is set to three minutes. On the other hand, when a reservation is made from the fifth device to the fourth device which is placed further from the first device, the reservation effective time is set to ten minutes. Here, the reservation effective time is not necessarily set in proportion to the distance between the DPPC through a reservation is made and the DPPC to be reserved, and the reservation effective time can be set as desired by the network administrator. Additionally, it may be also arranged that the upper limit is set for the reservation effective time, so as to prevent the network administrator from setting the reservation effective time above the upper limit.

As described, by setting the reservation effective time almost in proportion to the distance from the DPPC through which a reservation is made to the DPPC to be reserved, for example, after the user made a reservation for the DPPC which is located far from the user by operating the interruption reservation key through a selected DPPC, such situation that the reservation is cancelled as the reservation effective time is over while the user is being moved to the placement position of the DPPC can be avoided.

In the DPPC in accordance with the present embodiment, after making the reservation by the user, the reservation can be cancelled. Namely, by providing a reservation cancel key to the operation panel, the user can cancel the reservation by pressing the reservation cancel key.

Figure 25:
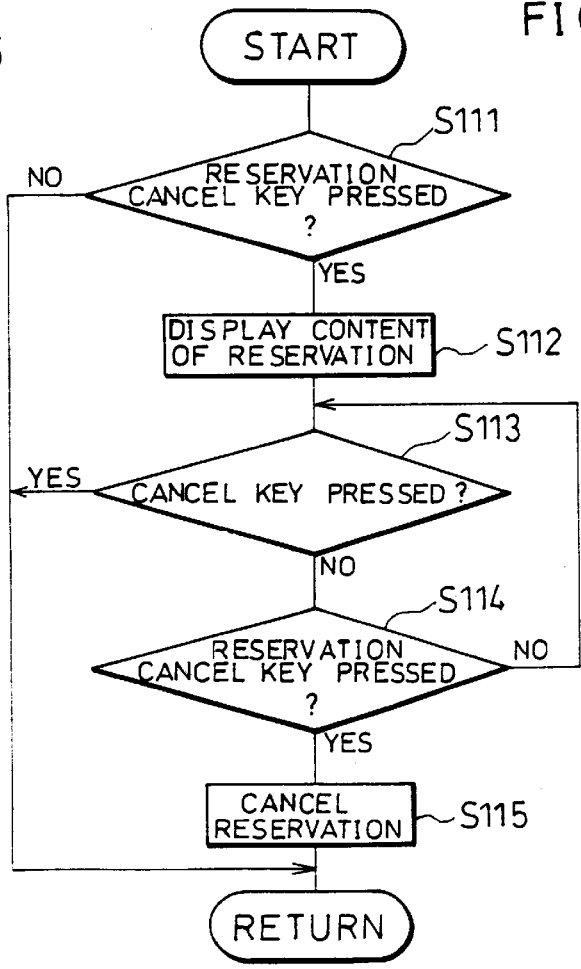
FIG. 25 is a flowchart showing another example of a control process of the NW controller when a user made a cancellation of the reservation in the network.

The reservation cancelling process will be explained in reference to the flowchart of FIG. 25.

When the NW controller 300 determines that the reservation cancel key is pressed by the user (S111), the NW controller 300 displayed the current reservation status on the display screen of the operation panel (S112). Thereafter, it is determined whether or not the cancel key is pressed (S113). If so, the sequence goes back to the main routine. Here, the cancel key is separately provided from the above-mentioned reservation cancel key, for clearing the display of the reservation status.

On the other hand, if the cancel key is not pressed, it is determined whether or not the reservation cancel key is pressed (S114). If so, the reservation is cancelled (S115). If not, the sequence goes back again to S113, and the processes in S113 and S114 are repeated until the cancel key or the reservation cancel key is pressed.

As described, in the arrangement where the reservation cancel key for allowing the user to cancel the reservation is provided, the reservation can be cancelled when the user wishes to cancel the reservation made for the DPPC and the DPPC reserved becomes available for processing another job, thereby achieving an improved operability.

Next, the following will explain the control of the NW controller 300 to be executed when the user makes overlapped reservations for DPPCs in the network in accordance with the present embodiment.

In reference to the flowchart of FIG. 26, the case where reservations are made by the same user to plural DPPCs will be explained.

First, the NW controller 300 determines whether or not the interruption reservation key is pressed (S121). If not, the sequence returns to the main routine. On the other hand, if the interruption reservation key is pressed, a message for urging the user to input his own ID and the device number of the DPPC to be reserved on a display screen of the operation panel (S122). In the case of adopting a touch panel as an input device for inputting the ID and the device number, the symbol of each DPPC, etc., is displayed as well as the described message.

Thereafter, it is determined whether or not the input of the ID is made (S123). This determination is repeated until confirming that the input of the ID is made. If the input of the ID is made by the user, it is determined whether or not there exists any reservation which has not been processed based on the inputted ID (S124). If such reservation exists, a warning "DPPC is being reserved. Wait for existing reservation to be completed or cancelled" is displayed on the display screen (S125). Then, the sequence returns to the main routine.

In S124, if it is determined that there is no DPPC being reserved by the user, it is waited for the user to input the device number of the DPPC to be reserved (S126) and accepts the reservation if the input of the device number is made (S127). Then, the sequence goes back to the main routine.

Under the described control, the problem of accepting plural reservations by the same user can be avoided, thereby preventing the operability from being lowered.

An example of the control of checking overlapped reservation will be explained in reference to the flowchart of FIG. 27.

Figure 26:
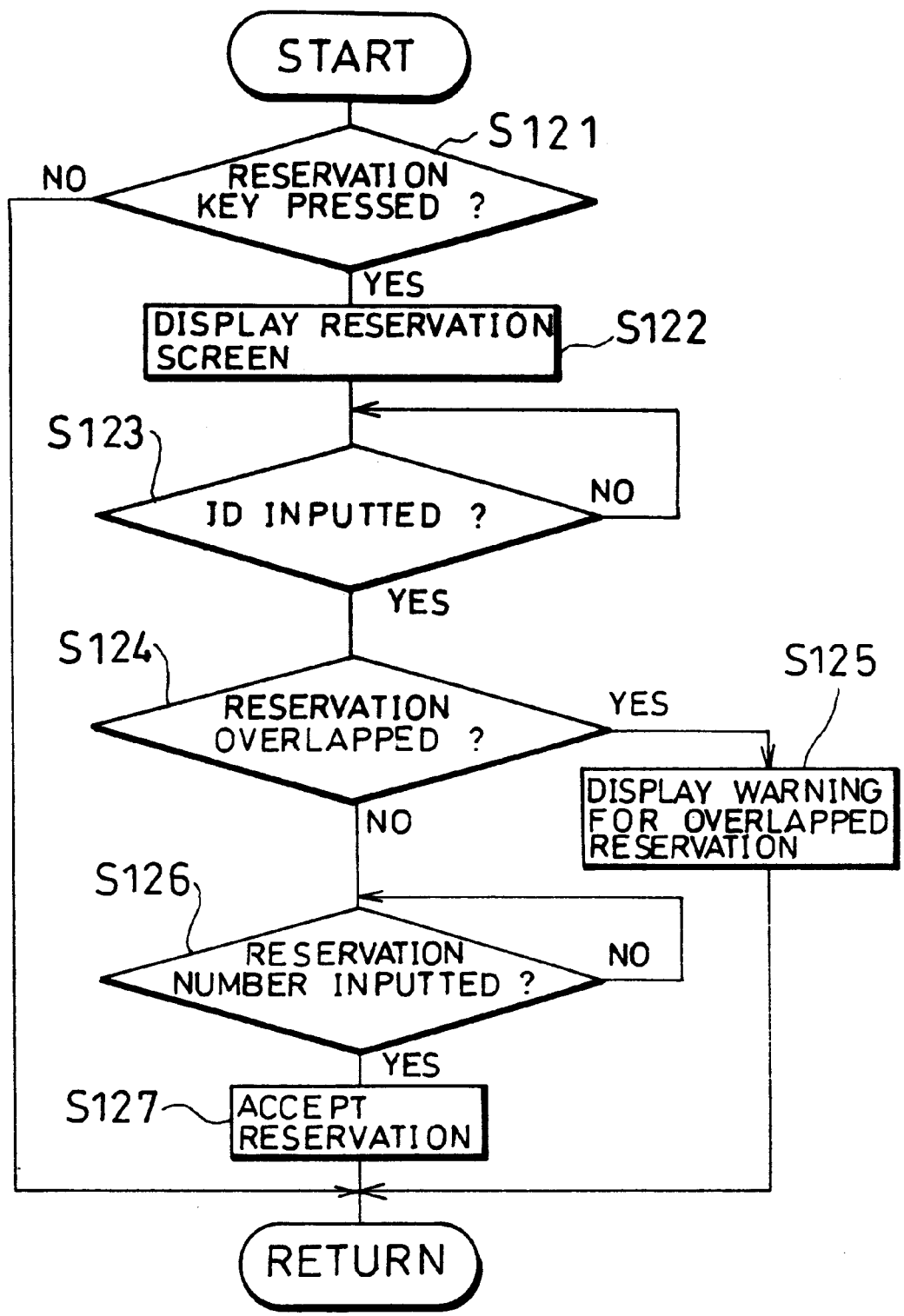
FIG. 26 is a flowchart showing one example of a control process by the NW controller to be executed when overlapped reservations are made by the same user in the network at one time.

In the flowchart, the processes in S131 through S133 are the same as the processes in S121 through S123 in the flowchart of FIG. 26, and thus the descriptions thereof shall be omitted here. After the process in S133 has been executed, it is waited for the device number of the DPPC to be reserved to be inputted by the user (S134). Then, based on the ID of the user, it is determined whether or not there exists DPPC being reserved, which has not completed the requested job (S135). If there exits such DPPC, for example, a warning message "Reservation for DPPC already made. Cancel previous reservation" is displayed (S136). Then, the existing reservation is cancelled (S137) to accept the current reservation (S138). Thereafter, the sequence returns to the main routine.

As described, in the case where plural reservations are made by the same user, the previous reservation is forced to be cancelled to make the current reservation effective. This prevents the network to be occupied by a certain user, and avoids a reduction in operability of the network as a whole.

In reference to the flowchart of FIG. 28, a still another example of checking overlapped reservations will be explained.

Figure 27:
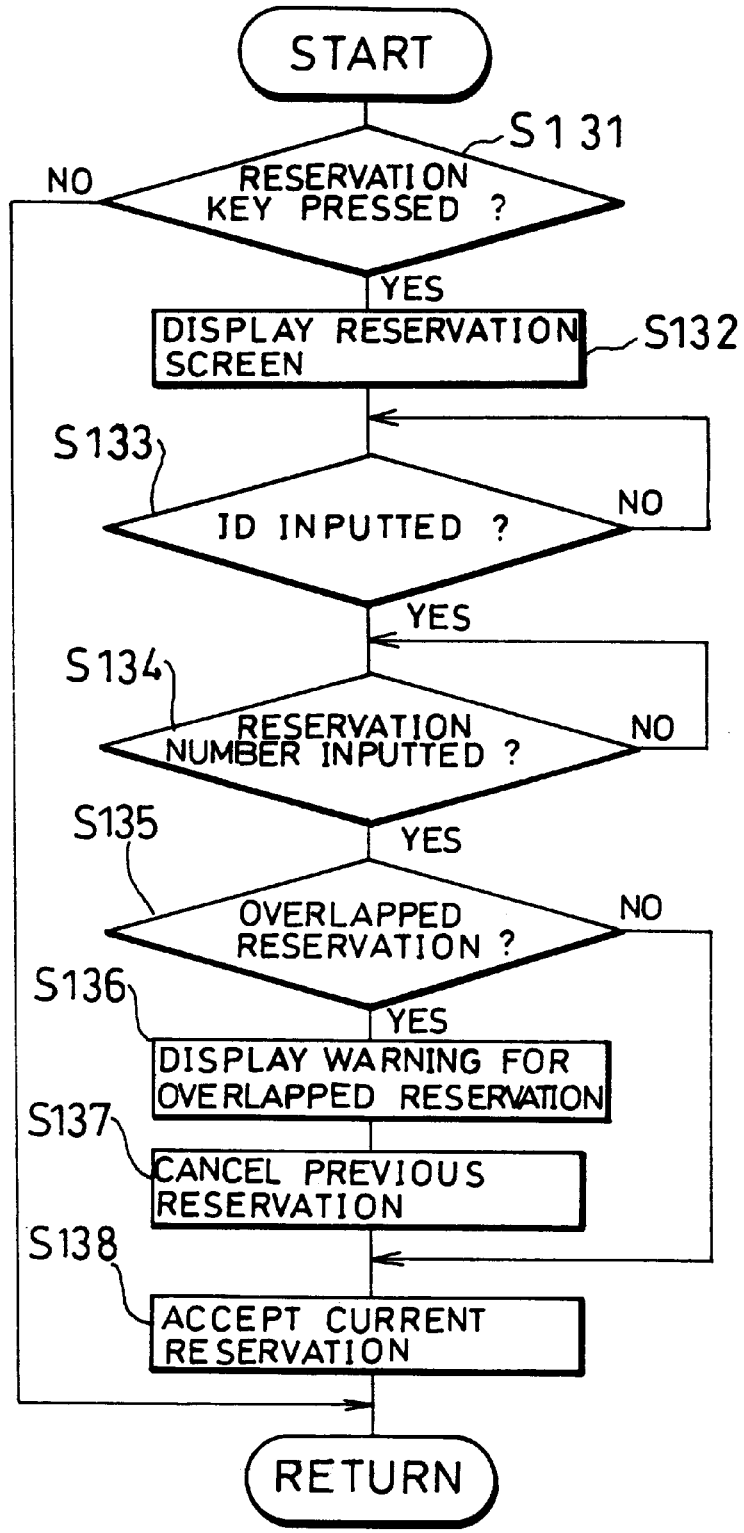
FIG. 27 is a flowchart showing another example of a control process by the NW controller to be executed when overlapped reservations are made by the same user in the network at one time.

In the flowchart, the processes in S141 through S145 are the same as the processes in S131 through S135 in the flowchart of FIG. 27, and thus the descriptions thereof shall be omitted here. After the processes in S145 has been executed, if the reservation has already made, and a DPPC which has not completed the job for the previous reservation exists, a message "DPPC being reserved. Select which reservation to maintain." In the meantime, a reservation list is displayed (S146). If the user selects the previous reservation from the reservation list, the sequence goes back to the main routine. On the other hand, if the user selects the current reservation, the previous reservation is cancelled (S148) to accept the current reservation (S149).

As described, in the case where plural reservations are made by the same user, upon receiving the second reservation, the reservation list is displayed for making the user to select which one of the reservations is maintained, and the none-selected reservation is cancelled, thereby preventing unready cancellation and the operability of the network as a whole from being lowered.

In reference to the flowchart of FIG. 29, a still another example of checking overlapped reservations will be explained. In this example, the reservation limited number of the DPPCs for which the user is allowed to make a reservation in one time is set beforehand. In this arrangement, when receiving a reservation from the user, it is checked whether or not the number of the DPPC being reserved by this user exceeds the reservation limited number.

Figure 28:
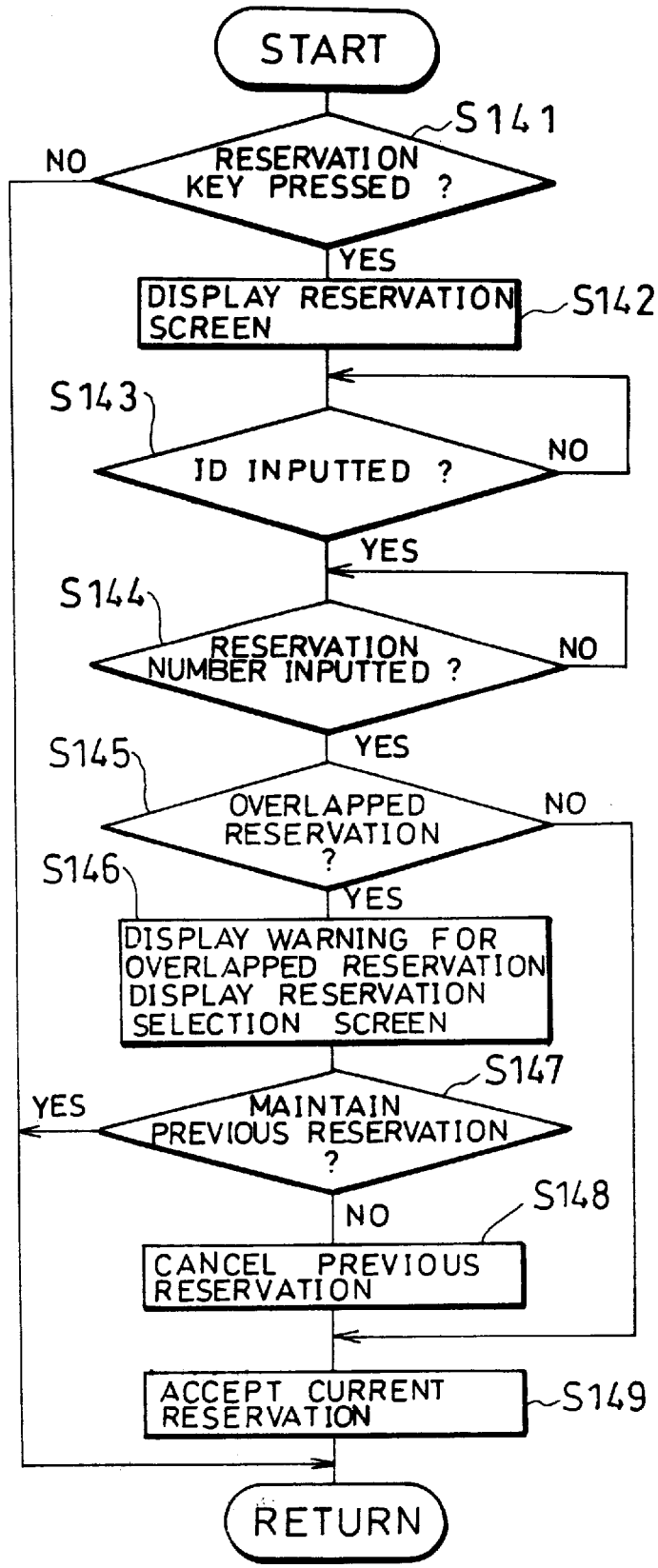
FIG. 28 is a flowchart showing another example of a control process by the NW controller to be executed when overlapped reservations are made by the same user in the network at one time.

In the flowchart, the processes in S151 through S154 are the same as the processes in S141 through S144 in the flowchart of FIG. 28, and thus the descriptions thereof shall be omitted here. After the process in S154 has been executed, based on the ID given to the user who made a reservation and the device number of the DPPC to be reserved, it is determined whether or not the number of the DPPCs being reserved by this user exceeds the reservation limit number (S155). For example, in the case where the reservation limit number is set to three, and another reservation is to be made for the fourth DPPC, a reservation list as well as a message "Reservation exceeding the reservation limit number of three. Select which one of the reservations to be cancelled" are displayed (S156).

Then, it is determined whether or not the DPPC from which the reservation is to be cancelled is selected (S157). If so, the reservation for the selected DPPC is cancelled (S158), and a current reservation is accepted (S159). Then, the sequence returns to the main routine.

Here, one example of the reservation list to be displayed in S156 is shown in FIG. 31. As shown in the figure, both a current state of use of each DPPC and a state of reservation of the user who inputted the ID are displayed. In this example, the second device is not being reserved, and the first, third, fourth and fifth devices are being operated and will be available respectively after 5 minutes, 7 minutes, 10 minutes and 20 minutes. In the third device, a message "own device" indicating that the DPPC 3 is being operated by the user is displayed. In the fifth device, a message "being reserved" indicating that the user already made a reservation to the fifth device is displayed.

As described, the upper limit number of the devices for which the user is allowed to make a reservation, and when a reservation exceeding the upper limit number is to be made by the user, the user selects which one of the reservation to be cancelled. As a result, unready cancellation of the reservation can be prevented, and a reduction in operability due to the overlapped reservations can be avoided.

Figure 30:
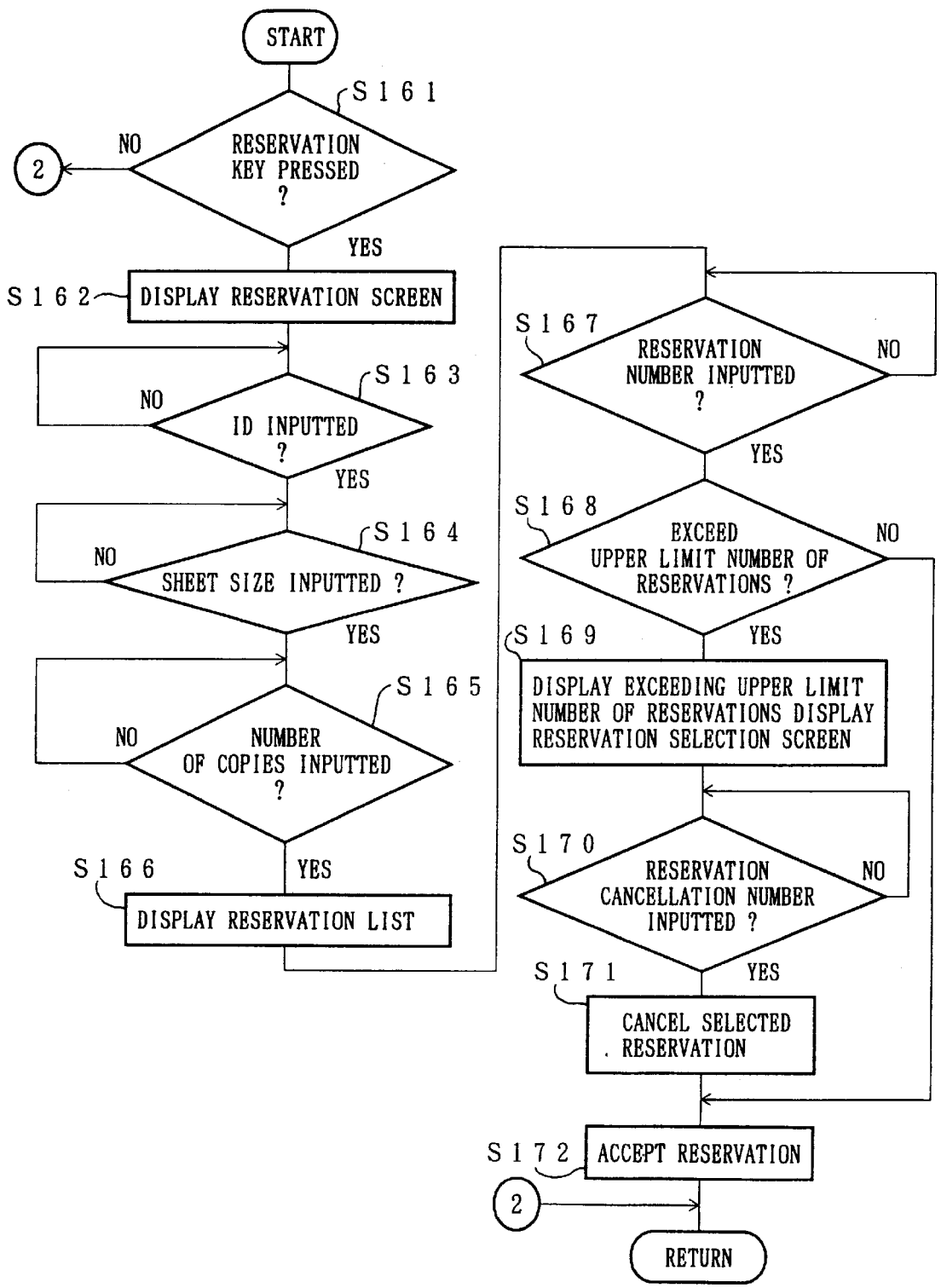
FIG. 30 is a flowchart showing a control process of the NW controller to be executed when the user makes a reservation of a copying job in the network.

In reference to the flowchart of FIG. 30, a still another example of checking overlapped reservations will be explained.

Figure 29:
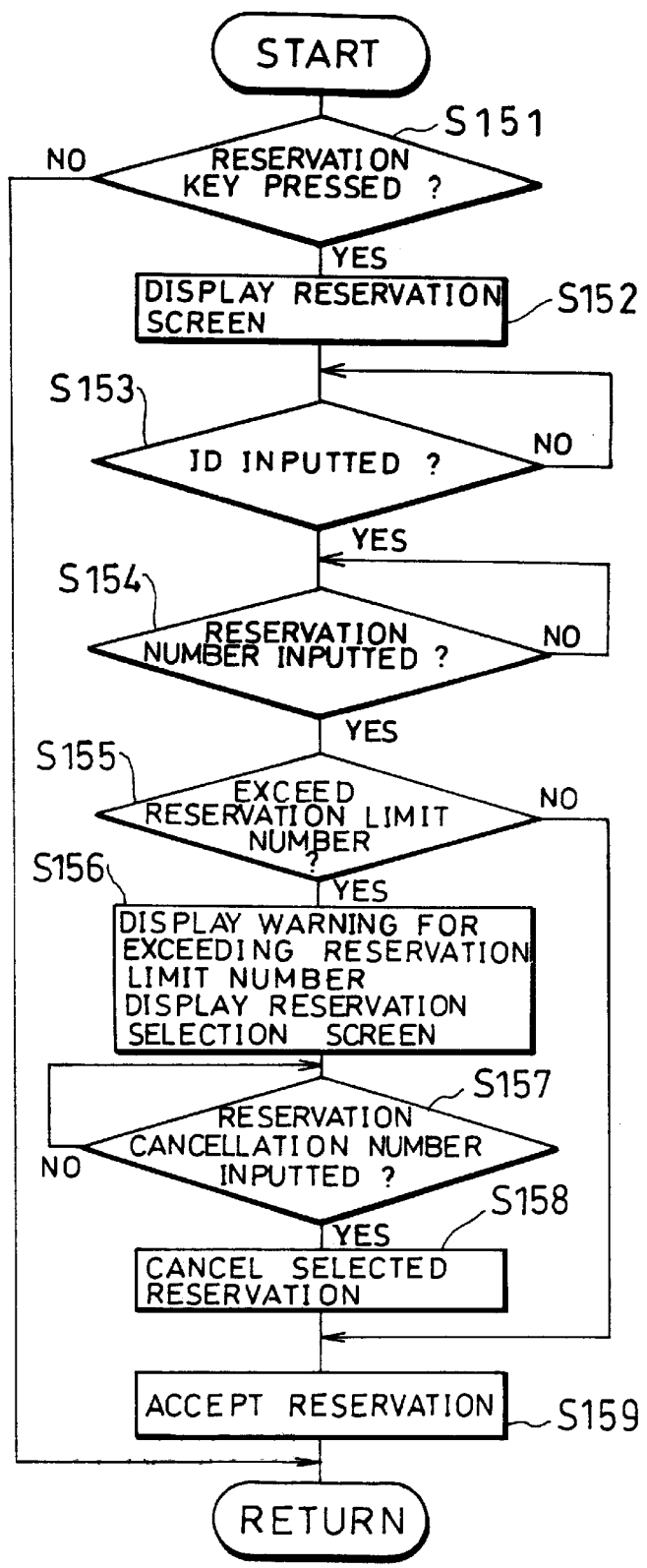
FIG. 29 is a flowchart showing another example of a control process by the NW controller to be executed when overlapped reservations are made by the same user in the network at one time.

In the flowchart, the processes in S161 through S163 are the same as the processes in S151 through S153 in the flowchart of FIG. 29, and thus the descriptions thereof shall be omitted here. When the user ID is inputted in S163, it is determined whether or not the input of a copy sheet size is determined (S164). If the input has not been made, this determination is repeated until confirming the input. Then, it is determined whether or not the number of copies to be made is inputted (S165). If not, the described determination is repeated.

Upon making these inputs, the list of available DPPCs is displayed in order from the DPPC which will complete the job in execution first. In the meantime, a message for urging the user to input the device number of the DPPC to be reserved is displayed (S166). Next, it is determined whether or not the input of the device number of the DPPC to be reserved is made (S167). If not, this described determination is repeated until the input is confirmed. When the input of the device number is made, it is determined whether or not the DPPCs being reserved by the user which have not completed to reserved operations exceed the upper limit number of reservations (S168). For example, in the case where the reservation limit number is set to three, and another reservation is to be made for the fourth DPPC, a message "Reservation exceeding the reservation limit number of three. Select which one of the reservations to be cancelled". In the meantime, a reservation list is displayed (S169). When the device number of the DPPC from which the reservation is to be cancelled is inputted (S170), the reservation for this DPPC is cancelled (S171), and the current reservation is accepted (S172).

An example of the list to be displayed in S166 is shown in FIG. 32. In this example, it is displayed that the second device is available, and the job in execution therein will be completed in two minutes. The first device is being used and will complete the job in execution therein in five minutes. The third device is being used, and will complete the job in execution therein in seven minutes. The third device is the DPPC which is being operated by the user. The fifth device is being used, and will complete a job in execution therein in 10 minutes. In the described manner, it is displayed that the user already made a reservation. The fourth device is being used, and will complete the job in execution therein in 20 minutes.

As described, by displaying the status of each DPPC in the network, and the time of completing the job in reservation, the user can see for which one of the DPPCs the reservation is to be made to complete the operation as quickly as possible.

An example of the screen for allowing the user to set a copy sheet size, etc., is shown in FIG. 33. On this screen, the sheet to be used for the copying operation required for reservation is selected under the item "select sheet size", and whether or not a both-sided copy mode is performed is selected under the item "both-sided copy". Under the item "finishing", a function of sorting or grouping can be selected is desired, and also whether or not a function of stapling be selected can be specified under this item. Other than the described items, the items for selecting the photo copy or image processing to be performed in the reserved copying operation may be added as desired.

In this example, a selection is made as follows:

sheet size . . . A4 both-sided copy . . . selected finishing mode . . . sort and staple photo-copy . . . not selected image editing . . . not selected Needless to mention, additional items may be displayed for allowing the user to select functions under such items.

Other than the described method wherein functions are selected by inputting the functions by the user which are selected from the items displayed on the screen, for example, it may be arranged so as to insert the IC card in which the functions desired to select are stored beforehand into the DPPC may be adopted. In such method, for example, three IC cards c1 through c3 shown in Table 10 are prepared.

TABLE 10

| CARD NO. | PAPER SIZE USED | BOTH-SIDED COPY | FINISHING | STAPLE | PHOTOCOPY | IMAGE PROCESSING |
|---|---|---|---|---|---|---|
| 1 | A3 | | SORT | ✓ | | |
| 2 | A4 | ✓ | SORT | | | ✓ |
| 3 | A5 | | | | ✓ | ✓ |

The IC card c1, for example, stores the following information with regard to the functions selected by the user:

selected sheet size . . . A3 both-sided copy . . . not selected finishing . . . sort stapling . . . not selected photo-copy . . . not selected image editing . . . not selected.

The IC card represented by the above-mentioned example of the IC card c1 is arranged so as to be removable from the DPPC any time after the stored attribute has been read by the DPPC. As described, as all the functions selected by the user can be inputted in the DPPC only by inserting the IC card, the operability can be improved.

As described, in the network in accordance with the present embodiment, an operation panel with a display screen is provided in each DPPC for allowing a user to make a reservation of a copying job for a selected DPPC. Further, the NW controller controls such that the requested copying job by the user is given a priority to be interrupted on the wait line for the process to be executed in the corresponding DPPC. According to the described arrangement, as the user can make a reservation of a copying job for a DPPC through other DPPC, a network of a user's friendly can be achieved.

[EIGHTH EMBODIMENT]

The following descriptions will discuss still another embodiment of the present invention in reference to FIGS. 24, 31, 32 and 33.

The network in accordance with the present embodiment includes ten DPPCS which are hereinafter designated respectively as DPPC-1, DPPC-2, . . . DPPC-10. In the present embodiment, the users of the network are divided into three groups of departments 1 through 3, the groups of the DPPCs respectively available for the departments 1 through 3 are determined as shown in Table 11.

TABLE 11

| USER'S GROUP | AVAILABLE DPPC GROUP | DPPCs IN EACH GROUP |
|---|---|---|
| FIRST DEPARTMENT | FIRST GROUP | DPPC-1, DPPC-2, DPPC-3 |
| SECOND DEPARTMENT | SECOND GROUP | DPPC-4, DPPC-5, DPPC-6, DPPC-7, DPPC-8 |
| THIRD DEPARTMENT | THIRD GROUP | DPPC-9, DPPC-1O |

As is clear from Table 11, in the network in accordance with the present embodiment, the groups of the user and the group of the DPPC have one to one correspondence. Specifically, the DPPCs available for the first department are DPPC-1, DPPC-2 and DPPC-3 which belong to the first group. The DPPCS available for the second department are DPPC-4 through DPPC-8 which belong to the second group. The DPPCs available for the third department are DPPC-9 and DPPC-10 which belong to the third group.

The users in the first department are allowed to make a reservation of a copying job for only the DPPCs in the first group. In the display screen of the operation panel provided in each DPPC, the operation information shown in FIG. 24, FIG. 31 and FIG. 32 of the seventh embodiment is displayed only with regard to the DPPCs in each group. Namely, on the display screen of the DPPC in the first group, only information with regard to the DPPC-1, the DPPC-2 and the DPPC-3 are selectively displayed.

As described, by dividing the network users into groups, and providing the means for storing the information and means for dividing the DPPCs into groups and storing the respective information and means for setting each group of the DPPCs for which a reservation can be made according to the group which the user belongs to, reservations can be simplified, thereby preventing a reservation error.

The present embodiment may be arranged such that the total time the DPPCs of each group operated is summed at a predetermined time interval, and an assignment for the number of the DPPCs in each group is made according to the ratio in operation time as in the case of the first embodiment. Furthermore, in such case, by setting the minimum number of the DPPCs to be assigned to each group, even if the total time the DPPCs operated in one group is significantly smaller than the other group, the minimum number of the DPPCs in such group can be ensured.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A print output control device provided in a network composed of a plurality of printing devices including a composite printing device that is switchable between a printing mode for printing image data received from an external device and a copying mode for copying image data read from a document, comprising:

arithmetic means which sums respective amounts of printing operations and copying operations executed in each printing device and computes a ratio in number of printing devices for use in processing a printing job to a number of printing devices for use in processing a copying job based on results of summation of the printing operations and the copying operations executed in each printing device, the summation being carried out at a predetermined timing; and switch means which selects a composite printing device whose mode is to be switched and switches a selected composite printing device so as to satisfy the ratio of the number of the printing devices for use in processing the printing job to the number of the printing devices for use in processing the copying job computed by said arithmetic means.

2. The print output control device as set forth in claim 1, wherein:

said print output control device is stored at least in one of said plurality of printing devices.

3. The print output control device as set forth in claim 1, wherein:

the respective amounts of the printing operations and the copying operations executed in each printing device are respectively summed by said arithmetic means based on a number of jobs processed.

4. The print output control device as set forth in claim 1, wherein:

the respective amounts of printing operations and the copying operations executed in each printing device are respectively summed by said arithmetic means based on a number of printing or copies made.

5. The print output control device as set forth in claim 1, wherein:

the respective amounts of printing operations and the copying operations executed in each printing device are respectively summed by said arithmetic means based on total time each printing device operated in processing the printing jobs or the copying jobs.

6. The print output control device as set forth in claim 1, wherein:

the predetermined timing is at a time of completion of each copying job or printing job processed in the network.

7. The print output control device as set forth in claim 1, wherein:

said arithmetic means performs a summation of the printing operations or the copying operations executed in each printing device at a predetermined time interval.

8. The print output control device as set forth in claim 1, wherein:

said switch means switches a mode of the selected composite printing device when it is not in execution of a printing job nor a copying job.

9. A composite printing device, connected on a network, that is switchable between a printing mode for printing image data received from an external device and a copying mode for copying image data read from a document, comprising:

arithmetic means which sums respective amounts of printing operations and copying operations executed in each printing device and computes a ratio in number of printing devices for use in processing a printing job to a number of printing devices for use in processing a copying job based on results of summation of respective amounts of the printing operations and the copying operations executed in each printing device, the summation being carried out at a predetermined timing; and switch means which selects a composite printing device whose mode is to be switched and switches a selected composite printing device so as to satisfy the ratio in number of the printing devices for use in processing the printing job to the number of the printing devices for use in processing the copying job computed by said arithmetic means.

10. The composite printing device as set forth in claim 9, further comprising:

display means for displaying a mode of each of other printing devices connected to the network as well as their relative positions with respect to the composite printing device of its own.

11. The composite printing device as set forth in claim 9, further comprising:

display means for displaying a status of each of other printing devices in the network as well as their relative positions with respect to the composite printing device of its own.

12. A method of controlling a printing device on a network composed of a plurality of printing devices including a composite printing device that is switchable between a printing mode for printing image data received from an external device and a copying mode for copying image data read from a document, comprising the steps of:

(a) summing respective amounts of printing operations and copying operations executed in each printing device;

(b) computing a ratio in number of printing devices for use in processing printing jobs to a number of printing devices for use in processing copying jobs based on results of summation obtained in said step (a);

(c) selecting a composite printing device to be switched a current mode to another mode to satisfy a ratio obtained from a computation in said step (b); and (d) switching a mode of a composite printing device selected in said step (c).

13. The method of controlling a printing device as set forth in claim 12, wherein:

a summation in said step (a) is carried out with respect to a number of printing jobs or copying jobs executed in each printing device.

14. The method of controlling a printing device as set forth in claim 12, wherein:

a summation in said step (a) is carried out with respect to a number of printing or copies made in each printing device.

15. The method of controlling a printing device as set forth in claim 12, wherein:

a summation in said step (a) is carried out with respect to a total time used in processing printing job or copying job in each printing device.

16. The method of controlling a printing device as set forth in claim 12, wherein:
said step (a) is carried out at a completion of a copying job or a printing job executed in the network.

17. The method of controlling a printing device as set forth in claim 12, wherein:
said step (a) is performed at a predetermined time interval.

18. The method of controlling a printing device as set forth in claim 12, wherein:
said step (d) is performed when the composite printing device whose mode is subject to switch is not in execution of a printing job nor a copying job.

19. The method of controlling a printing device as set forth in claim 12, wherein:
in said step (c), the composite printing device whose mode is to be switched is selected in order from the device which has processed least amount of jobs in one mode.

20. The method of controlling a printing device as set forth in claim 12, wherein:
in the step (c), the composite printing device to be switched from one mode to another is selected based on jobs executed in a mode to be switched as a result of a second latest execution of said step (a) when a plurality of composite printing devices to be switched to one mode to another mode exist as a result of a latest execution of said step (a) and the jobs executed in the mode to be switched are equivalent among such composite printing devices to be switched.

21. The method of controlling a printing device as set forth in claim 12, wherein:
in the step (c), the composite printing device to be switched from one mode to another is selected according to a priority order set beforehand when a plurality of composite printing devices to be switched to one mode to another mode exist as a result of a latest execution of said step (a) and the jobs executed in the mode to be switched are equivalent among such composite printing devices to be switched.

22. A method of controlling a plurality of printing devices including a composite printing devices connected to the network, said composite printing device being switchable between a printing mode for printing image data received from an external device and a copying mode for copying image data read from a document, comprising the steps of:
(a) summing respective amounts of printing operations or copying operations executed in each printing device;
(b) computing a ratio in number of printing devices for use in processing printing jobs to a number of printing devices for use in processing copying jobs based on results of summation in said step (a);
(c) selecting a composite printing device whose mode is to be switched to satisfy a condition that respective numbers of the printing devices for use in processing the printing jobs and the printing devices for use in processing the copying job are not less than a predetermined lower limit number determined at least for one of these two types of the printing devices and that a ratio in number of the printing devices for use in processing the printing jobs to the number of the printing devices for use in processing the copying job can be approximated to the ratio obtained in the step (b); and
(d) switching a mode of the composite printing device selected in the step (c).

23. A network, comprising:
a plurality of printing device including a composite printing device that is switchable between a printing mode for printing image data received from an external device and a copying mode for copying image data read from a document; and
control device including,
arithmetic means which sums respective amounts of printing operations and copying operations executed in each printing device and computes a ratio in number of printing devices for use in processing a printing job to a number of printing devices for use in processing a copying job based on results of summation of the printing operations and the copying operations executed in each printing device, the summation being carried out at a predetermined timing, and
switch means which selects a composite printing device whose mode is to be switched and switches a selected composite printing device so as to satisfy the ratio in number of the printing devices for use in processing the printing job to the number of the printing devices for use in processing the copying job computed by said arithmetic means.

24. The network as set forth in claim 23, further comprising:
a data processing unit for processing image data; and
said control device is provided in said data processing unit.

25. The network as set forth in claim 23, wherein:
said control device is provided in said composite printing device.

26. The network as set forth in claim 23, wherein:
said network includes a plurality of said control devices, one of which is being used and other of which are set in a wait state;
said plurality of control devices respectively send the status information describing a status of each control device to other control devices, and when an occurrence of trouble in the control device being used is detected by another control device, the operation of the control device being used is stopped, and one of other control devices starts operating.

27. The network as set forth in claim 23, wherein:
said network includes a plurality of said control devices which form a path in a loop for transferring a control signal; and
when a subsequent control signal is not received after sending one control signal, each control device recognizes that the state of any of other control devices is in trouble.

28. The network as set forth in claim 23, wherein:
said network includes a plurality of said control devices, one of which is being used and other of which is set in a wait state;
each of said plurality of control devices includes storage means for storing a priority order of said plurality of control devices in the network; and
the control device in the wait state is activated in replace of the control device being used when a trouble occurs in the control device being used, and the control device is given a priority over other control devices.

29. A network, comprising:

a data processing unit for preparing image data;

a plurality of composite printing devices that are switchable between a printing mode for printing image data received from said data processing unit and a copying mode for copying image data read from a document; and a control device for controlling an assignment of printing jobs and copying jobs to said plurality of composite printing devices, wherein each composite printing device includes display means, said control device includes arithmetic means which sums respective amounts of printing operations and copying operations executed in each printing device and computes a ratio in number of printing devices for use in processing a printing job to a number of printing devices for use in processing a copying job based on results of summation of the printing operations and the copying operations executed in each printing device, the summation being carried out at a predetermined timing, and switch means which selects a composite printing device whose mode is to be switched and switches a selected composite printing device so as to satisfy the ratio of the number of the printing devices for use in processing the printing job to the number of the printing devices for use in processing the copying job computed by said arithmetic means, and said control device displays respective status of other composite printing devices based on information collected from said plurality of composite printing devices in the network.

30. The network as set forth in claim 29, wherein:

each composite printing device includes reservation input means which allows a user to make a reservation of a copying job for a selected composite printing device in the network and a wait line for storing thereon jobs to be processed, and the control device assigns a copying job on the wait line of the composite printing device for which the user made the reservation.

31. The network as set forth in claim 29, wherein:

each composite printing device includes reservation input means which allows a user to make a reservation of a copying job for a selected composite printing device in the network, a wait line for storing thereon jobs to be processed and reservation cancel means for inputting a cancellation of the reservation made by the user, and said control device sets the copying job on the wait line of the composite printing device for which the user made the reservation and cancels the reservation from the wait line upon receiving an input for canceling the reservation by the user by means of said reservation cancel means.

32. The network as set forth in claim 29, wherein:

a number of copying jobs which a single user is allowed to reserve at one time is determined beforehand, and when the user tries to make another reservation exceeding the predetermined number, said control device cancels one of reservations previously made by the user from the wait line.

33. The network as set forth in claim 29, wherein:

a number of copying jobs which a single user is allowed to reserve at one time is determined beforehand, and when the user tries to make another reservation exceeding the predetermined number, the control device rejects a last reservation which the user tried to make.

* * * * *